US012567923B2

(12) United States Patent
Xu et al.

(10) Patent No.: US 12,567,923 B2
(45) Date of Patent: Mar. 3, 2026

(54) RATE ADAPTATION METHOD AND APPARATUS

(71) Applicant: HUAWEI TECHNOLOGIES CO., LTD., Shenzhen (CN)

(72) Inventors: Li Xu, Shenzhen (CN); Qiwen Zhong, Shenzhen (CN); Rixin Li, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 534 days.

(21) Appl. No.: 18/153,411

(22) Filed: Jan. 12, 2023

(65) Prior Publication Data

US 2023/0155715 A1      May 18, 2023

Related U.S. Application Data

(63) Continuation of application No. PCT/CN2021/104241, filed on Jul. 2, 2021.

(30) Foreign Application Priority Data

Jul. 13, 2020    (CN) .......................... 202010670874.3

(51) Int. Cl.
H04L 1/00           (2006.01)
(52) U.S. Cl.
CPC .......... H04L 1/0002 (2013.01); H04L 1/0013 (2013.01)
(58) Field of Classification Search
CPC ... H04L 1/0002; H04L 1/0013; H04L 1/0015; H04L 1/0067; H04L 1/0045;
(Continued)

(56) References Cited

U.S. PATENT DOCUMENTS 9,270,299 B2 *   2/2016  Luby ..................... H04L 1/0086
2017/0324657 A1 *  11/2017  Zhong ..................... H04L 1/008
(Continued)

FOREIGN PATENT DOCUMENTS

CN      106301678 A      1/2017
CN      107438029 A      12/2017
(Continued)

OTHER PUBLICATIONS

Technical Editor: "Flex Ethernet Implementation Agreement 2.1".IA Flex Ethernet 2.1, Implementation Agreement, IA # OIF FLEXE-02.1, Jul. 2019, total 56 pages.
(Continued)

*Primary Examiner* — Sujoy K Kundu
*Assistant Examiner* — Vladislav Y Agureyev

(57)               ABSTRACT

The technology of this application relates to a rate adaptation method and apparatus. The method includes, when a rate adaptation requirement exists, inserting a rate adaptation code block only between two adjacent code blocks whose code block relationship meets a preset condition, or deleting only a rate adaptation code block between two code blocks whose code block relationship meets a preset condition. In this way, it can be ensured that correctness of parsing a packet by a receive side after the receive side receives the packet is not affected by rate adaptation, and reliability of rate adaptation can be improved.

20 Claims, 26 Drawing Sheets

(58) Field of Classification Search
CPC . H04L 1/0041; H04L 1/0008; H04L 12/2852; H04L 12/4625
See application file for complete search history.

(56) References Cited

U.S. PATENT DOCUMENTS

| | | | | |
|---|---|---|---|---|
| 2018/0098076 A1* | 4/2018 | Su | ............................ | H04J 3/07 |
| 2019/0097914 A1* | 3/2019 | Zhong | .................. | H04J 3/1658 |
| 2019/0173499 A1* | 6/2019 | Zheng | ................... | H04L 1/0057 |
| 2020/0328767 A1* | 10/2020 | Zhong | ..................... | H04B 1/04 |
| 2022/0209898 A1* | 6/2022 | Karaki | .................. | H04W 72/23 |

FOREIGN PATENT DOCUMENTS

| | | | | | |
|---|---|---|---|---|---|
| CN | 109995455 B | * | 7/2020 | ......... | H04Q 11/0062 |
| WO | WO-2019015462 A1 | * | 1/2019 | ............ | H04L 41/06 |
| WO | WO-2019128664 A1 | * | 7/2019 | ......... | H04Q 11/0062 |
| WO | WO-2020230008 A1 | * | 11/2020 | ............ | H04W 72/23 |

OTHER PUBLICATIONS

White Paper, The Evolution of ITU-T G.709, Optical Transport Networks (OTN) Beyond, 100Gbit/s, Mar. 2017, total 56 pages.
IEEE Standard for Ethernet, IEEE Computer Society, Developed by the LAN/MAN Standards Committee, IEEE Std 802.3, 2022, May 13, 2022, total 7025 pages.

* cited by examiner

Bit position: SYNC = 2 bits; Payload (Block Payload) bits 2 … 65

| Input data (INPUT DATA) | SYNC | D0 (Block type field) | D1 | D2 | D3 | D4 | D5 | D6 | D7 |
|---|---|---|---|---|---|---|---|---|---|
| $D_0D_1D_2D_3D_4D_5D_6D_7$ (Data block format) | 01 | $D_0$ | $D_1$ | $D_2$ | $D_3$ | $D_4$ | $D_5$ | $D_6$ | $D_7$ |
| Control block format | | Block type field | | | | | | | |
| $C_0C_1C_2C_3C_4C_5C_6C_7$ | 10 | 0x1E | $C_0\ C_1$ | $C_2$ | $C_3$ | $C_4$ | $C_5$ | $C_6$ | $C_7$ |
| $S_0D_1D_2D_3D_4D_5D_6D_7$ | 10 | 0x78 | $D_1$ | $D_2$ | $D_3$ | $D_4$ | $D_5$ | $D_6$ | $D_7$ |
| $O_0D_1D_2D_3Z_4Z_5Z_6Z_7$ | 10 | 0x4B | $D_1$ | $D_2$ | $D_3$ | $O_0$ | 0x000_0000 | | |
| $T_0C_1C_2C_3C_4C_5C_6C_7$ | 10 | 0x87 | $C_1$ | $C_2$ | $C_3$ | $C_4$ | $C_5$ | $C_6$ | $C_7$ |
| $D_0T_1C_2C_3C_4C_5C_6C_7$ | 10 | 0x99 | $D_0$ | $C_2$ | $C_3$ | $C_4$ | $C_5$ | $C_6$ | $C_7$ |
| $D_0D_1T_2C_3C_4C_5C_6C_7$ | 10 | 0xAA | $D_0$ | $D_1$ | $C_3$ | $C_4$ | $C_5$ | $C_6$ | $C_7$ |
| $D_0D_1D_2T_3C_4C_5C_6C_7$ | 10 | 0xB4 | $D_0$ | $D_1$ | $D_2$ | $C_4$ | $C_5$ | $C_6$ | $C_7$ |
| $D_0D_1D_2D_3T_4C_5C_6C_7$ | 10 | 0xCC | $D_0$ | $D_1$ | $D_2$ | $D_3$ | $C_5$ | $C_6$ | $C_7$ |
| $D_0D_1D_2D_3D_4T_5C_6C_7$ | 10 | 0xD2 | $D_0$ | $D_1$ | $D_2$ | $D_3$ | $D_4$ | $C_6$ | $C_7$ |
| $D_0D_1D_2D_3D_4D_5T_6C_7$ | 10 | 0xE1 | $D_0$ | $D_1$ | $D_2$ | $D_3$ | $D_4$ | $D_5$ | $C_7$ |
| $D_0D_1D_2D_3D_4D_5D_6T_7$ | 10 | 0xFF | $D_0$ | $D_1$ | $D_2$ | $D_3$ | $D_4$ | $D_5$ | $D_6$ |

FIG. 2

| 1 | 0 | 0x4B | D1 | D2 | D3 | 0xC | 0x0000000 |
|---|---|------|----|----|----|-----|-----------|

| S | D | D | D | D | D | D | D | D | T |
|---|---|---|---|---|---|---|---|---|---|

| S | D | D | D | D | D | D | D | D | T | C: O, I... | S | D | D | D | D | D | D | D | D | T |
|---|---|---|---|---|---|---|---|---|---|-----------|---|---|---|---|---|---|---|---|---|---|

IPG

First code block stream

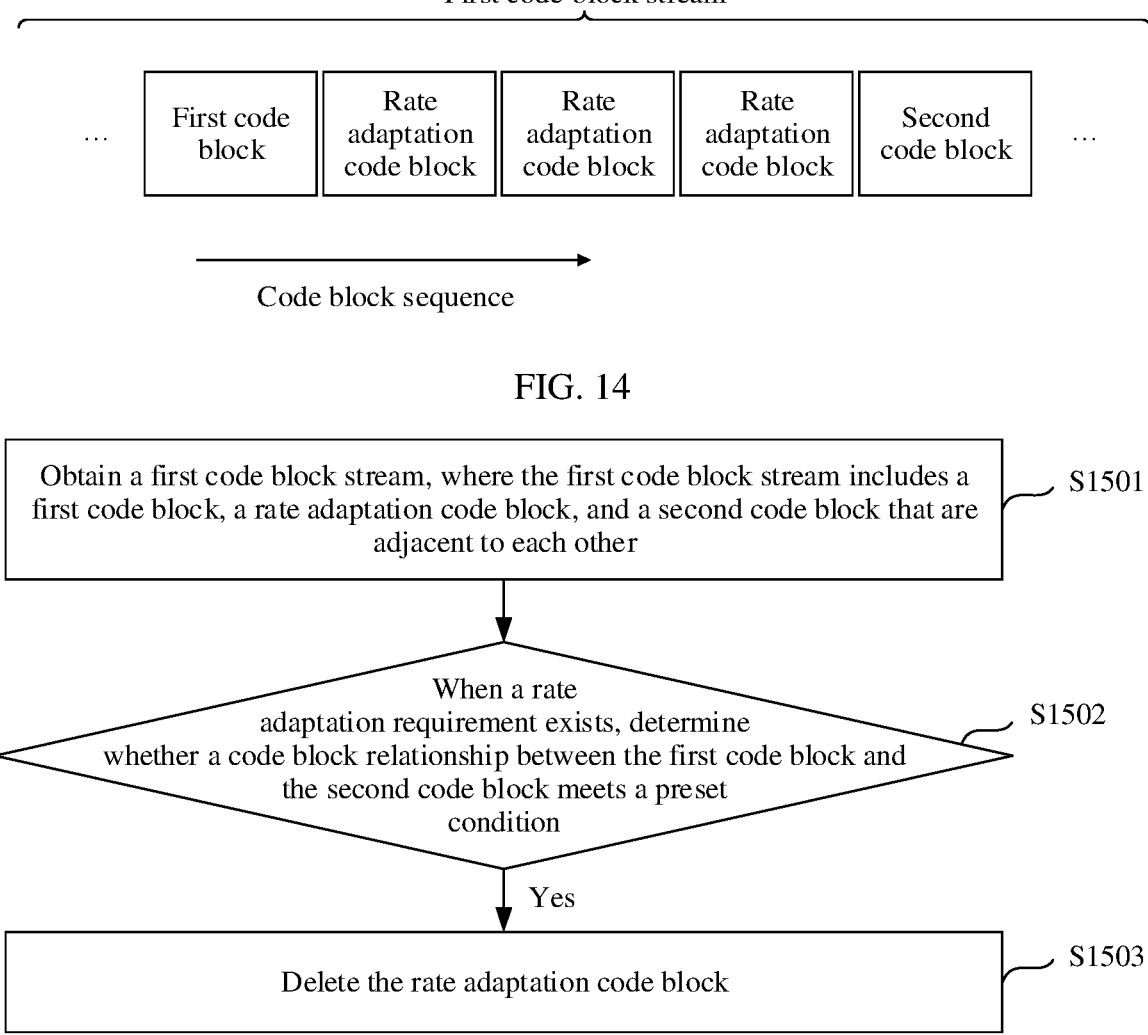

Code block sequence

FIG. 14

Obtain a first code block stream, where the first code block stream includes a first code block, a rate adaptation code block, and a second code block that are adjacent to each other    S1501

When a rate adaptation requirement exists, determine whether a code block relationship between the first code block and the second code block meets a preset condition    S1502

Yes

Delete the rate adaptation code block    S1503

FIG. 15

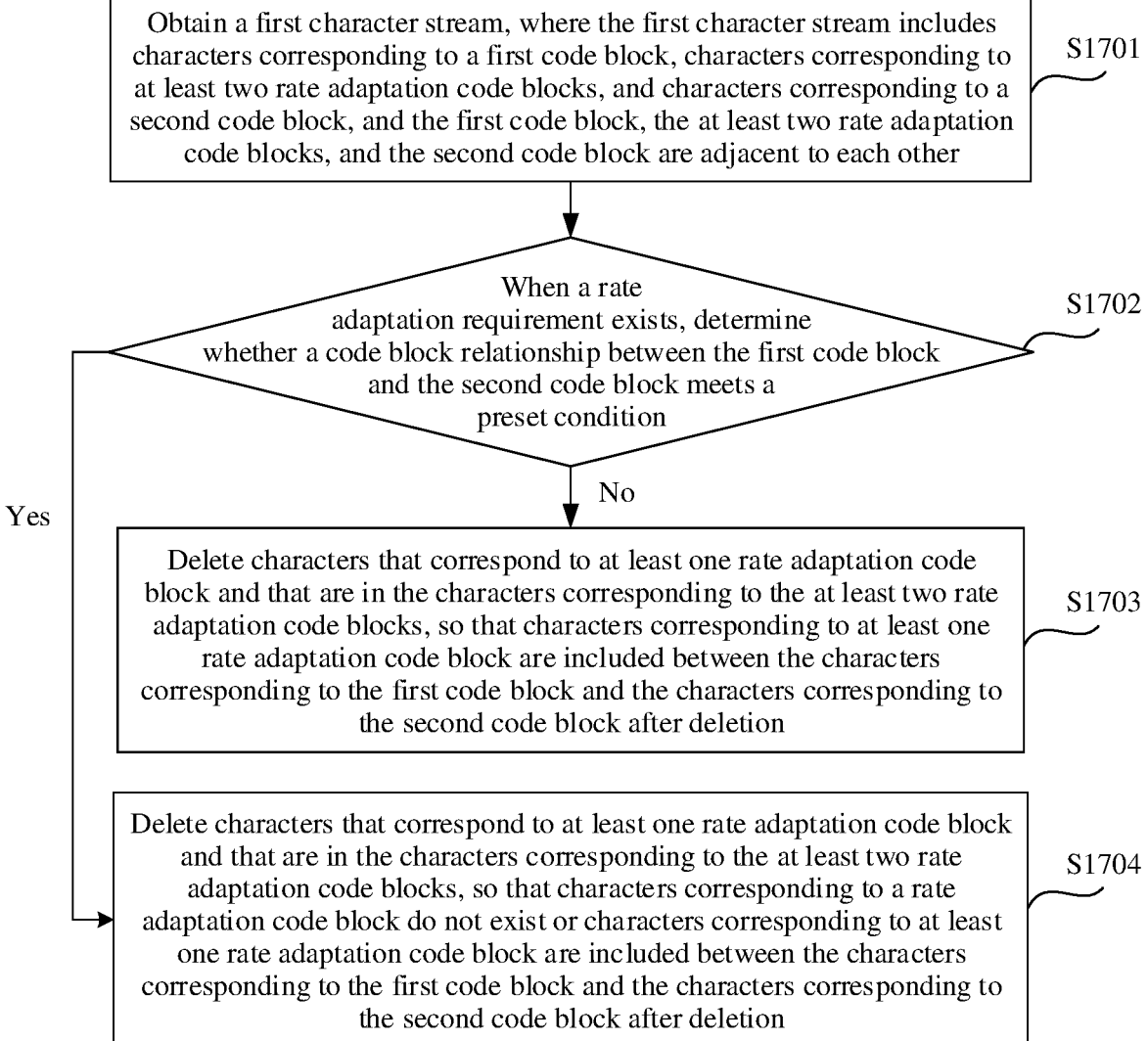

Obtain a first character stream, where the first character stream includes characters corresponding to a first code block, characters corresponding to at least two rate adaptation code blocks, and characters corresponding to a second code block, and the first code block, the at least two rate adaptation code blocks, and the second code block are adjacent to each other    S1701

When a rate adaptation requirement exists, determine whether a code block relationship between the first code block and the second code block meets a preset condition    S1702

Yes

No

Delete characters that correspond to at least one rate adaptation code block and that are in the characters corresponding to the at least two rate adaptation code blocks, so that characters corresponding to at least one rate adaptation code block are included between the characters corresponding to the first code block and the characters corresponding to the second code block after deletion    S1703

Delete characters that correspond to at least one rate adaptation code block and that are in the characters corresponding to the at least two rate adaptation code blocks, so that characters corresponding to a rate adaptation code block do not exist or characters corresponding to at least one rate adaptation code block are included between the characters corresponding to the first code block and the characters corresponding to the second code block after deletion    S1704

FIG. 17

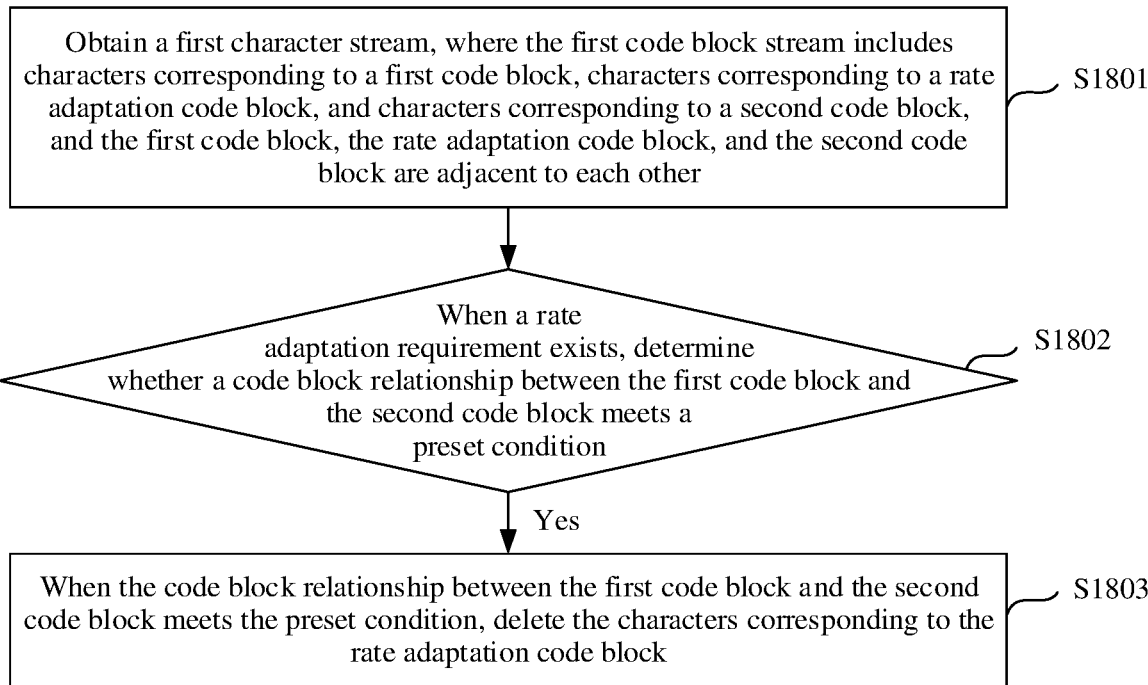

Obtain a first character stream, where the first code block stream includes characters corresponding to a first code block, characters corresponding to a rate adaptation code block, and characters corresponding to a second code block, and the first code block, the rate adaptation code block, and the second code block are adjacent to each other — S1801

When a rate adaptation requirement exists, determine whether a code block relationship between the first code block and the second code block meets a preset condition — S1802

Yes

When the code block relationship between the first code block and the second code block meets the preset condition, delete the characters corresponding to the rate adaptation code block — S1803

FIG. 18

Apparatus 1900

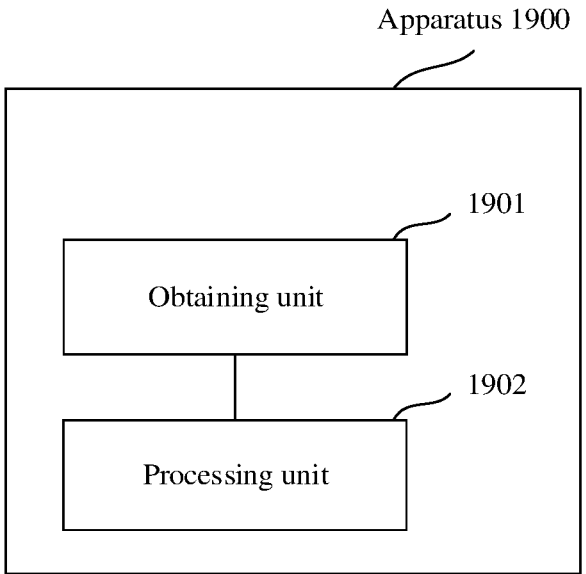

1901

Obtaining unit

1902

Processing unit

FIG. 19

Apparatus 2000

Apparatus 2100

Apparatus 2200

Apparatus 2300

Apparatus 2400

Apparatus 2500

Apparatus 2600

RATE ADAPTATION METHOD AND APPARATUS

CROSS-REFERENCE TO RELATED APPLICATIONS

This application is a continuation of International Application No. PCT/CN2021/104241, filed on Jul. 2, 2021, which claims priority to Chinese Patent Application No. 202010670874.3, filed on Jul. 13, 2020. The disclosures of the aforementioned applications are hereby incorporated by reference in their entireties.

TECHNICAL FIELD

This application relates to the field of Internet technologies, and in particular, to a rate adaptation method and apparatus.

BACKGROUND

A metro transport network (MTN) is a network layer in a code block domain at a physical coding sublayer (PCS) of the Ethernet, and a data processing granularity thereof is a code block.

In the MTN, when data passes through a sending node, an intermediate node, or a receiving node, a rate adaptation requirement may exist. In the MTN, during rate adaptation, rate adaptation is performed by using a code block as a granularity. For example, a boundary of a packet is identified to find an interpacket gap (IPG) location, and an idle (IDLE) code block is added/deleted at the IPG location to increase or decrease a rate. However, in this method, the idle code block starts to be added/deleted provided that a termination (T) code block is identified. As a result, a packet near a location at which the idle code block is added/deleted is generally incorrectly parsed by a sink.

It may be learned that a rate adaptation method in a conventional technology affects correctness of packet parsing, and has a problem of low reliability.

SUMMARY

Embodiments of this application provide a rate adaptation method and apparatus, to improve reliability of rate adaptation.

According to a first aspect, a rate adaptation method is provided, including: obtaining a first code block stream, where the first code block stream includes a first code block and a second code block that are adjacent to each other; determining whether a code block relationship between the first code block and the second code block meets a preset condition; and when the code block relationship between the first code block and the second code block meets the preset condition and a rate adaptation requirement exists, inserting at least one rate adaptation code block between the first code block and the second code block.

In this embodiment of this application, when rate adaptation is performed by using a code block as a granularity, the rate adaptation code block is inserted only between the first code block and the second code block, where the code block relationship between the two code blocks meets the preset condition. Therefore, the rate adaptation code block may be prevented from being inserted at a code block location that may cause an error in packet receiving and parsing, so that it can be ensured that parsing of a received packet on a receive side (sink) is not affected by rate adaptation.

In a possible implementation, the first code block is a T code block or a code block after the T code block, and the T code block is a frame termination code block; and the second code block is an S code block or a code block before the S code block, and the S code block is a frame start code block. That is, at least one rate adaptation code block is inserted at the interpacket gap location.

In this way, the rate adaptation code block may be prevented from being inserted in the middle of a packet, to avoid affecting customer service data, and further ensure accuracy of packet parsing on the receive side.

In a possible implementation, the preset condition may have a plurality of implementations.

Example 1: The code block relationship between the first code block and the second code block is not a code block relationship that causes an error in packet parsing after the rate adaptation code block is inserted.

For example, the code block relationship between the first code block and the second code block is not any one of the following code block relationships: a T code block and a T code block, a T code block and a D code block, a T code block and an E code block, a D code block and an S code block, and an E code block and an S code block. It should be understood that the foregoing description is only an example of the preset condition, and imposes no limitation.

Example 2: The code block relationship between the first code block and the second code block is a code block relationship that does not cause an error in packet parsing after the rate adaptation code block is inserted.

For example, the code block relationship between the first code block and the second code block is any one of the following code block relationships: a T code block and an interpacket gap IPG code block, an IPG code block and an S code block, a T code block and an S code block, and an IPG code block and an IPG code block, where the IPG code block includes one or more of an idle code block, an O code block, an E code block, or a D code block. It should be understood that the foregoing description is only an example of the preset condition, and imposes no limitation.

In this implementation, a plurality of specific code block locations at which the rate adaptation code block cannot be inserted and a plurality of specific code block locations at which the rate adaptation code block can be inserted are provided. In this way, when the rate adaptation code block is inserted, the rate adaptation code block needs to be inserted only by avoiding the code block location at which the rate adaptation code block cannot be inserted, and/or the rate adaptation code block needs to be inserted only by finding the code block location at which the rate adaptation code block can be inserted, so that it can be well ensured that parsing of a packet in the first code block stream on the receive side is not affected by rate adaptation. Therefore, an implementation is simple and reliable.

In a possible implementation, the determining whether a code block relationship between the first code block and the second code block meets a preset condition includes: sequentially detecting a type of each code block in the first code block stream based on a code block sequence; and after detecting any code block in an interpacket gap, using the any code block as the first code block, using an adjacent code block after the any code block as the second code block, and determining whether the code block relationship between the first code block and the second code block meets the preset condition.

In this implementation, only when a start location of the interpacket gap is found, a determining operation starts to be performed. This can improve efficiency of rate adaptation.

In a possible implementation, before the inserting at least one rate adaptation code block between the first code block and the second code block, the method further includes: decoding the first code block stream to obtain a first character stream; and the inserting at least one rate adaptation code block between the first code block and the second code block includes: inserting characters corresponding to the at least one rate adaptation code block between characters corresponding to the first code block and characters corresponding to the second code block.

In this implementation, when rate adaptation is performed by using a character as a granularity, the characters corresponding to the rate adaptation code block are inserted only between the characters corresponding to the first code block and the second code block, where the code block relationship between the two code blocks meets the preset condition. Therefore, the characters corresponding to the rate adaptation code block may be prevented from being inserted at a character location that may cause an error in packet receiving and parsing, so that it can be ensured that parsing of a received packet on the receive side (sink) is not affected by rate adaptation.

In a possible implementation, before the decoding the first code block stream, the method further includes: performing code block format and code block sequence check on the first code block stream; and if there is a code block whose code block format and/or code block sequence do/does not comply with a rule, replacing, with an E code block, the code block whose code block format and/or code block sequence do/does not comply with the rule. Certainly, the E code block used for replacement herein is merely an example, and imposes no limitation. In actual implementation, another code block may be used for replacement, for example, a self-defined code block.

In this way, a code block combination, in a code stream, that causes an error in packet receiving and parsing may be reduced as much as possible.

In a possible implementation, the decoding the first code block stream includes: decoding a code block other than a preset code block, where the preset code block includes an O code block.

In this way, a correct code block such as an O code block may be prevented from being considered as an error code block for processing, to prevent OAM information in the O code block from being lost.

In a possible implementation, after the inserting characters corresponding to the at least one rate adaptation code block between characters corresponding to the first code block and characters corresponding to the second code block, the method further includes: encoding a character stream obtained after the characters corresponding to the at least one rate adaptation code block are inserted, to obtain a second code block stream; and inserting the preset code block into the second code block stream.

In this way, information in an original code block stream may be prevented from being lost, to further improve reliability of a rate adaptation solution.

According to a second aspect, a rate adaptation method is provided, including: obtaining a first code block stream, where the first code block stream includes a first code block, at least two rate adaptation code blocks, and a second code block that are adjacent to each other; determining whether a code block relationship between the first code block and the second code block meets a preset condition; and when the code block relationship between the first code block and the second code block does not meet the preset condition and a rate adaptation requirement exists, deleting at least one rate adaptation code block in the at least two rate adaptation code blocks, so that at least one rate adaptation code block is included between the first code block and the second code block after deletion.

In this embodiment of this application, when rate adaptation is performed by using a code block as a granularity, if the code block relationship between the first code block and the second code block does not meet the preset condition, when the rate adaptation code block between the first code block and the second code block is deleted, it needs to be ensured that at least one rate adaptation code block is included between the first code block and the second code block after deletion. In this way, the first code block and the second code block may be prevented from being adjacent to each other after deletion, that is, a code block combination that may cause an error in packet receiving and parsing may be avoided, so that it can be ensured that parsing of a received packet on a receive side is not affected by rate adaptation, and reliability of rate adaptation can be improved.

In a possible implementation, the first code block is a T code block or a code block after the T code block, and the T code block is a frame termination code block; and the second code block is an S code block or a code block before the S code block, and the S code block is a frame start code block.

In a possible implementation, the preset condition includes: the code block relationship between the first code block and the second code block is not any one of the following code block relationships: a T code block and a T code block, a T code block and a D code block, a T code block and an E code block, a D code block and an S code block, and an E code block and an S code block; and/or the code block relationship between the first code block and the second code block is any one of the following code block relationships: a T code block and an interpacket gap IPG code block, an IPG code block and an S code block, a T code block and an S code block, and an IPG code block and an IPG code block, where the IPG code block includes one or more of an idle (IDLE) code block, an O code block, an E code block, or a D code block.

In a possible implementation, the determining whether a code block relationship between the first code block and the second code block meets a preset condition includes: sequentially detecting a type of each code block in the first code block stream based on a code block sequence; and after detecting any code block in an interpacket gap, using the any code block as the first code block, using, as the second code block, a code block that is after the any code block and that is separated from the any code block by at least two rate adaptation code blocks, and determining whether the code block relationship between the first code block and the second code block meets the preset condition.

In a possible implementation, before the deleting at least one rate adaptation code block in the at least two rate adaptation code blocks, the method further includes: decoding the first code block stream to obtain a first character stream; and the deleting at least one rate adaptation code block in the at least two rate adaptation code blocks includes: deleting characters that correspond to the at least one rate adaptation code block and that are in characters corresponding to the at least two rate adaptation code blocks.

In a possible implementation, before the decoding the first code block stream, the method further includes: performing code block format and code block sequence check on the first code block stream; and if there is a code block whose code block format and/or code block sequence do/does not comply with a rule, replacing, with an E code block, the code block whose code block format and/or code block sequence do/does not comply with the rule. Certainly, the E code block used for replacement herein is merely an example, and imposes no limitation. In actual implementation, another code block may be used for replacement, for example, a self-defined code block.

In a possible implementation, the decoding the first code block stream includes: decoding a code block other than a preset code block, where the preset code block includes an O code block.

In a possible implementation, the method further includes:

when the code block relationship between the first code block and the second code block meets the preset condition, deleting at least one rate adaptation code block in the at least two rate adaptation code blocks, so that no rate adaptation code block exists or at least one rate adaptation code block is included between the first code block and the second code block after deletion.

In a possible implementation, after the deleting characters that correspond to the at least one rate adaptation code block and that are in characters corresponding to the at least two rate adaptation code blocks, the method further includes: encoding a character stream obtained after the characters corresponding to the at least one rate adaptation code block are deleted, to obtain a third code block stream; and inserting the preset code block into the third code block stream.

In this way, information in an original code block stream may be prevented from being lost, to further improve reliability of a rate adaptation solution.

According to a third aspect, a rate adaptation method is provided, including: obtaining a first code block stream, where the first code block stream includes a first code block, at least two rate adaptation code blocks, and a second code block that are adjacent to each other; determining whether a code block relationship between the first code block and the second code block meets a preset condition; and when the code block relationship between the first code block and the second code block meets the preset condition and a rate adaptation requirement exists, deleting at least one rate adaptation code block in the at least two rate adaptation code blocks, so that no rate adaptation code block exists or at least one rate adaptation code block is included between the first code block and the second code block after deletion.

In this embodiment of this application, when rate adaptation is performed by using a code block as a granularity, if it is identified that the code block relationship between the first code block and the second code block meets the preset condition, when the rate adaptation code block between the first code block and the second code block is deleted, the rate adaptation code block between the first code block and the second code block may be deleted totally, or may be deleted partially. Therefore, parsing of a received packet on a receive side is not affected by rate adaptation, and flexibility of deleting the rate adaptation code block is improved while reliability of rate adaptation is ensured.

In a possible implementation, the first code block is a T code block or a code block after the T code block, and the T code block is a frame termination code block; and the second code block is an S code block or a code block before the S code block, and the S code block is a frame start code block.

In a possible implementation, the preset condition includes: the code block relationship between the first code block and the second code block is not any one of the following code block relationships: a T code block and a T code block, a T code block and a D code block, a T code block and an E code block, a D code block and an S code block, and an E code block and an S code block; and/or the code block relationship between the first code block and the second code block is any one of the following code block relationships: a T code block and an interpacket gap IPG code block, an IPG code block and an S code block, a T code block and an S code block, and an IPG code block and an IPG code block, where the IPG code block includes one or more of an idle (IDLE) code block, an O code block, an E code block, or a D code block.

In a possible implementation, the determining whether a code block relationship between the first code block and the second code block meets a preset condition includes: sequentially detecting a type of each code block in the first code block stream based on a code block sequence; and after detecting any code block in an interpacket gap, using the any code block as the first code block, using, as the second code block, a code block that is after the any code block and that is separated from the any code block by at least two rate adaptation code blocks, and determining whether the code block relationship between the first code block and the second code block meets the preset condition.

In a possible implementation, before the deleting at least one rate adaptation code block in the at least two rate adaptation code blocks, the method further includes: decoding the first code block stream to obtain a first character stream; and the deleting at least one rate adaptation code block in the at least two rate adaptation code blocks includes: deleting characters that correspond to the at least one rate adaptation code block and that are in characters corresponding to the at least two rate adaptation code blocks.

In a possible implementation, before the decoding the first code block stream, the method further includes: performing code block format and code block sequence check on the first code block stream; and if there is a code block whose code block format and/or code block sequence do/does not comply with a rule, replacing, with an E code block, the code block whose code block format and/or code block sequence do/does not comply with the rule. Certainly, the E code block used for replacement herein is merely an example, and imposes no limitation. In actual implementation, another code block may be used for replacement, for example, a self-defined code block.

In a possible implementation, the decoding the first code block stream includes: decoding a code block other than a preset code block, where the preset code block includes an O code block.

In a possible implementation, after the deleting characters that correspond to the at least one rate adaptation code block and that are in characters corresponding to the at least two rate adaptation code blocks, the method further includes: encoding a character stream obtained after the characters corresponding to the at least one rate adaptation code block are deleted, to obtain a third code block stream; and inserting the preset code block into the second code block stream.

According to a fourth aspect, a rate adaptation method is provided, including: obtaining a first code block stream, where the first code block stream includes a first code block, a rate adaptation code block, and a second code block that are adjacent to each other; determining whether a code block relationship between the first code block and the second code block meets a preset condition; and when the code block relationship between the first code block and the second code block meets the preset condition and a rate adaptation requirement exists, deleting the rate adaptation code block.

In this embodiment of this application, when rate adaptation is performed by using a code block as a granularity, if only one rate adaptation code block exists between the first code block and the second code block, the rate adaptation code block between the first code block and the second code block can be deleted only when the code block relationship between the first code block and the second code block meets the preset condition. In this way, the first code block and the second code block may be prevented from being adjacent to each other after deletion, that is, a code block combination that may cause an error in packet receiving and parsing may be avoided, so that it can be ensured that parsing of a received packet on a receive side is not affected by rate adaptation, and reliability of rate adaptation is improved.

In a possible implementation, the first code block is a T code block or a code block after the T code block, and the T code block is a frame termination code block; and the second code block is an S code block or a code block before the S code block, and the S code block is a frame start code block.

In a possible implementation, the preset condition includes: the code block relationship between the first code block and the second code block is not any one of the following code block relationships: a T code block and a T code block, a T code block and a D code block, a T code block and an E code block, a D code block and an S code block, and an E code block and an S code block; and/or the code block relationship between the first code block and the second code block is any one of the following code block relationships: a T code block and an interpacket gap IPG code block, an IPG code block and an S code block, a T code block and an S code block, and an IPG code block and an IPG code block, where the IPG code block includes one or more of an idle (IDLE) code block, an O code block, an E code block, or a D code block.

In a possible implementation, the determining whether a code block relationship between the first code block and the second code block meets a preset condition includes: sequentially detecting a type of each code block in the first code block stream based on a code block sequence; and after detecting any code block in an interpacket gap, using the any code block as the first code block, using, as the second code block, a code block that is after the any code block and that is separated from the any code block by at least one rate adaptation code block, and determining whether the code block relationship between the first code block and the second code block meets the preset condition.

In a possible implementation, before the deleting the rate adaptation code block, the method further includes: decoding the first code block stream to obtain a first character stream; and the deleting the rate adaptation code block includes: deleting characters corresponding to the rate adaptation code block.

In a possible implementation, before the decoding the first code block stream, the method further includes: performing code block format and code block sequence check on the first code block stream; and if there is a code block whose code block format and/or code block sequence do/does not comply with a rule, replacing, with an E code block, the code block whose code block format and/or code block sequence do/does not comply with the rule. Certainly, the E code block used for replacement herein is merely an example, and imposes no limitation. In actual implementation, another code block may be used for replacement, for example, a self-defined code block.

In a possible implementation, the decoding the first code block stream includes: decoding a code block other than a preset code block, where the preset code block includes an O code block.

In a possible implementation, after the deleting characters corresponding to the rate adaptation code block, the method further includes: encoding a character stream obtained after the characters corresponding to the rate adaptation code block are deleted, to obtain a third code block stream; and inserting the preset code block into the second code block stream.

According to a fifth aspect, a rate adaptation method is provided, including: obtaining a first character stream, where the first character stream includes characters corresponding to a first code block and characters corresponding to a second code block, and the first code block and the second code block are adjacent to each other; when a rate adaptation requirement exists, determining whether a code block relationship between the first code block and the second code block meets a preset condition; and when the code block relationship between the first code block and the second code block meets the preset condition, inserting characters corresponding to at least one rate adaptation code block between the characters corresponding to the first code block and the characters corresponding to the second code block.

In this embodiment of this application, when rate adaptation is performed by using a character as a granularity, the characters corresponding to the rate adaptation code block are inserted only between the characters corresponding to the first code block and the second code block, where the code block relationship between the two code blocks meets the preset condition. Therefore, the rate adaptation characters may be prevented from being inserted at a character location that may cause an error in packet receiving and parsing, so that it can be ensured that parsing of a received packet on a receive side is not affected by rate adaptation, and reliability of rate adaptation is improved.

In a possible implementation, before the obtaining a first character stream, the method further includes: obtaining a first code block stream, where the first code block stream includes the first code block and the second code block that are adjacent to each other; performing code block format and code block sequence check on the first code block stream; if there is a code block whose code block format and/or code block sequence do/does not comply with a rule, replacing, with an E code block, the code block whose code block format and/or code block sequence do/does not comply with the rule, to obtain an error-corrected first code block stream; and decoding the error-corrected first code block stream to obtain the first character stream. Certainly, the E code block used for replacement herein is merely an example, and imposes no limitation. In actual implementation, another code block may be used for replacement, for example, a self-defined code block.

In this way, a code block combination, in a code stream, that causes an error in packet receiving and parsing may be reduced as much as possible.

In a possible implementation, the decoding the error-corrected first code block stream includes: decoding a code block other than a preset code block in the error-corrected first code block stream, where the preset code block includes an O code block.

In this way, a correct code block such as an O code block may be prevented from being considered as an error code block for processing, to prevent OAM information in the O code block from being lost.

In a possible implementation, the first code block is a T code block or a code block after the T code block, and the T code block is a frame termination code block; and the second code block is an S code block or a code block before the S code block, and the S code block is a frame start code block.

In a possible implementation, the preset condition includes: the code block relationship between the first code block and the second code block is not any one of the following code block relationships: a T code block and a T code block, a T code block and a D code block, a T code block and an E code block, a D code block and an S code block, and an E code block and an S code block; and/or the code block relationship between the first code block and the second code block is any one of the following code block relationships: a T code block and an interpacket gap IPG code block, an IPG code block and an S code block, a T code block and an S code block, and an IPG code block and an IPG code block, where the IPG code block includes one or more of an idle (IDLE) code block, an O code block, an E code block, or a D code block.

It should be understood that the foregoing description is only an example of the preset condition, and imposes no limitation.

According to a sixth aspect, a rate adaptation method is provided, including: obtaining a first character stream, where the first character stream includes characters corresponding to a first code block, characters corresponding to at least two rate adaptation code blocks, and characters corresponding to a second code block, and the first code block, the at least two rate adaptation code blocks, and the second code block are adjacent to each other; determining whether a code block relationship between the first code block and the second code block meets a preset condition; and when the code block relationship between the first code block and the second code block does not meet the preset condition and a rate adaptation requirement exists, deleting characters that correspond to at least one rate adaptation code block and that are in the characters corresponding to the at least two rate adaptation code blocks, so that characters corresponding to at least one rate adaptation code block are included between the characters corresponding to the first code block and the characters corresponding to the second code block after deletion.

In this embodiment of this application, when rate adaptation is performed by using a character as a granularity, if the code block relationship between the first code block and the second code block does not meet the preset condition, when the characters that correspond to the rate adaptation code block and that are between the characters corresponding to the first code block and the characters corresponding to the second code block are deleted, it needs to be ensured that characters corresponding to at least one rate adaptation code block are included between the characters corresponding to the first code block and the characters corresponding to the second code block after deletion. In this way, the characters corresponding to the first code block and the characters corresponding to the second code block may be prevented from being adjacent to each other after deletion, that is, a code block combination that may cause an error in packet receiving and parsing may be avoided, so that it can be ensured that parsing of a received packet on a receive side is not affected by rate adaptation, and reliability of rate adaptation can be improved.

In a possible implementation, before the obtaining a first character stream, the method further includes: obtaining a first code block stream, where the first code block stream includes the first code block, the at least two rate adaptation code blocks, and the second code block that are adjacent to each other; performing code block format and code block sequence check on the first code block stream; if there is a code block whose code block format and/or code block sequence do/does not comply with a rule, replacing, with an E code block, the code block whose code block format and/or code block sequence do/does not comply with the rule, to obtain an error-corrected first code block stream; and decoding the error-corrected first code block stream to obtain the first character stream. Certainly, the E code block used for replacement herein is merely an example, and imposes no limitation. In actual implementation, another code block may be used for replacement, for example, a self-defined code block.

In a possible implementation, the decoding the error-corrected first code block stream includes: decoding a code block other than a preset code block in the error-corrected first code block stream, where the preset code block includes an O code block.

In a possible implementation, the first code block is a T code block or a code block after the T code block, and the T code block is a frame termination code block; and the second code block is an S code block or a code block before the S code block, and the S code block is a frame start code block.

In a possible implementation, the preset condition includes: the code block relationship between the first code block and the second code block is not any one of the following code block relationships: a T code block and a T code block, a T code block and a D code block, a T code block and an E code block, a D code block and an S code block, and an E code block and an S code block; and/or the code block relationship between the first code block and the second code block is any one of the following code block relationships: a T code block and an interpacket gap IPG code block, an IPG code block and an S code block, a T code block and an S code block, and an IPG code block and an IPG code block, where the IPG code block includes one or more of an idle (IDLE) code block, an O code block, an E code block, or a D code block.

According to a seventh aspect, a rate adaptation method is provided, including: obtaining a first character stream, where the first character stream includes characters corresponding to a first code block, characters corresponding to at least two rate adaptation code blocks, and characters corresponding to a second code block, and the first code block, the at least two rate adaptation code blocks, and the second code block are adjacent to each other; determining whether a code block relationship between the first code block and the second code block meets a preset condition; and when the code block relationship between the first code block and the second code block meets the preset condition and a rate adaptation requirement exists, deleting characters that correspond to at least one rate adaptation code block and that are in the characters corresponding to the at least two rate adaptation code blocks, so that characters corresponding to a rate adaptation code block do not exist or characters corresponding to at least one rate adaptation code block are included between the characters corresponding to the first code block and the characters corresponding to the second code block after deletion.

In this embodiment of this application, when rate adaptation is performed by using a character as a granularity, if it is identified that the code block relationship between the first code block and the second code block meets the preset condition, when the characters that correspond to the rate adaptation code block and that are between the characters corresponding to the first code block and the characters corresponding to the second code block are deleted, the characters that correspond to the rate adaptation code block and that are between the characters corresponding to the first code block and the characters corresponding to the second code block may be deleted totally, or may be deleted partially. Therefore, parsing of a received packet on a receive side is not affected by rate adaptation, and flexibility of deleting the rate adaptation code block is improved while reliability of rate adaptation is ensured.

In a possible implementation, before the obtaining a first character stream, the method further includes: obtaining a first code block stream, where the first code block stream includes the first code block, the at least two rate adaptation code blocks, and the second code block that are adjacent to each other; performing code block format and code block sequence check on the first code block stream; if there is a code block whose code block format and/or code block sequence do/does not comply with a rule, replacing, with an E code block, the code block whose code block format and/or code block sequence do/does not comply with the rule, to obtain an error-corrected first code block stream; and decoding the error-corrected first code block stream to obtain the first character stream. Certainly, the E code block used for replacement herein is merely an example, and imposes no limitation. In actual implementation, another code block may be used for replacement, for example, a self-defined code block.

In a possible implementation, the decoding the error-corrected first code block stream includes: decoding a code block other than a preset code block in the error-corrected first code block stream, where the preset code block includes an O code block.

In a possible implementation, the first code block is a T code block or a code block after the T code block, and the T code block is a frame termination code block; and the second code block is an S code block or a code block before the S code block, and the S code block is a frame start code block.

In a possible implementation, the preset condition includes: the code block relationship between the first code block and the second code block is not any one of the following code block relationships: a T code block and a T code block, a T code block and a D code block, a T code block and an E code block, a D code block and an S code block, and an E code block and an S code block; and/or the code block relationship between the first code block and the second code block is any one of the following code block relationships: a T code block and an interpacket gap IPG code block, an IPG code block and an S code block, a T code block and an S code block, and an IPG code block and an IPG code block, where the IPG code block includes one or more of an idle (IDLE) code block, an O code block, an E code block, or a D code block.

According to an eighth aspect, a rate adaptation method is provided, including: obtaining a first character stream, where the first character stream includes characters corresponding to a first code block, characters corresponding to a rate adaptation code block, and characters corresponding to a second code block, where the first code block, the rate adaptation code block, and the second code block are adjacent to each other; determining whether a code block relationship between the first code block and the second code block meets a preset condition; and when the code block relationship between the first code block and the second code block meets the preset condition and a rate adaptation requirement exists, deleting the characters corresponding to the rate adaptation code block.

In this embodiment of this application, when rate adaptation is performed by using a character as a granularity, if characters corresponding to only one rate adaptation code block exist between the characters corresponding to the first code block and the characters corresponding to the second code block, the characters that correspond to the rate adaptation code block and that are between the characters corresponding to the first code block and the characters corresponding to the second code block can be deleted only when the code block relationship between the first code block and the second code block meets the preset condition. In this way, the characters corresponding to the first code block and the characters corresponding to the second code block may be prevented from being adjacent to each other after deletion, that is, a code block combination that may cause an error in packet receiving and parsing may be avoided, so that it can be ensured that parsing of a received packet on a receive side is not affected by rate adaptation, and reliability of rate adaptation is improved.

In a possible implementation, before the obtaining a first character stream, the method further includes: obtaining a first code block stream, where the first code block stream includes the first code block, the rate adaptation code block, and the second code block that are adjacent to each other; performing code block format and code block sequence check on the first code block stream; if there is a code block whose code block format and/or code block sequence do/does not comply with a rule, replacing, with an E code block, the code block whose code block format and/or code block sequence do/does not comply with the rule, to obtain an error-corrected first code block stream; and decoding the error-corrected first code block stream to obtain the first character stream. Certainly, the E code block used for replacement herein is merely an example, and imposes no limitation. In actual implementation, another code block may be used for replacement, for example, a self-defined code block.

In a possible implementation, the decoding the error-corrected first code block stream includes: decoding a code block other than a preset code block in the error-corrected first code block stream, where the preset code block includes an O code block.

In a possible implementation, the first code block is a T code block or a code block after the T code block, and the T code block is a frame termination code block; and the second code block is an S code block or a code block before the S code block, and the S code block is a frame start code block.

In a possible implementation, the preset condition includes: the code block relationship between the first code block and the second code block is not any one of the following code block relationships: a T code block and a T code block, a T code block and a D code block, a T code block and an E code block, a D code block and an S code block, and an E code block and an S code block; and/or the code block relationship between the first code block and the second code block is any one of the following code block relationships: a T code block and an interpacket gap IPG code block, an IPG code block and an S code block, a T code block and an S code block, and an IPG code block and an IPG code block, where the IPG code block includes one or more of an idle code block, an O code block, an E code block, or a D code block.

According to a ninth aspect, a rate adaptation apparatus is provided, where the apparatus may be a network device, or may be a chip inside the network device, and the apparatus includes a function/module configured to perform the method in any one of the first aspect or the possible implementations of the first aspect.

For example, the apparatus includes:

an obtaining unit, configured to obtain a first code block stream, where the first code block stream includes a first code block and a second code block that are adjacent to each other; and a processing unit, configured to: determine whether a code block relationship between the first code block and the second code block meets a preset condition; and when the code block relationship between the first code block and the second code block meets the preset condition and a rate adaptation requirement exists, insert at least one rate adaptation code block between the first code block and the second code block.

According to a tenth aspect, a rate adaptation apparatus is provided, where the apparatus may be a network device, or may be a chip inside the network device, and the apparatus includes a function/module configured to perform the method in any one of the second aspect or the possible implementations of the second aspect.

For example, the apparatus includes:

an obtaining unit, configured to obtain a first code block stream, where the first code block stream includes a first code block, at least two rate adaptation code blocks, and a second code block that are adjacent to each other; and a processing unit, configured to: determine whether a code block relationship between the first code block and the second code block meets a preset condition; and when the code block relationship between the first code block and the second code block does not meet the preset condition and a rate adaptation requirement exists, delete at least one rate adaptation code block in the at least two rate adaptation code blocks, so that at least one rate adaptation code block is included between the first code block and the second code block after deletion.

According to an eleventh aspect, a rate adaptation apparatus is provided, where the apparatus may be a network device, or may be a chip inside the network device, and the apparatus includes a function/module configured to perform the method in any one of the third aspect or the possible implementations of the third aspect.

For example, the apparatus includes:

an obtaining unit, configured to obtain a first code block stream, where the first code block stream includes a first code block, at least two rate adaptation code blocks, and a second code block that are adjacent to each other; and a processing unit, configured to: determine whether a code block relationship between the first code block and the second code block meets a preset condition; and when the code block relationship between the first code block and the second code block meets the preset condition and a rate adaptation requirement exists, delete at least one rate adaptation code block in the at least two rate adaptation code blocks, so that no rate adaptation code block exists or at least one rate adaptation code block is included between the first code block and the second code block after deletion.

According to a twelfth aspect, a rate adaptation apparatus is provided, where the apparatus may be a network device, or may be a chip inside the network device, and the apparatus includes a function/module configured to perform the method in any one of the fourth aspect or the possible implementations of the fourth aspect.

For example, the apparatus includes:

an obtaining unit, configured to obtain a first code block stream, where the first code block stream includes a first code block, a rate adaptation code block, and a second code block that are adjacent to each other; and a processing unit, configured to: determine whether a code block relationship between the first code block and the second code block meets a preset condition; and when the code block relationship between the first code block and the second code block meets the preset condition and a rate adaptation requirement exists, delete the rate adaptation code block.

According to a thirteenth aspect, a rate adaptation apparatus is provided, where the apparatus may be a network device, or may be a chip inside the network device, and the apparatus includes a function/module configured to perform the method in any one of the fifth aspect or the possible implementations of the fifth aspect.

For example, the apparatus includes:

an obtaining unit, configured to obtain a first character stream, where the first character stream includes characters corresponding to a first code block and characters corresponding to a second code block, and the first code block and the second code block are adjacent to each other; and a processing unit, configured to: determine whether a code block relationship between the first code block and the second code block meets a preset condition; and when the code block relationship between the first code block and the second code block meets the preset condition and a rate adaptation requirement exists, insert characters corresponding to at least one rate adaptation code block between the characters corresponding to the first code block and the characters corresponding to the second code block.

According to a fourteenth aspect, a rate adaptation apparatus is provided, where the apparatus may be a network device, or may be a chip inside the network device, and the apparatus includes a function/module configured to perform the method in any one of the sixth aspect or the possible implementations of the sixth aspect.

For example, the apparatus includes:

an obtaining unit, configured to obtain a first character stream, where the first character stream includes characters corresponding to a first code block, characters corresponding to at least two rate adaptation code blocks, and characters corresponding to a second code block, and the first code block, the at least two rate adaptation code blocks, and the second code block are adjacent to each other; and a processing unit, configured to: determine whether a code block relationship between the first code block and the second code block meets a preset condition; and when the code block relationship between the first code block and the second code block does not meet the preset condition and a rate adaptation requirement exists, delete characters that correspond to at least one rate adaptation code block and that are in the characters corresponding to the at least two rate adaptation code blocks, so that characters corresponding to at least one rate adaptation code block are included between the characters corresponding to the first code block and the characters corresponding to the second code block after deletion.

According to a fifteenth aspect, a rate adaptation apparatus is provided, where the apparatus may be a network device, or may be a chip inside the network device, and the apparatus includes a function/module configured to perform the method in any one of the seventh aspect or the possible implementations of the seventh aspect.

For example, the apparatus includes:

an obtaining unit, configured to obtain a first character stream, where the first character stream includes characters corresponding to a first code block, characters corresponding to at least two rate adaptation code blocks, and characters corresponding to a second code block, and the first code block, the at least two rate adaptation code blocks, and the second code block are adjacent to each other; and a processing unit, configured to: determine whether a code block relationship between the first code block and the second code block meets a preset condition; and when the code block relationship between the first code block and the second code block meets the preset condition and a rate adaptation requirement exists, delete characters that correspond to at least one rate adaptation code block and that are in the characters corresponding to the at least two rate adaptation code blocks, so that characters corresponding to a rate adaptation code block do not exist or characters corresponding to at least one rate adaptation code block are included between the characters corresponding to the first code block and the characters corresponding to the second code block after deletion.

According to a sixteenth aspect, a rate adaptation apparatus is provided, where the apparatus may be a network device, or may be a chip inside the network device, and the apparatus includes a function/module configured to perform the method in any one of the eighth aspect or the possible implementations of the eighth aspect.

For example, the apparatus includes:

an obtaining unit, configured to obtain a first character stream, where the first code block stream includes characters corresponding to a first code block, characters corresponding to a rate adaptation code block, and characters corresponding to a second code block, and the first code block, the rate adaptation code block, and the second code block are adjacent to each other; and a processing unit, configured to: determine whether a code block relationship between the first code block and the second code block meets a preset condition; and when the code block relationship between the first code block and the second code block meets the preset condition and a rate adaptation requirement exists, delete the characters corresponding to the rate adaptation code block.

According to a seventeenth aspect, a network device is provided, including at least one processor, where the at least one processor executes instructions stored in a memory, so that the network device performs the method in any one of the possible implementations of the first aspect to the eighth aspect.

Optionally, the memory is located outside the network device.

Optionally, the apparatus includes the memory, the memory is connected to the at least one processor, and the memory stores instructions capable of being executed by the at least one processor.

According to an eighteenth aspect, a computer-readable storage medium is provided, including a program or instructions, where when the program or the instructions is/are run on a computer, the method in any one of the possible implementations of the first aspect to the eighth aspect is performed.

According to a nineteenth aspect, a chip is provided, where the chip is coupled to a memory, and is configured to read and execute program instructions stored in the memory, so that the method in any one of the possible implementations of the first aspect to the eighth aspect is performed.

According to a twentieth aspect, a computer program product is provided, including instructions, where when the computer program product is run on a computer, the method in any one of the possible implementations of the first aspect to the eighth aspect is performed.

BRIEF DESCRIPTION OF DRAWINGS

FIG. 2 is an example schematic diagram of a structure of a code block in a 64B/66B encoding format;

FIG. 6A-1 and FIG. 6A-2 are example schematic diagrams of a structure of a transmit state machine;

FIG. 6B-1 and FIG. 6B-2 are example schematic diagrams of a structure of a receive state machine;

FIG. 14 is an example schematic diagram of a first code block, at least two rate adaptation code blocks, and a second code block that are adjacent to each other;

FIG. 15 is an example flowchart of another rate adaptation method according to an embodiment of this application;

FIG. 17 is an example flowchart of another rate adaptation method according to an embodiment of this application;

FIG. 18 is an example flowchart of another rate adaptation method according to an embodiment of this application;

FIG. 19 is an example schematic diagram of a structure of a rate adaptation apparatus 1900 according to an embodiment of this application;

DESCRIPTION OF EMBODIMENTS

Figure 1:
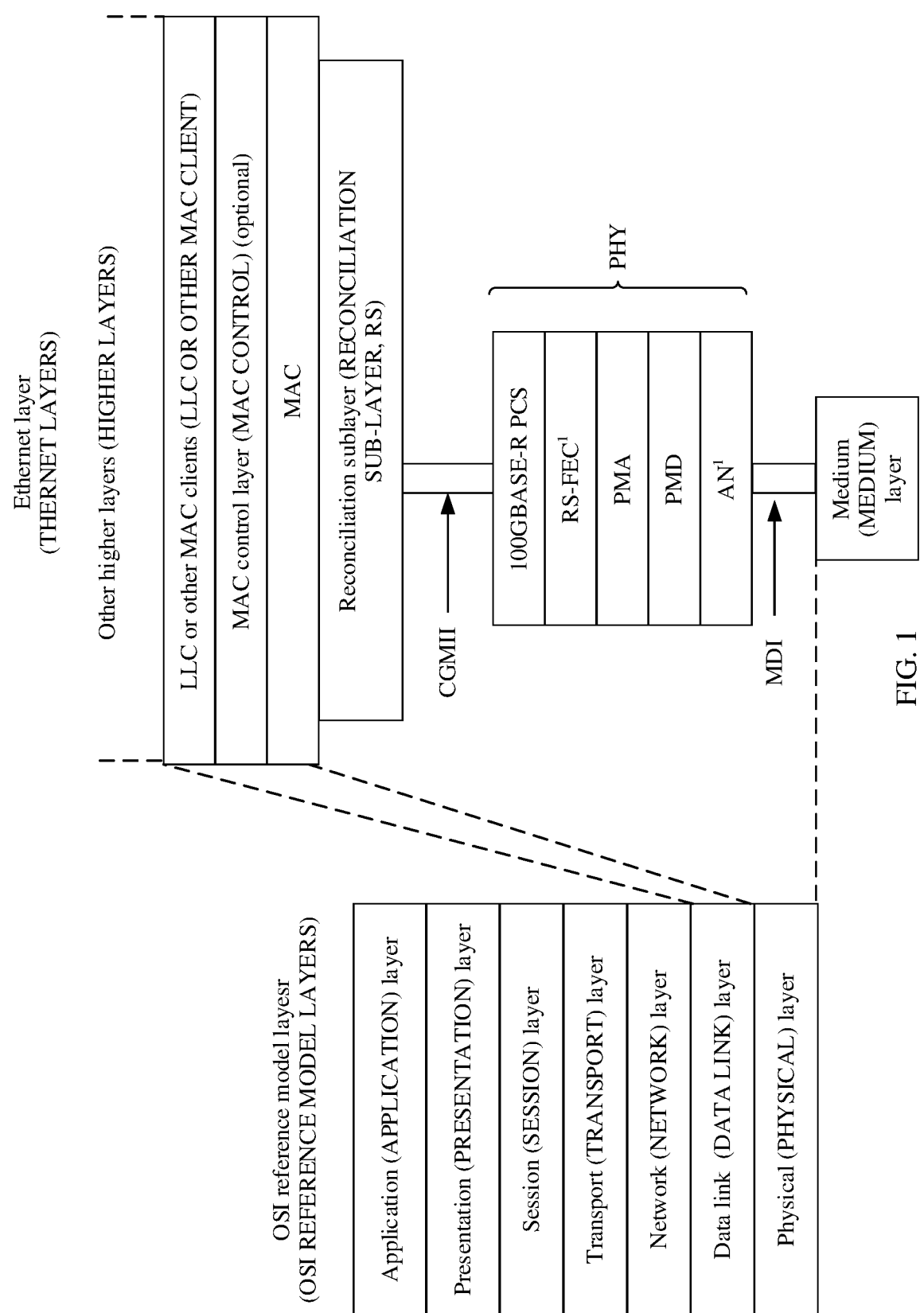
FIG. 1 is an example schematic diagram of a structure of a 100GBASE-R Ethernet interface.

FIG. 1 is a schematic diagram of a structure of a 100GBASE-R Ethernet interface. As shown in FIG. 1, the interface includes other higher layers (HIGHER LAYERS), a logic link control (LLC) layer, media access control (MAC Control), a media access control (MAC) layer, a reconciliation sublayer (RS), a 100GBASE-R physical coding sublayer (PCS), a Reed Solomon forward error correction (RS-FEC) sublayer, a physical medium attachment (PMA) layer, a physical medium dependent (PMD) layer, auto-negotiation (AN), and a medium.

When the Ethernet interface is designed, it is considered that one MAC data stream is carried on an Ethernet PHY (e.g., physical layer).

Specifically, in a sending direction, a MAC data stream is transmitted by using an interface, is sequentially processed by the MAC, the RS, the PCS, the RS-FEC, the PMA, and the PMD from top to bottom, and is finally reflected as a signal sent to a link medium. A receiving direction is related to an inverse process. A signal is received by the link medium, and is sequentially processed by the PMD, the PMA, the RS-FEC, and the PCS, to finally recover the MAC data stream.

At the FEC layer of the Ethernet, encoding format conversion is performed. In this embodiment of this application, an 64B/66B encoding format is used as an example for description, and another encoding format is also applicable. In this embodiment of this application, a related attribute of a code block is defined in a standard, a code block that matches the related attribute that is of the code block and that is defined in the standard is referred to as a valid code block, and a code block that does not match the related attribute that is of the code block and that is defined in the standard is referred to as an invalid code block. The code block may include a plurality of related attributes such as a structure form of the code block and a location relationship of the code block.

Figures 1, 6A:
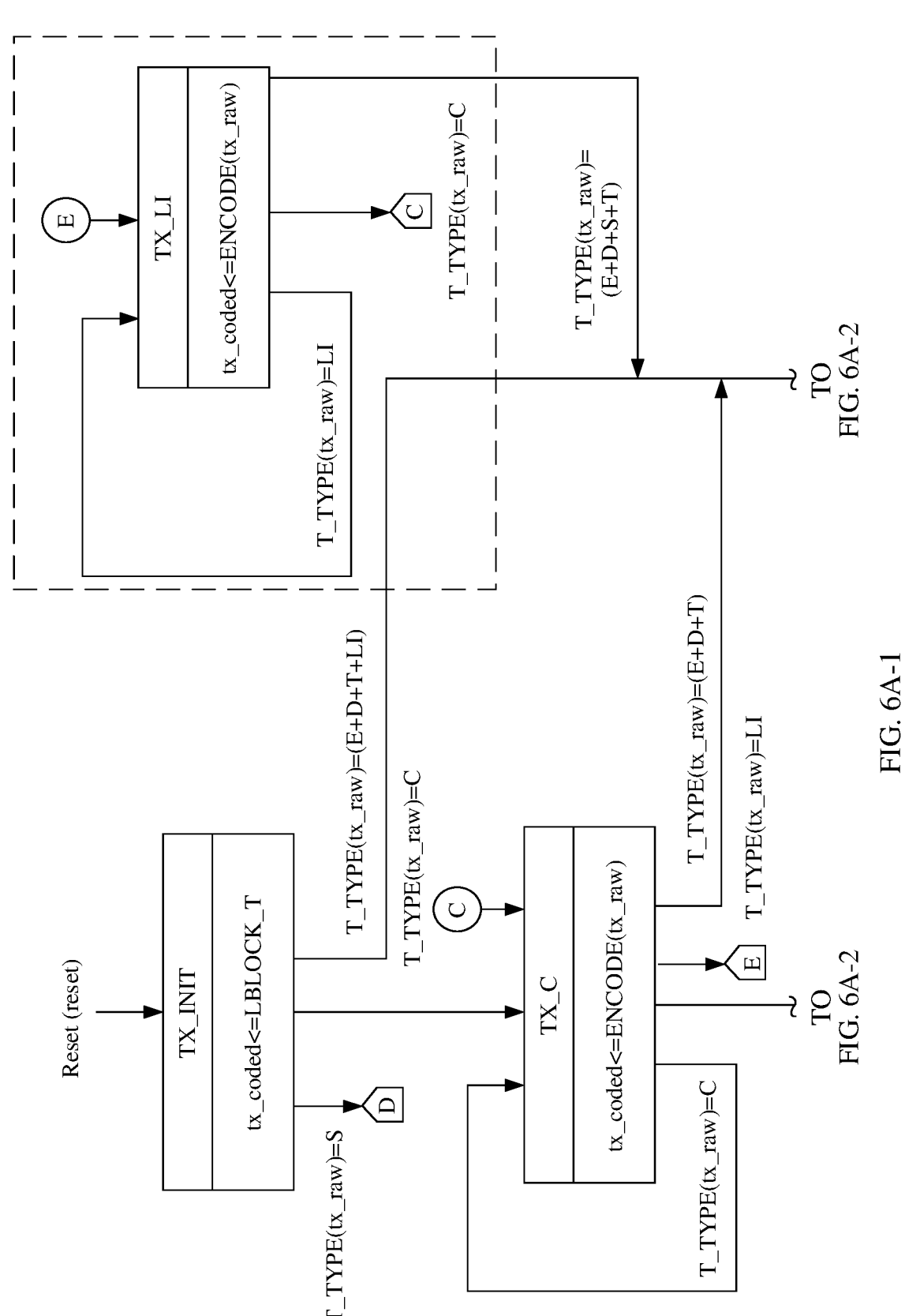
Figures 2, 6A:
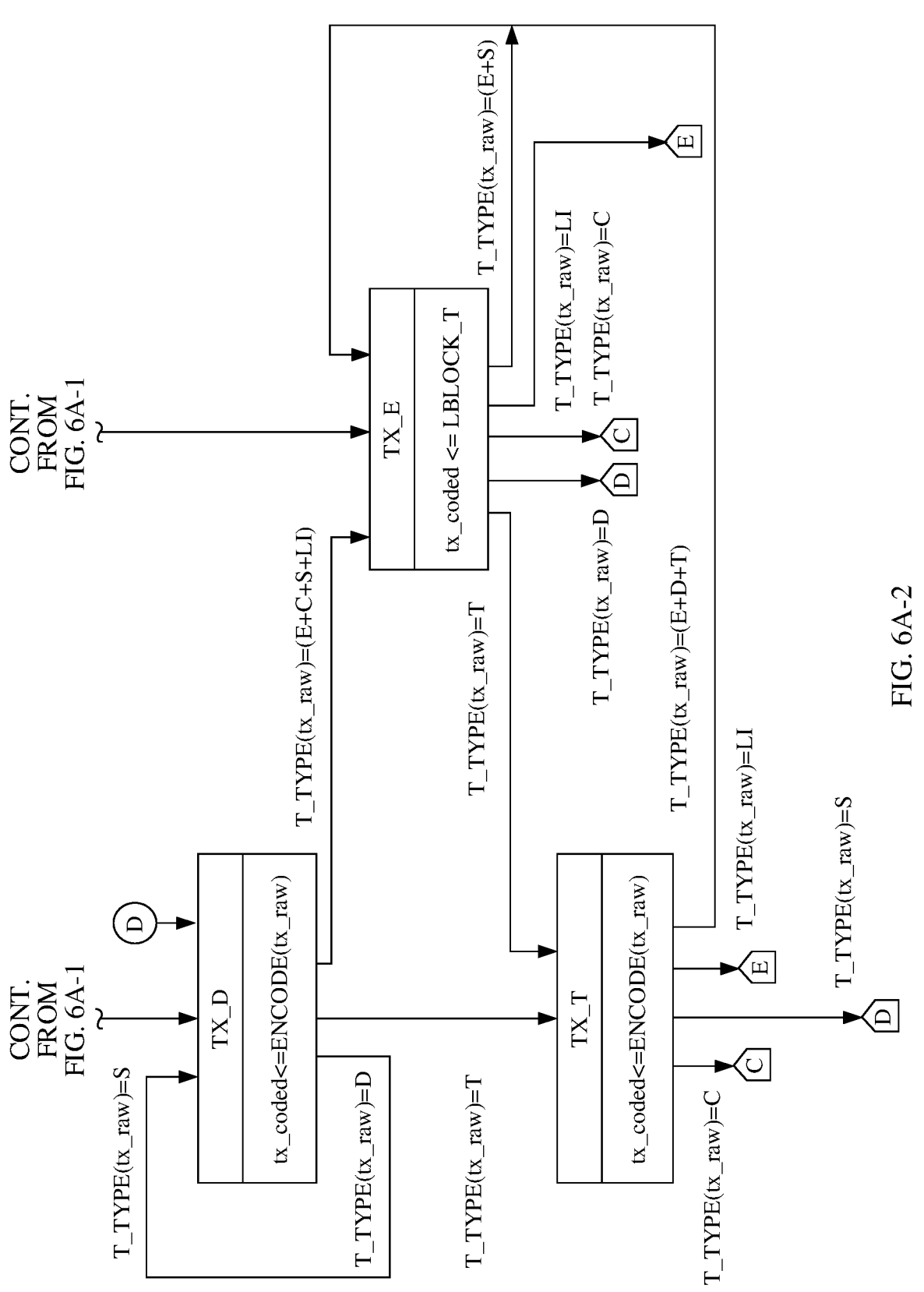

FIG. 2 is a schematic diagram of a structure of a code block in a 64B/66B encoding format defined in a standard. As shown in FIG. 2, the code block is defined in an IEEE Std 802.3-2018.IEEE Standard for Ethernet SECTION SIX standard, where 64B, namely, eight 8B (bit) characters, is used as encoding input, and 66B is used as encoding output. As shown in FIG. 2, a synchronization header area of the code block includes the $0^{th}$ bit and the $1^{st}$ bit of the code block. The synchronization header area of the code block has two cases: 01 and 10. A code block whose synchronization header is 01 is referred to as a data code block, and the data code block may be written as a D code block. A code block whose synchronization header is 10 is referred to as a control code block. A field D0 of the control code block occupies 8 bits, and may be referred to as a type field of the control code block.

When data is sent from the RS layer to the PCS coding sublayer, rate adaptation needs to be performed because there is a rate difference between the MAC layer and the PHY layer.

Figures 3, 4, 5A, 5B:
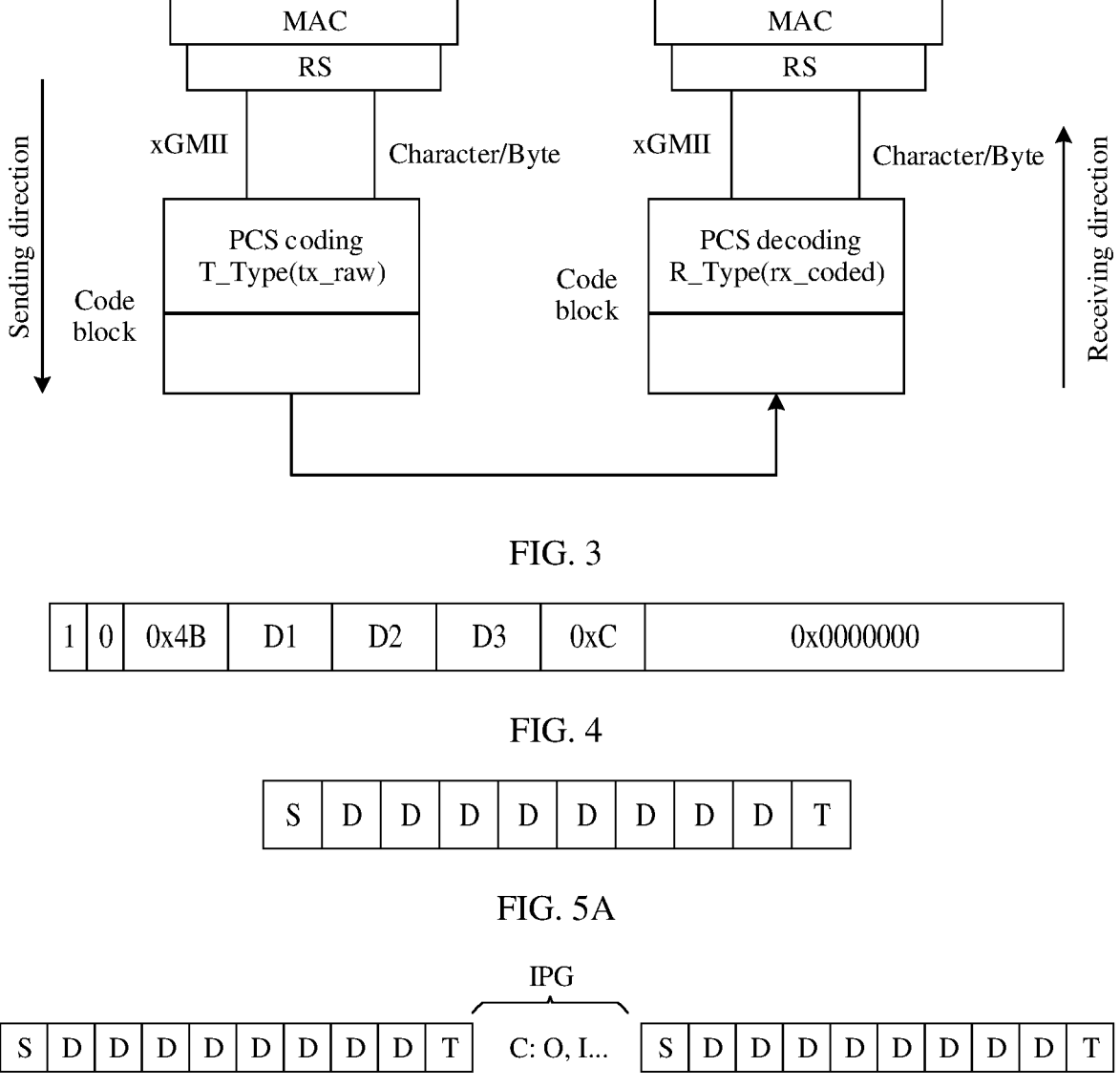
FIG. 3 is an example schematic diagram of Ethernet rate adaptation.
FIG. 4 is an example schematic diagram of an O code block.
FIG. 5A is an example schematic diagram of a valid code block sequence.
FIG. 5B is an example schematic diagram of an inter-packet gap (Inter Packet Gap, IPG)

FIG. 3 is a schematic diagram of Ethernet rate adaptation. Ethernet rate adaptation is performed based on a character/byte (character/octet).

The left of FIG. 3 shows a rate adaptation operation in a sending direction. After characters are sent from the RS to the PCS, a T_TYPE function is used inside the PCS to perform format and sequence check before encoding on every eight characters. The characters need to comply with a specified rule.

For example, for a control (C) code block, eight characters need to include a valid control character such as any valid control character other than control characters such as /O/, /S/, /T/, /LI/, and/E/, or a control (C) code block is a valid O code block (ordered set).

The O code block is a special control code block. As shown in FIG. 4, on XLGMII/CGMII, the O code block includes one control character, three data characters, and four zero data characters. It should be understood that in FIG. 4, a value of a block type of the O code block is 0x4B, and a field O code is 0xC. This is merely an example, and imposes no limitation. In actual implementation, another value may exist.

For example, for a start(S) code block, the first character in eight characters needs to be /S/, and the next seven characters need be data characters (data characters). For a termination (T) code block, one character in the eight characters needs to be a /T/ character, a character before the /T/ character needs to be a data character, and a character after the /T/ character needs to be a character other than /O/, /S/, and/T/.

For example, for a low-power indication (LI) code block, all eight characters need to be /LI/ characters. When rate adaptation needs to be performed, the PCS performs an addition or deletion operation by using eight idle characters as a group. The addition or deletion operation is performed in an interpacket gap (IPG), that is, cannot be performed in the middle of a packet.

After rate adaptation, a PCS encode function is used to encode data with eight characters as a group into a 64B/66B code block, and performs corresponding code block sequence check based on a transmit state machine. Normally, for example, as shown in FIG. 5A, a valid code block sequence corresponding to one piece of packet data is SDDDDD . . . T, and a quantity of D code blocks is not limited.

As shown in FIG. 5B, there is a gap between encoding sequences of adjacent packets, and the gap is an IPG. In the IPG, there are generally some control code blocks such as an idle code block and an O code block.

FIG. 6A-1 and FIG. 6A-2 are schematic diagrams of a structure of a transmit state machine. As shown in FIG. 6A-1 and FIG. 6A-2, during sending, starting from an initial state, the PCS performs encoding by using every received eight characters as a group, and performs character format and sequence check. When a code block sequence that does not comply with a rule occurs, a corresponding code block is replaced with an error (E) code block.

The right of FIG. 3 shows a rate adaptation operation in a receiving direction. After receiving a code block obtained through 64B/66B encoding, the PCS performs code block format check by using an R_TYPE function, and performs sequence check by using a receive state machine. When a code block format or a code block sequence that does not comply with a rule occurs, a corresponding code block is replaced with an E code block. Then, the 64B/66B code block is decoded into eight characters by using a PCS decode function. Before sending the characters upward to the RS, the PCS performs rate adaptation based on a rate difference between the PHY and the MAC.

Figures 1, 6B:
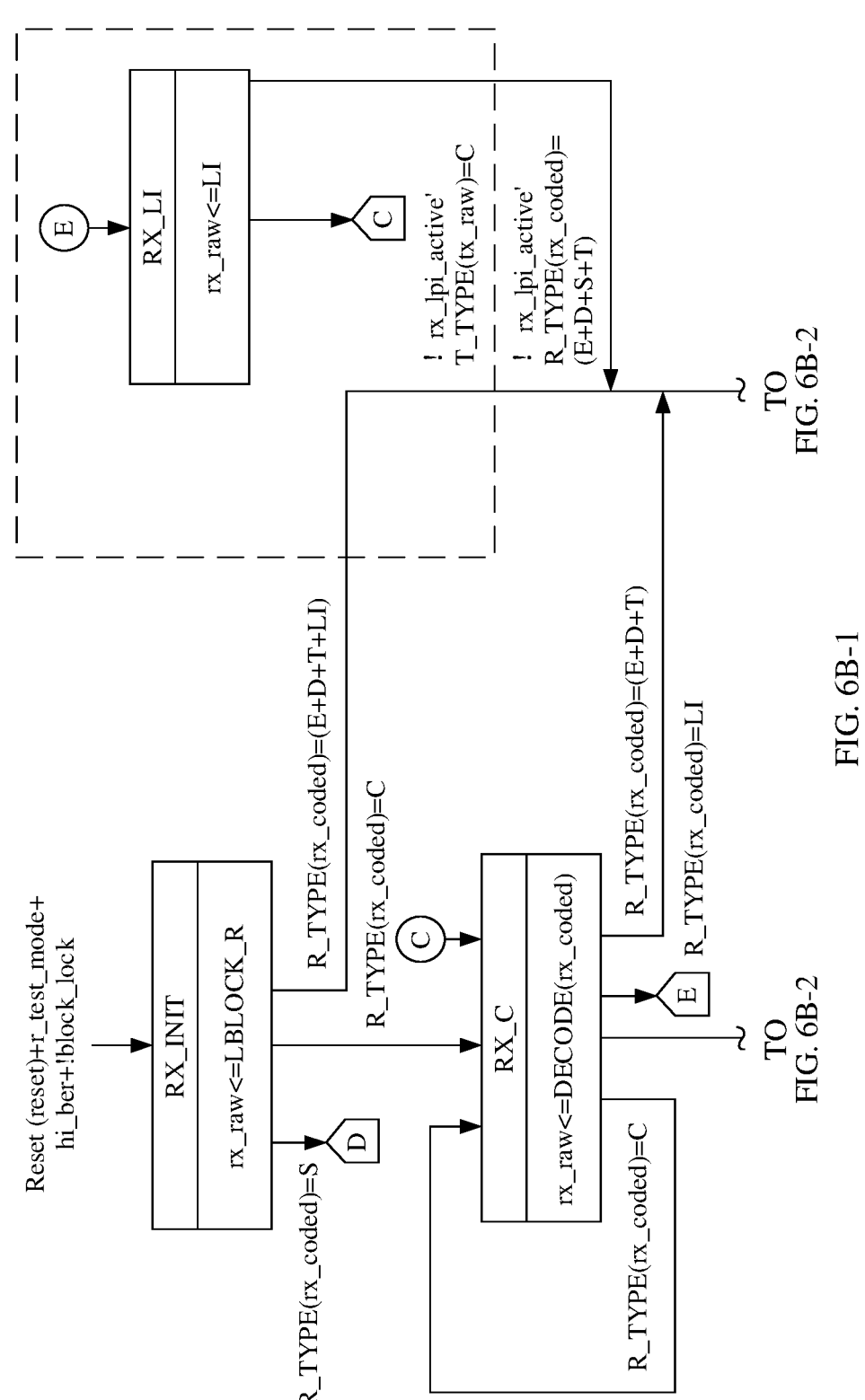
Figures 2, 6B:
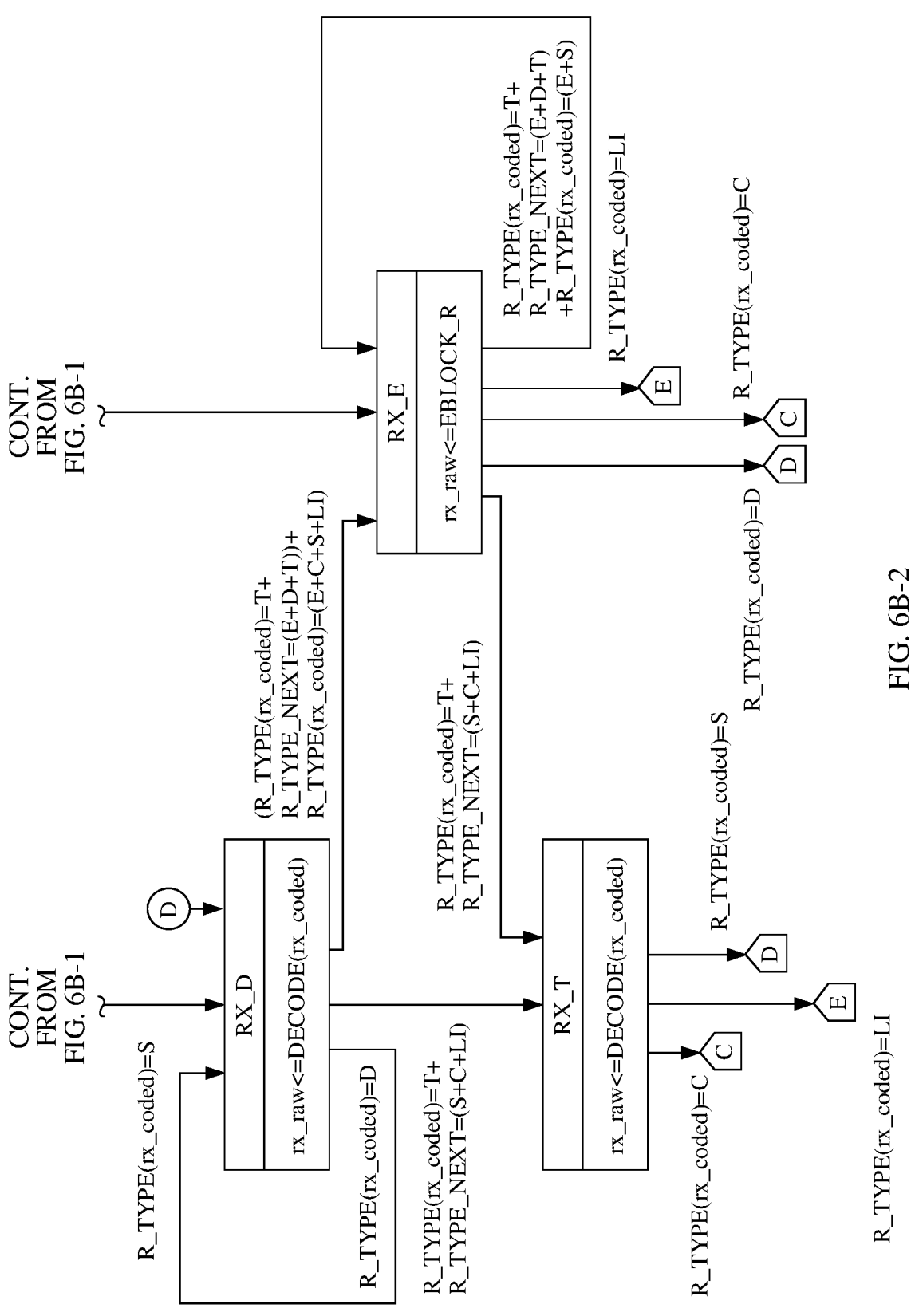

FIG. 6B-1 and FIG. 6B-2 are schematic diagrams of a structure of a receive state machine. As shown in FIG. 6B-1 and FIG. 6B-2, during receiving, starting from an initial state, the PCS performs character format and sequence check based on each received code block. When a code block sequence that does not comply with a rule occurs, a corresponding code block is replaced with an E code block. Then, a decoding operation is performed.

In addition, when alignment needs to be performed on an S code block, that is, when 8B alignment is performed on the first byte (B) of a preamble, an idle character also needs to be added or deleted.

Figure 7:
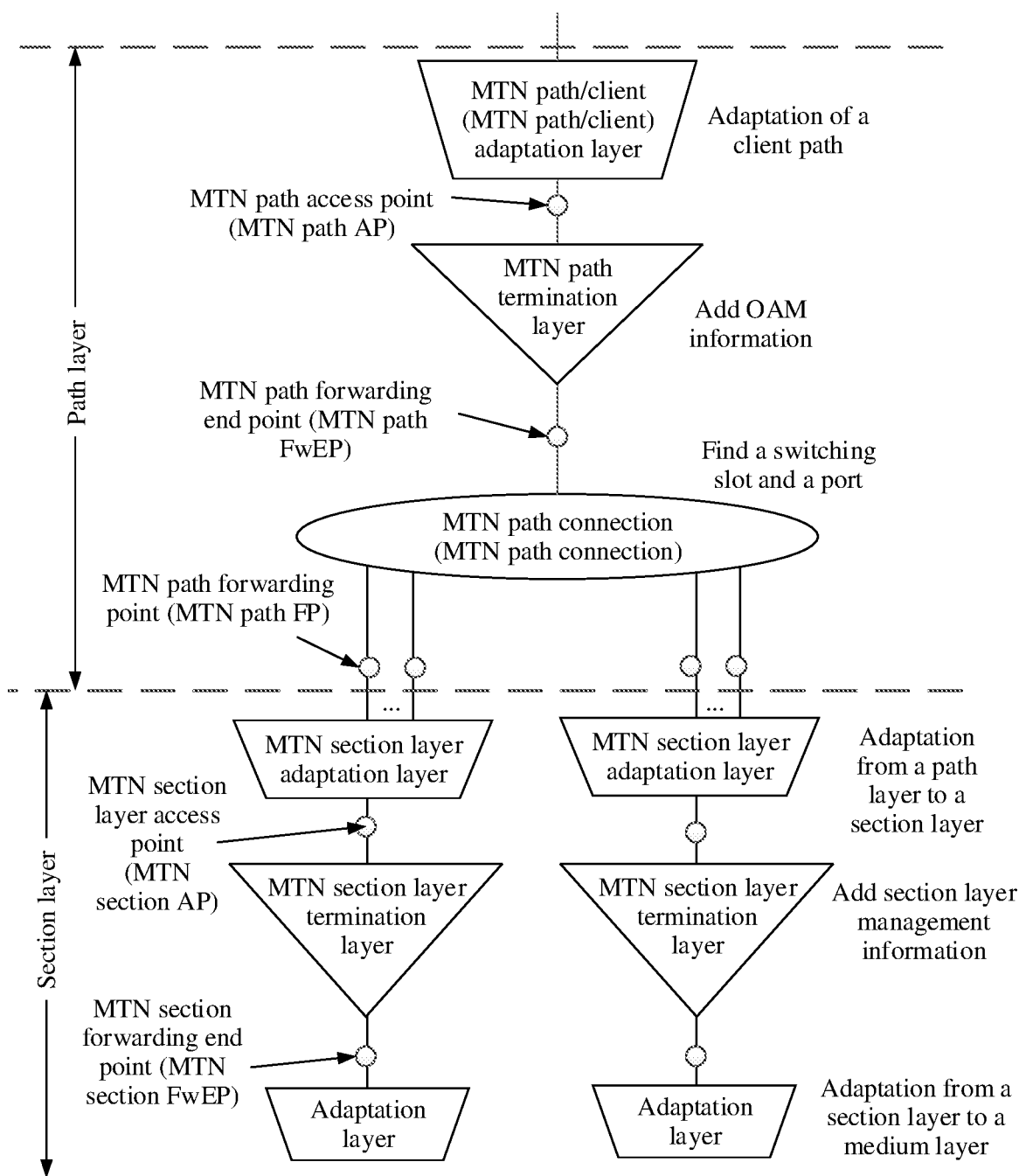
FIG. 7 is an example schematic diagram of a structure of a metro transport network (MTN)

FIG. 7 is a schematic diagram of a structure of a metro transport network (MTN). As shown in FIG. 7, an MTN technology mainly includes two layers: a path layer and a section layer. FIG. 7 shows a representation style of the international telecommunication union-telecommunication standardization sector (ITU-T). It should be noted that an ellipse part in FIG. 7 is a location at which layer 1.5 forwarding is performed, that is, a correspondence between an egress port and an ingress port is found at this location, so that an egress port is found. An inverted trapezoid below the ellipse is a function of adaptation from the path layer to the section layer. MAC data streams (in a form of a 64B/66B code block stream) at this location are interleaved into one 64B/66B code block stream.

Figure 8:
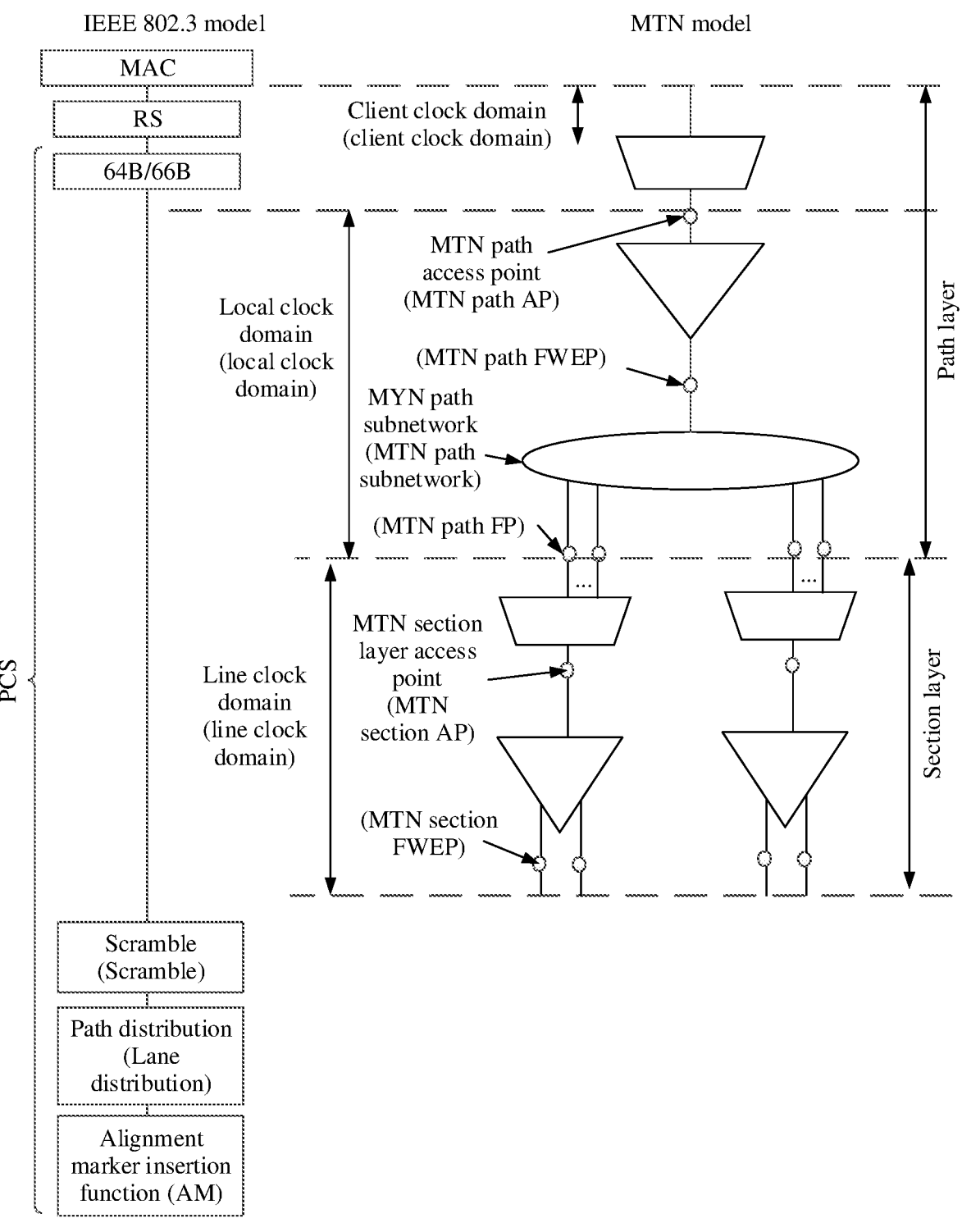
FIG. 8 is an example diagram of a location relationship between an MTN model and an IEEE 802.3 model.

Rate adaptation needs to be performed in a functional module for adaptation from the path layer to the section layer. Because the MTN is a network layer in a code block domain in PCS encode/decode module, as shown in FIG. 8, all data processing units of the MTN are code blocks, or a data processing granularity is a code block.

Figure 9A:
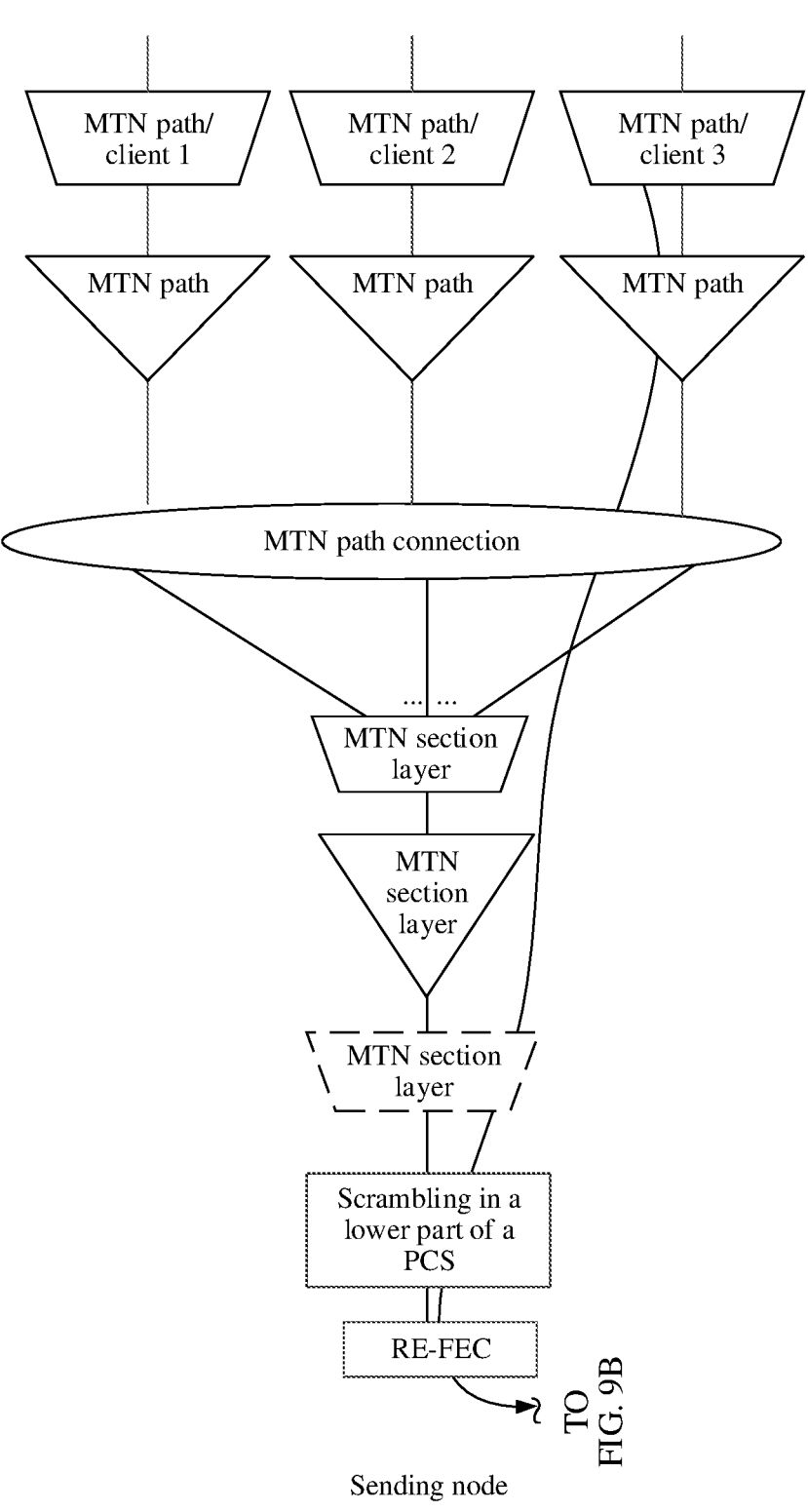
FIG. 9A, FIG. 9B, and FIG. 9C are example schematic diagrams of a network of MTN service stream transmission.
Figure 9B:
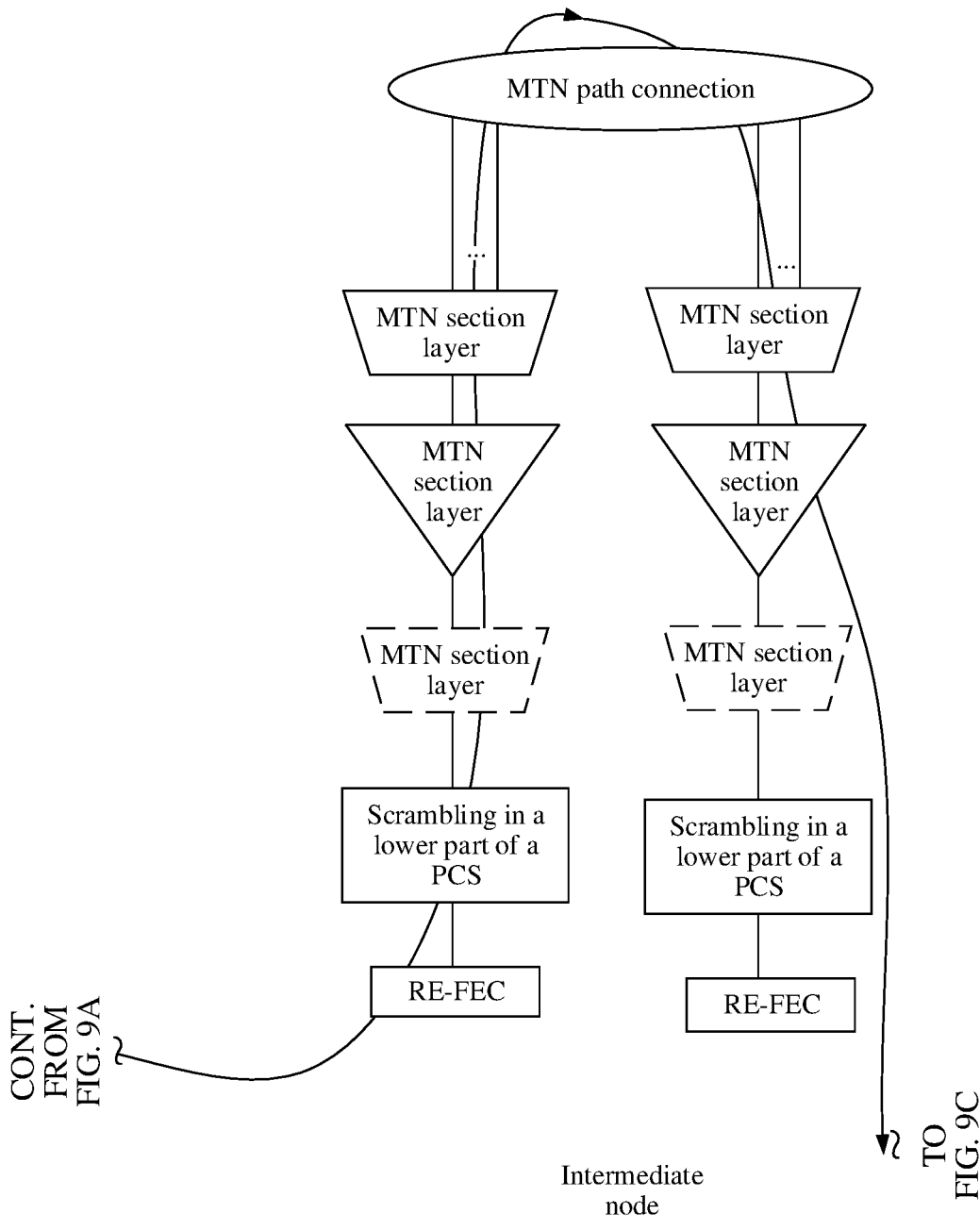
Figure 9C:
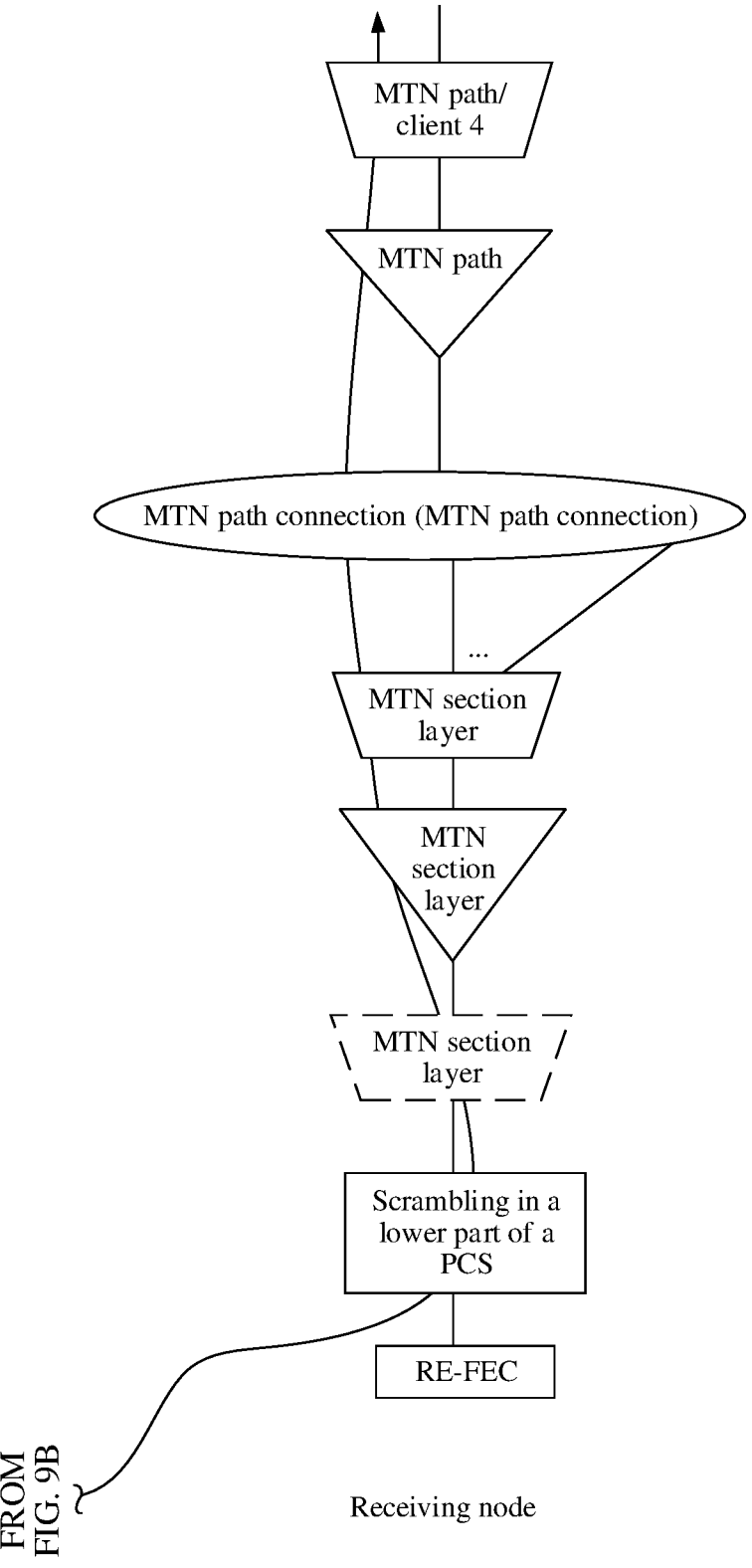

At a sending node, when a path layer service is sent to the section layer, rate adaptation may need to be performed due to a rate difference between the path layer and the section layer. At an intermediate node, rate adaptation also needs to be performed because there may be a rate difference between clock frequencies of an ingress port and an egress port. At a receiving node, when a client service code block stream is sent from the section layer to the path layer, rate adaptation may also need to be performed. FIG. 9A, FIG. 9B, and FIG. 9C are schematic diagrams of layer 1.5 forwarding in an MTN network. For the intermediate node, after a code block stream flows in from one port and flows upward to arrive at an MTN path connection layer, namely, a layer 1.5 (an ellipse in FIG. 9A, FIG. 9B, and FIG. 9C represents the MTN path connection layer), the code block stream is not transmitted upward, but is sent by using another port.

In specific implementation, the MTN network may generally perform rate adaptation in a first in first out (FIFO) form of a buffer.

In a specific implementation method, a waterline is set based on a depth of the buffer. When a current data amount in the buffer is higher than the specified waterline because a rate at which a current data stream enters the buffer is excessively large, an incoming idle code block is deleted. When the data amount in the buffer is lower than the waterline because the rate is excessively small, an idle code block is inserted.

However, in this method, a relationship between a location at which idle addition/deletion is performed for rate adaptation and a code block corresponding to packet data is ignored. If the code block is inserted in the middle of a packet, customer service data is affected. In addition, packet parsing of a sink is also affected. For example, a correct packet is originally sent. Because idle addition/deletion is performed for rate adaptation before the packet arrives at the sink, the correct packet is parsed as an error packet.

In another specific implementation method, complete packet processing is performed on a basis of using a FIFO waterline of a buffer, that is, during rate adaptation, a boundary of a packet is identified, and an idle code block is added or deleted after a T code block for rate adaptation.

Compared with the previous method, in the method, the idle code block may be prevented from being inserted or deleted in the middle of a packet. However, in the method, the idle code block is added or deleted provided that a T code block occurs. If a combination such as a T code block and a T code block, a T code block and a D code block, a T code block and an E code block, a D code block and an S code block, and an E code block and an S code block occurs after the T code block, namely, at an IPG location, and the idle code block is inserted or deleted in the middle of any one of the combinations, adjacent packets are parsed as error packets by PCS decode, and a code block that causes an error is replaced with an error E code block for processing. Therefore, in the method, there is still a risk that a correct packet is parsed as an error packet by a sink.

The following provides several specific examples.

Figures 10A, 10B, 10C, 10D, 10E:
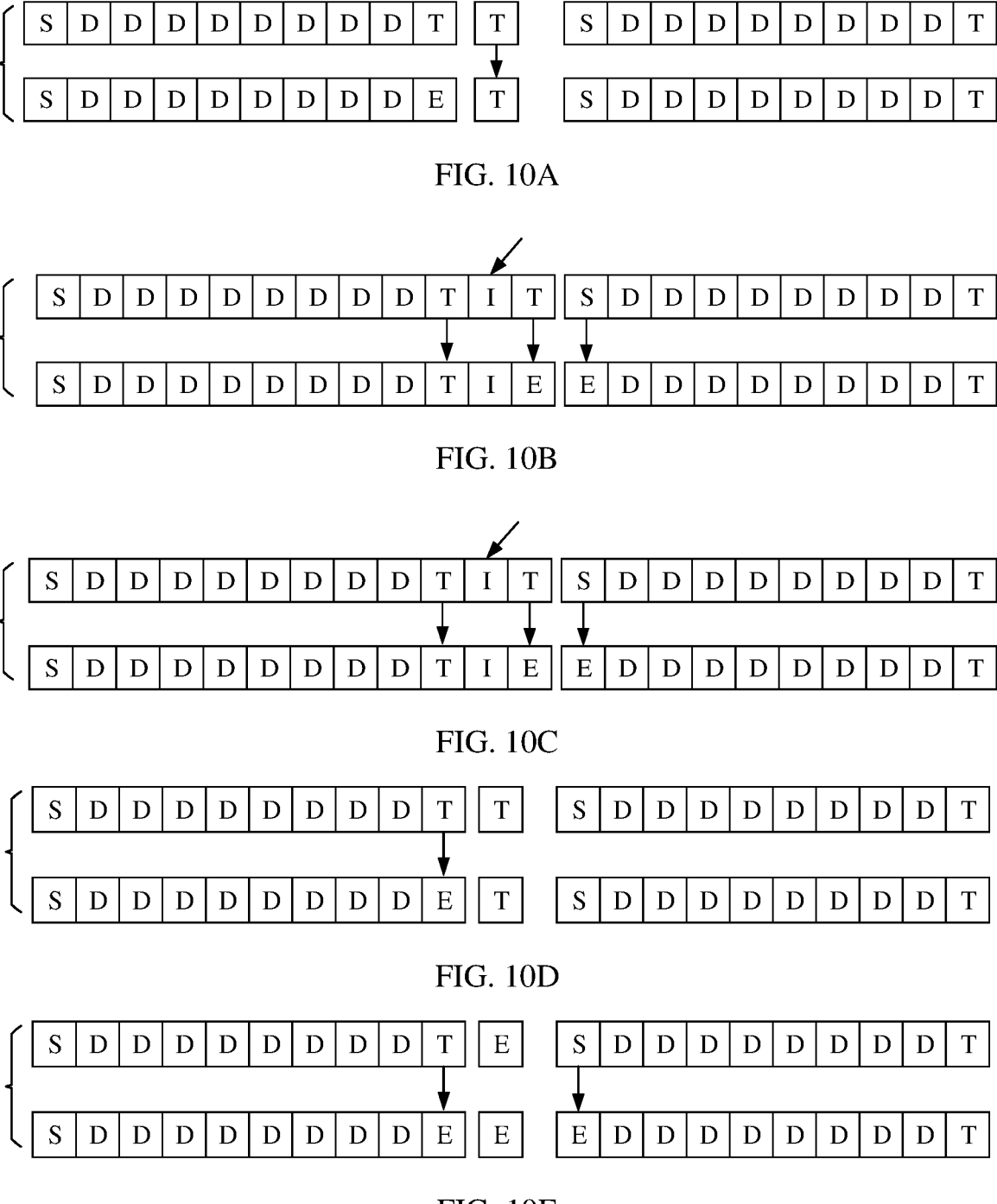
FIG. 10A to FIG. 10T are example schematic diagrams of an error code block relationship and a result obtained after rate adaptation is performed in the error code block relationship.

Example 1: An Error is Caused by a T Code Block and a T Code Block (1) An Error is Caused by an Improper Idle Insertion Location:

As shown in FIG. 10A, an original code block stream sent by a transmit end is a code block stream in the first row. If idle addition/deletion is not performed in the middle of the code block stream for rate adaptation, the sink performs code block sequence check based on the receive state machine, and a code block stream obtained through parsing is a code block stream in the second row. Because an E code block exists, an error occurs in the initial packet, and is discarded by the MAC when FCS check fails.

As shown in FIG. 10B, if idle insertion is performed between a T code block and a T code block in an original code block stream sent by a transmit end, because insertion is performed between the T code block and the T code block, a relationship between code blocks in the original code block stream is changed, as shown in the first row in FIG. 10B. Consequently, a packet obtained by the sink through parsing after the sink receives the original code block stream is the second packet, and an error occurs in the second packet, as shown in the second row in FIG. 10B. This is not consistent with an actual case in which an error occurs in the initial packet.

(2) An Error is Caused by an Improper Idle Deletion Location:

As shown in FIG. 10C, an original code block stream sent by a transmit end is a code block stream in the first row. When idle deletion is not performed, a state of a packet code block stream received by the sink is parsed as a state in the second row, that is, an error occurs in the second packet.

However, as shown in FIG. 10D, if an idle code block is deleted between a T code block and a T code block in an original code block stream sent by a transmit end, as shown in the first row in FIG. 10D, a packet code block stream received by the sink is parsed as a state in the second row in FIG. 10D, that is, an error occurs in the initial packet. This is not consistent with an actual case in which an error occurs in the second packet.

Example 2: An Error is Caused by a T Code Block and an E Code Block (1) An Error is Caused by an Improper Idle Insertion Location:

As shown in FIG. 10E, an original code block stream sent by a transmit end is a code block stream in the first row. When an idle code block is not inserted for rate adaptation, a state of a packet received and obtained by the sink through parsing is shown in the second row, that is, an error occurs in each of the two packets.

Figures 10F, 10G, 10H, 10I, 10J, 10K:
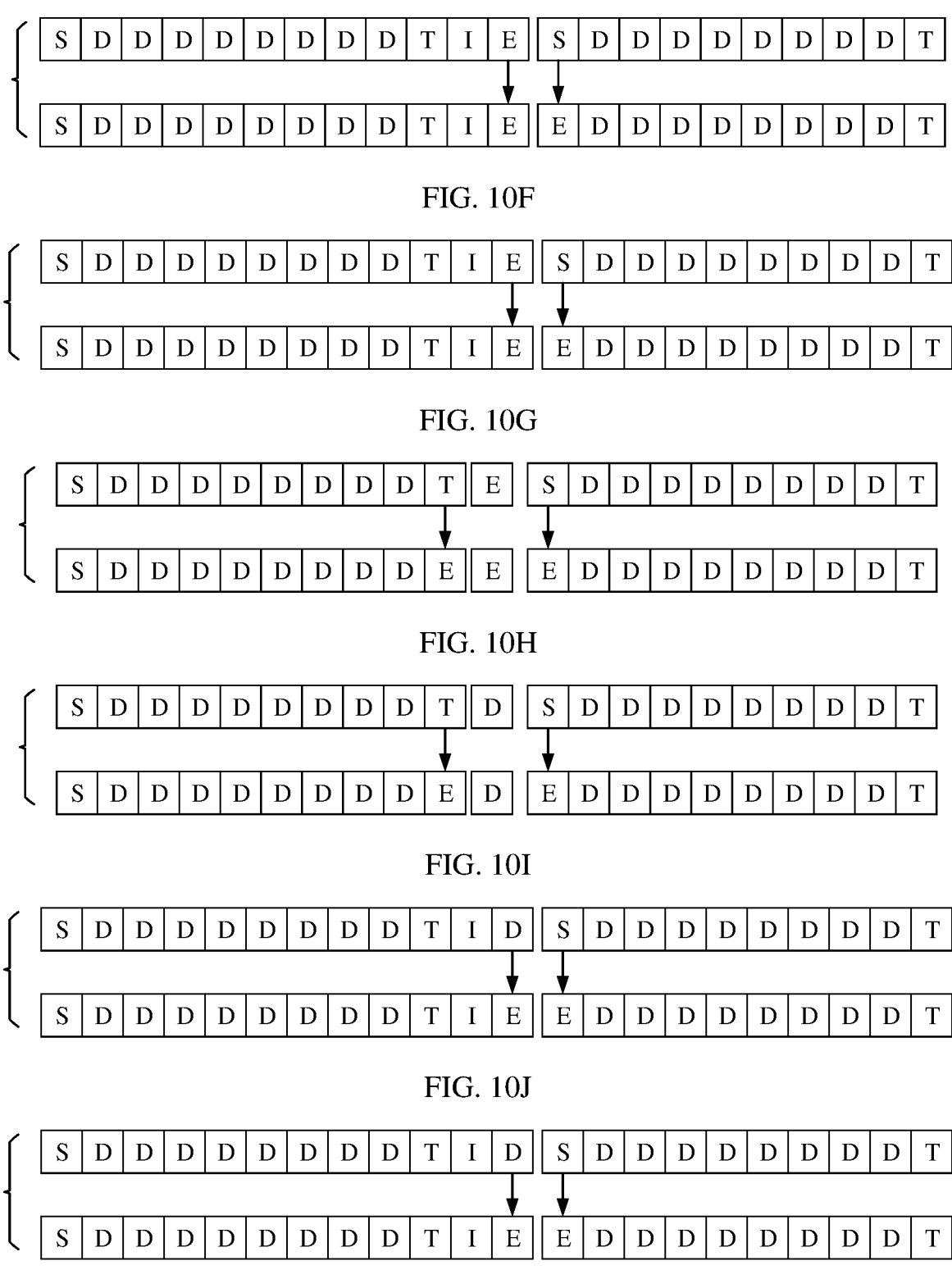

As shown in FIG. 10F, because an idle code block is inserted between a T code block and an E code block in an original code block stream during rate adaptation, a state obtained after the code block is inserted is shown in the first row in FIG. 10F. Consequently, a packet received by the sink is parsed as a state in the second row in FIG. 10F, that is, an error occurs in the second packet. This is not consistent with an actual case in which an error occurs in each of the two packets.

(2) An Error is Caused by an Improper Idle Deletion Location:

As shown in FIG. 10G, an original code block stream sent by a transmit end is a code block stream in the first row. When an idle code block is not deleted for rate adaptation, a state of a packet obtained by the sink through parsing is shown in the second row, that is, an error occurs in the second packet.

As shown in FIG. 10H, when an idle code block is deleted for rate adaptation, a transmit end deletes an idle code block between a T code block and an E code block in an original code block stream, and a state obtained after deletion is shown in the first row in FIG. 10H. In this case, a state of a packet received and obtained by the sink through parsing is shown in the second row in FIG. 10H, that is, an error occurs in each of the two packets.

Example 3: An Error is Caused by a T Code Block and a D Code Block (1) An Error is Caused by an Improper Idle Insertion Location:

As shown in FIG. 10I, an original code block stream sent by a transmit end is a code block stream in the first row. When an idle code block is not inserted for rate adaptation, a state of a packet obtained by the sink through parsing is shown in the second row, that is, an error occurs in each of the two packets.

As shown in FIG. 10J, when an idle code block is inserted for rate adaptation, a transmit end inserts an idle code block between a T code block and a D code block in an original code block stream, as shown in the first row in FIG. 10J. In this case, a state of a packet obtained by the sink through parsing is shown in the second row in FIG. 10J, that is, an error occurs in the second packet. This is not consistent with an actual case in which an error occurs in each of the two packets.

(2) An Error is Caused by an Improper Idle Deletion Location:

As shown in FIG. 10K, an original code block stream sent by a transmit end is a code block stream in the first row. When an idle code block is not deleted for rate adaptation, a state of a packet obtained by the sink through parsing is shown in the second row, that is, an error occurs in the second packet.

Figures 10L, 10M, 10N, 10O, 10P, 10Q:
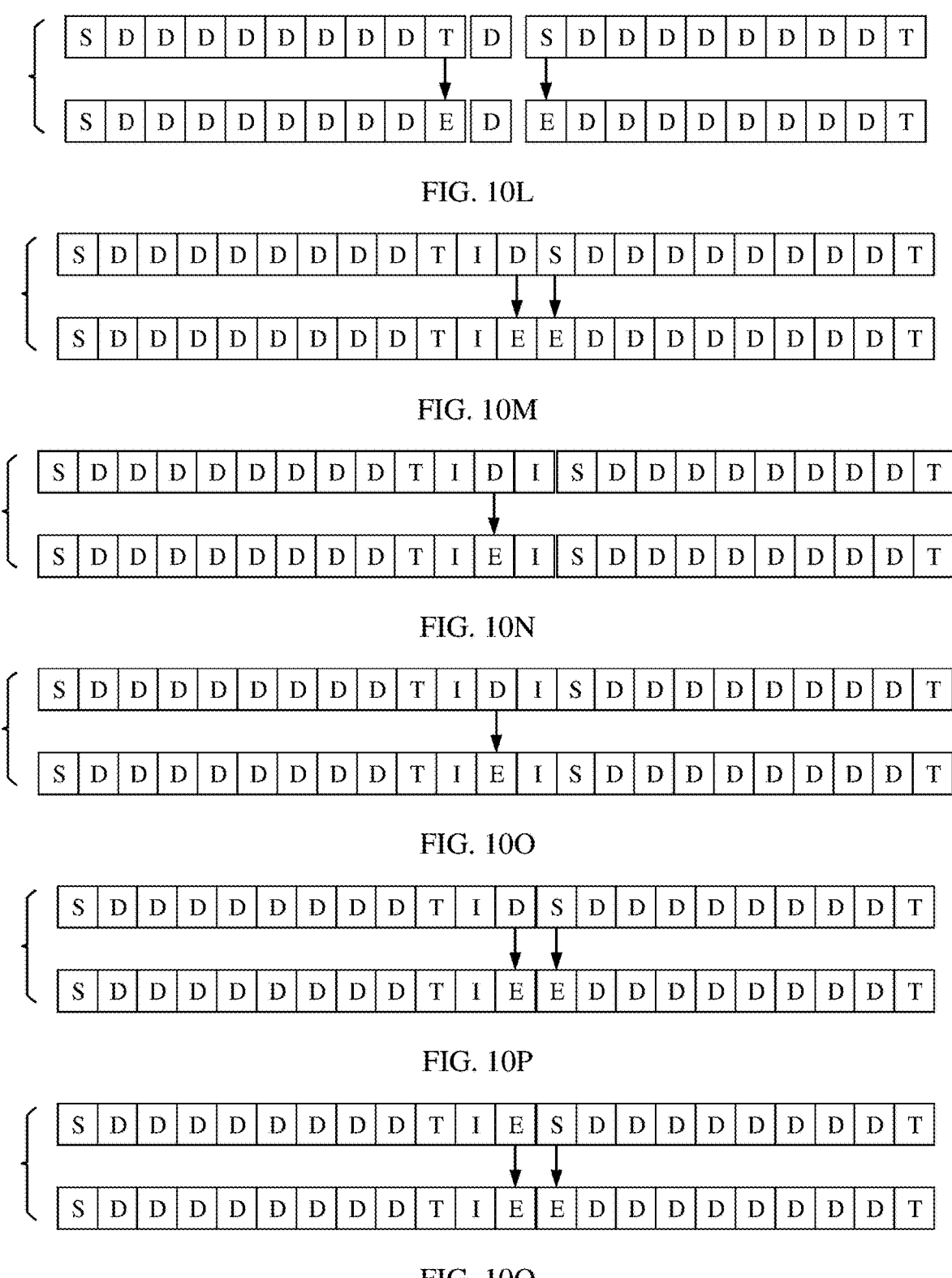

As shown in FIG. 10L, when an idle code block is deleted for rate adaptation, a transmit end deletes an idle code block between a T code block and a D code block in an original code block stream, as shown in the first row in FIG. 10L. In this case, a state of a packet obtained by the sink through parsing is shown in the second row in FIG. 10L, that is, an error occurs in each of the two packets. This is not consistent with an actual case in which an error occurs in the second packet.

Example 4: An Error is Caused by a D Code Block and an S Code Block (1) An Error is Caused by an Improper Idle Insertion Location:

As shown in FIG. 10M, an original code block stream sent by a transmit end is a code block stream in the first row. When an idle code block is not inserted for rate adaptation, a state of a packet obtained by the sink through parsing is shown in the second row, that is, an error occurs in the second packet.

As shown in FIG. 10N, when an idle code block is inserted for rate adaptation, a transmit end inserts an idle code block between a D code block and an S code block in an original code block stream, as shown in the first row in FIG. 10N. In this case, a state of a packet obtained by the sink through parsing is shown in the second row in FIG. 10N, that is, no packet has an error. This is not consistent with an actual case in which an error occurs in the second packet.

(2) An Error is Caused by an Improper Idle Deletion Location:

As shown in FIG. 10O, an original code block stream sent by a transmit end is a code block stream in the first row. When an idle code block is not deleted for rate adaptation, a state of a packet obtained by the sink through parsing is shown in the second row, that is, no packet has an error.

As shown in FIG. 10P, when an idle code block is deleted for rate adaptation, a transmit end deletes an idle code block between a D code block and an S code block in an original code block stream, as shown in the first row in FIG. 10P. In this case, a state of a packet obtained by the sink through parsing is shown in the second row in FIG. 10P, that is, an error occurs in the second packet. This is not consistent with an actual case in which no packet has an error.

Example 5: An Error is Caused by an E Code
Block and an S Code Block (1) An Error is Caused by an Improper Idle Insertion
Location:

As shown in FIG. 10Q, an original code block stream sent
by a transmit end is a code block stream in the first row.
When an idle code block is not inserted for rate adaptation,
a state of a packet obtained by the sink through parsing is
shown in the second row, that is, an error occurs in the
second packet.

Figures 10R, 10S, 10T:
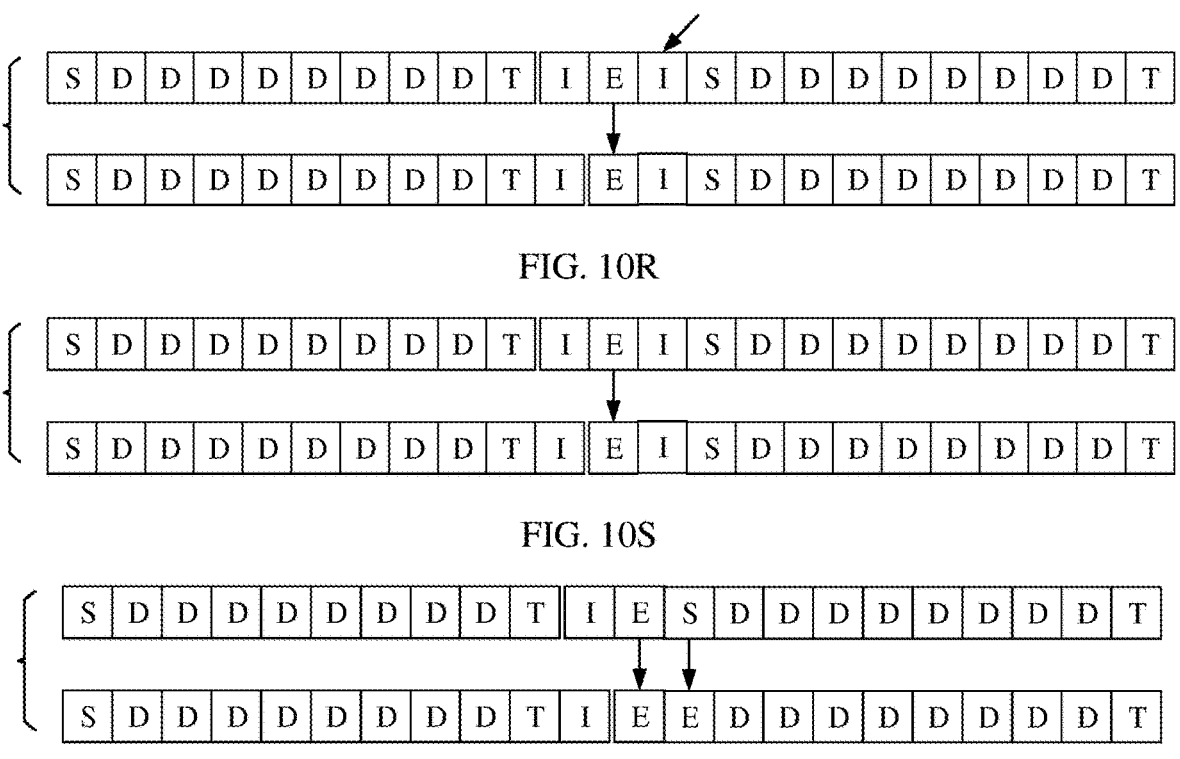

As shown in FIG. 10R, if an idle code block is inserted
between an E code block and an S code block in an original
code block stream sent by a transmit end, the code block
stream is a code block stream in the first row in FIG. 10R.
When an idle code block is inserted for rate adaptation, a
state of a packet obtained by the sink through parsing is
shown in the second row in FIG. 10R, that is, no packet has
an error. This is not consistent with an actual case in which
an error occurs in the second packet. An error occurs in
parsing of the sink.

(2) An Error is Caused by an Improper Idle Deletion
Location:

As shown in FIG. 10S, an original code block stream sent
by a transmit end is a code block stream in the first row.
When an idle code block is not deleted for rate adaptation,
a state of a packet obtained by the sink through parsing is
shown in the second row, that is, no packet has an error.

As shown in FIG. 10T, when an idle code block is deleted
for rate adaptation, an idle code block between an E code
block and an S code block in an original code block stream
sent by a transmit end is deleted. In this case, a code stream
obtained after deletion is in a state in the first row in FIG.
10S, and a state of a packet obtained by the sink through
parsing is shown in the second row in FIG. 10S, that is, an
error occurs in the second packet. This is not consistent with
an actual case in which no packet has an error. An error
occurs in parsing of the sink.

It may be learned that, when the foregoing code block
relationship exists, if an idle code block is added/deleted in
the middle of a code block combination corresponding to the
code block relationship, an original packet format near an
addition/deletion location is misunderstood by the sink as
another packet format, and consequently an error occurs in
packet parsing of the sink.

In view of this, embodiments of this application provide
a rate adaptation solution. When rate adaptation needs to be
performed, a location of a packet is identified, and a code
block relationship/combination that causes an error in packet
receiving and parsing is pre-identified. Therefore, during
rate adaptation, the code block location that may cause an
error in parsing is avoided, and a rate adaptation code block
is inserted or deleted at a correct code block location, so that
it can be ensured that parsing of a packet received by a sink,
namely, a receive side, is not affected by rate adaptation. A
specific solution is described in detail later.

Embodiments of this application are applicable to all
scenarios in which rate adaptation needs to be performed, for
example, may be applied to all existing layer 1.5 technolo-
gies such as a network using a flexible Ethernet (FlexE)
technology, a network using a slicing packet network (SPN)
technology, and an MTN network technology that is cur-
rently being standardized by the ITU-T study group 15 work
party 3 question 11 (SG15 WP3 Q11).

Figure 11:
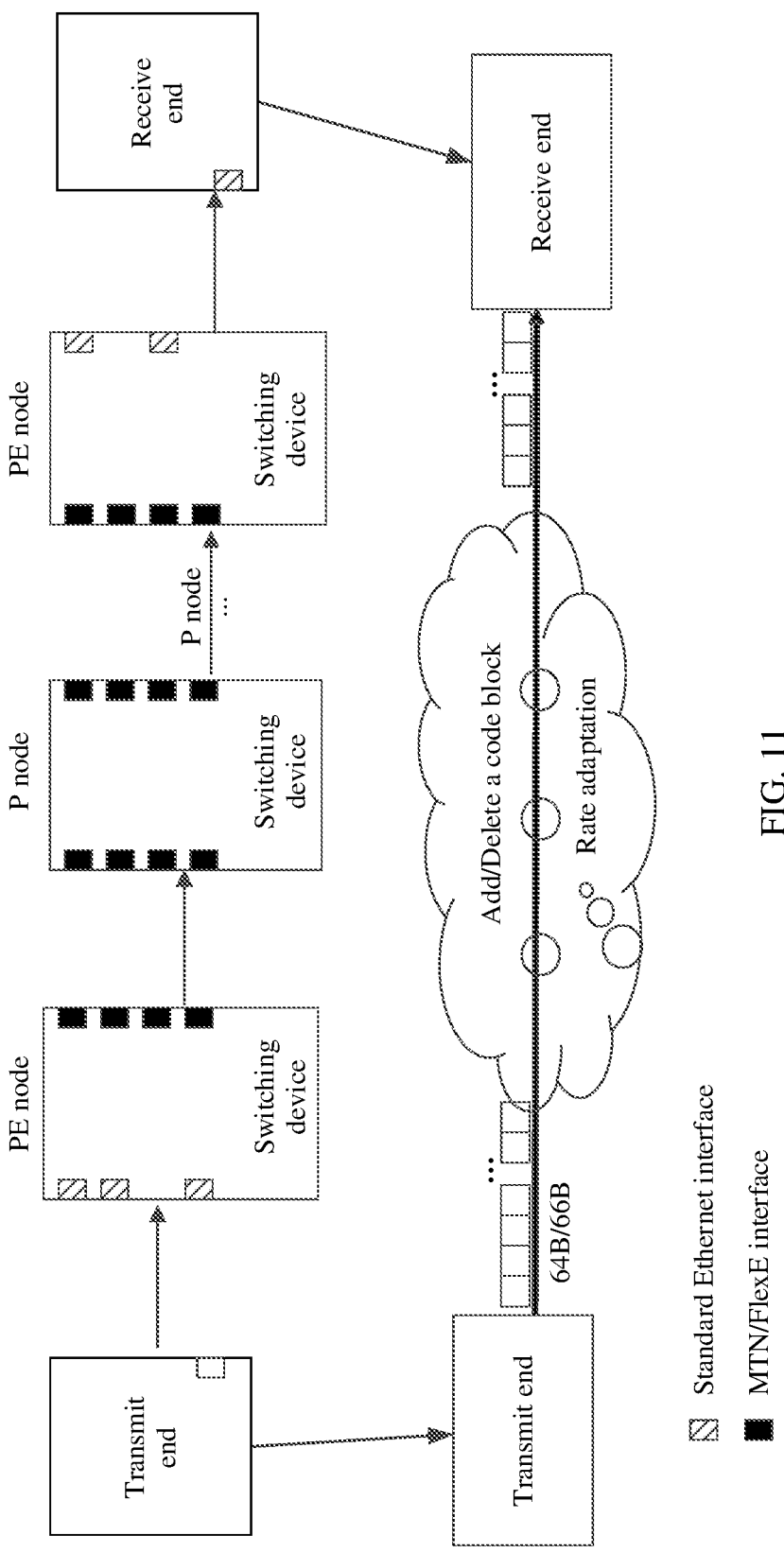
FIG. 11 is an example schematic diagram of a network architecture to which an embodiment of this application is applicable.

For example, FIG. 11 is a network architecture to which
an embodiment of this application is applicable. The net-
work includes a sending node (e.g., a transmit end) and a receiving node (e.g., a receive end or a sink). The sending
node may send a code block stream to the receiving node,
and the receiving node may receive the code block stream
from the sending node. In addition, the network may further
include an intermediate node (not shown in FIG. 11), and
may be configured to: receive a code block stream from the
sending node, and send the code block stream to the receiv-
ing node, to forward the code block stream.

The technical solutions provided in embodiments of this
application may be implemented by both the intermediate
node and the receiving node, or when rate adaptation needs
to be performed on any node in the network or for a node
that has a receive port, embodiments of this application may
be implemented, to resolve a problem that rate adaptation
affects correct receiving of a packet.

More specifically, the technical solutions provided in
embodiments of this application may be applied to an
Ethernet port or a switch on the intermediate node and the
receiving node. The solutions provided in embodiments of
this application may be implemented by performing a physi-
cal layer hardware upgrade (including applying a new chip
and writing a new field programmable logic gate array
(FPGA) code) on an original switch or network adapter.

To make objectives, technical solution, and advantages of
embodiments of this application clearer, the following fur-
ther describes embodiments of this application in detail with
reference to the accompanying drawings.

The terms "system" and "network" may be used inter-
changeably in embodiments of this application. "At least
one" means one or more, and "a plurality of" means two or
more. The term "and/or" describes an association relation-
ship for describing associated objects and represents that at
least three relationships may exist. For example, A and/or B
may represent the following cases: Only A exists, both A and
B exist, and only B exists, where A and B may be singular
or plural. The character "/" usually indicates an "or" rela-
tionship between associated objects. "At least one of the
following items" or a similar expression thereof means any
combination of these items, including any combination of a
single item or a plurality of items. For example, at least one
item of a, b, or c may represent a, b, c, a and b, b and c, a
and c, or a, b, and c.

In addition, unless otherwise stated, ordinal numbers such
as "first" and "second" in embodiments of this application
are for distinguishing between a plurality of objects, but are
not intended to limit an order, a time sequence, priorities, or
importance of the plurality of objects. For example, a first
priority criterion and a second priority criterion are merely
used to distinguish different criteria, and are not used to
indicate different content, priorities, or importance degrees
of the two types of criteria.

In addition, the terms "include" and "have" in the embodi-
ments, the claims, and the accompanying drawings of this
application are not exclusive. For example, a process, a
method, a system, a product, or a device including a series
of steps or modules is not limited to the listed steps or
modules, and may further include steps or modules that are
not listed.

Figures 12, 13:
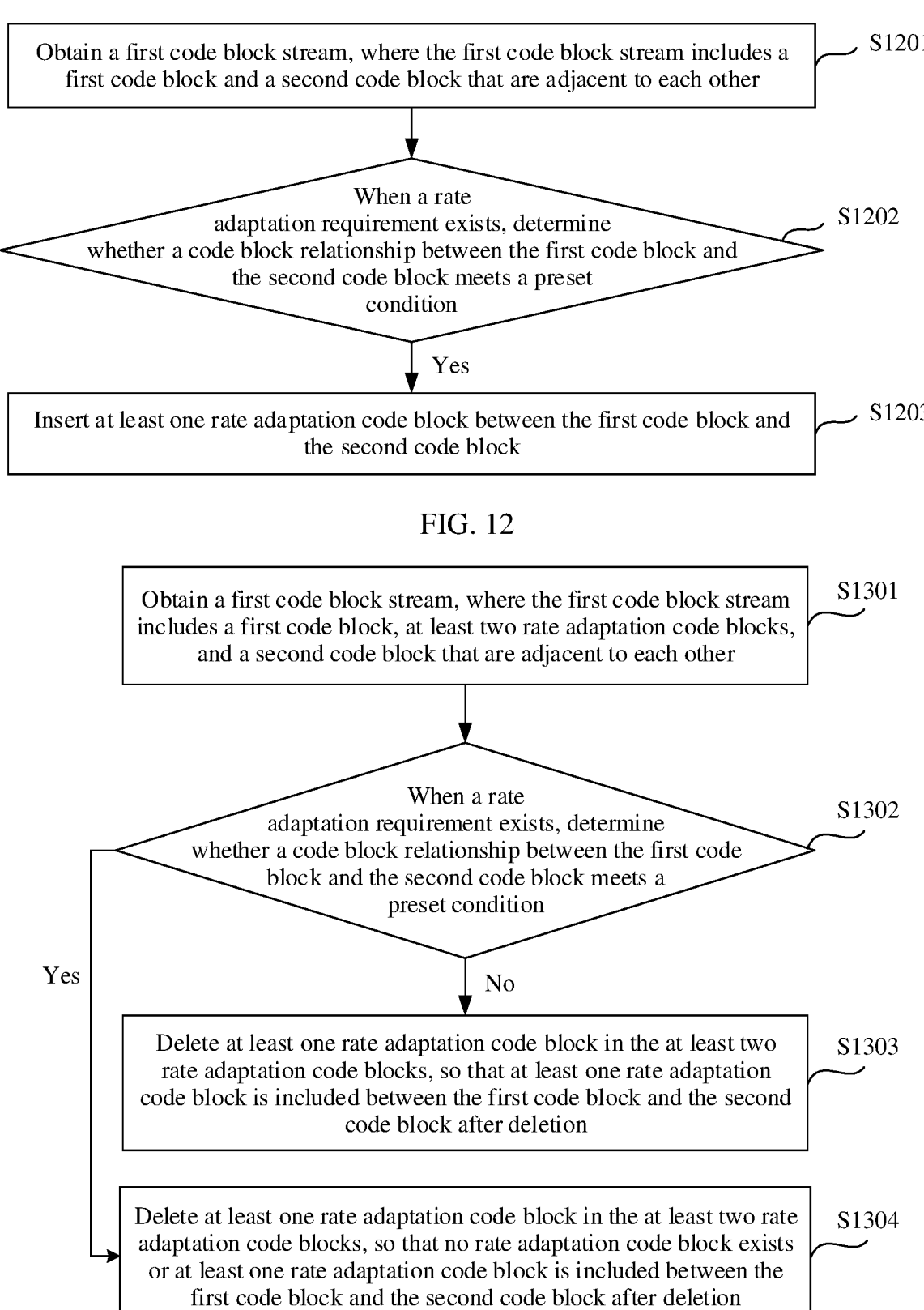
FIG. 12 is an example flowchart of a rate adaptation method according to an embodiment of this application.
FIG. 13 is an example flowchart of another rate adaptation method according to an embodiment of this application.

FIG. 12 is a flowchart of a rate adaptation method
according to an embodiment of this application. The method
may be applied to the network architecture shown in FIG.
11. The method may be specifically performed by an inter-
mediate node, a receiving node, or another node on which
rate adaptation needs to be performed. The method includes:

S1201. Obtain a first code block stream, where the first
code block stream includes a first code block and a second
code block that are adjacent to each other.

The code block stream may also be referred to as a code stream, and is a data stream including a code block.

Based on a code block sequence of the first code block stream, the first code block is located before the second code block, the second code block is located after the first code block, and there is no another code block between the first code block and the second code block.

Optionally, a specific implementation of obtaining the first code block stream may be reading a code block stream from a buffer.

Optionally, a reading manner may be performing reading based on a first in first out rule. Further, optionally, a code block stream of a preset length is read each time.

S1202. When a rate adaptation requirement exists, determine whether a code block relationship between the first code block and the second code block meets a preset condition.

It should be understood that the rate adaptation requirement in this specification means that there is a rate difference between a receive port and a transmit port. The rate difference may be specifically a difference between a transmission rate of a code stream at the receive port and a transmission rate of the code stream at the transmit port, or a difference between clock frequencies of the receive port and the transmit port.

The rate difference may be reflected as a bandwidth difference between the receive port and the transmit port. For example, when a bandwidth of the receive port is greater than a bandwidth of the transmit port, a rate at the receive port is greater than a rate at the transmit port. Therefore, a rate adaptation code block needs to be inserted into the first code block stream, so that the code stream meets the bandwidth of the receive port.

Alternatively, the rate difference may be reflected as a frequency difference between the receive port and the transmit port. For example, the receive port works at a frequency of +100 ppm, and the transmit port works at a frequency of −100 ppm. As a result, a frequency difference between the two ports is 200 ppm. For the frequency difference of 200 ppm, adaptation needs to be performed by using the rate adaptation method in the present technology.

In specific implementation, a buffer waterline state may be set in a buffer corresponding to the receive port. When a current data amount in the buffer is lower than the specified waterline because a rate at which a current data stream enters the buffer is excessively small, it is determined that a rate adaptation requirement exists: A rate adaptation code block needs to be inserted in the first code stream, to increase a data flow-in rate.

Optionally, the first code block and the second code block that are adjacent to each other may be two adjacent code blocks at any location in the first code block stream. For example, both the first code block and the second code block are located in a first packet; or the first code block is located in a first packet, and the second code block is located in an interpacket gap (IPG) after the first packet; or the first code block is located in an interpacket gap before a first packet, and the second code block is located in the first packet.

Correspondingly, a determining location for determining whether the code block relationship between the first code block and the second code block meets the preset condition may be any location in the first code block stream.

In a possible implementation, starting from the $1^{st}$ code block in the first code block stream, determining is sequentially performed backward based on the code block sequence, to traverse all code block locations in the first code block stream.

For example, first, the $1^{st}$ code block in the first code block stream is used as the first code block, and the $2^{nd}$ code block is used as the second code block. Then, it is determined whether the current first code block and the current second code block meet the preset condition.

If the current first code block and the current second code block meet the preset condition, S1203 is performed.

Otherwise, the first code block and the second code block are determined again, the $2^{nd}$ code block is used as the first code block, the $3^{rd}$ code block is used as the second code block, and then it is determined whether the current first code block and the current second code block meet the preset condition.

If the current first code block and the current second code block meet the preset condition, S1203 is performed.

Otherwise, the first code block and the second code block are determined again, the $3^{rd}$ code block is used as the first code block, the $4^{th}$ code block is used as the second code block, and then it is determined whether the current first code block and the current second code block meet the preset condition.

By analogy, the foregoing process is executed until the first code block and the second code block that meet the preset condition are found, and then S1203 is performed, or the foregoing process is executed until the first code block and the second code block that meet the preset condition do not exist when the last code block in the first code block stream is searched, and then S1201 is performed to obtain a code block stream again.

The foregoing manner is an example, and imposes no limitation. In actual implementation, determining may be started from another location in the first code block stream, for example, started from an intermediate location in the first code block stream, so that determining is separately performed forward and backward, or started from the last code block in the first code block stream, so that determining is sequentially performed forward. This is not limited herein.

Optionally, the first code block and the second code block that are adjacent to each other may be adjacent code blocks at a preset location in the first code block stream.

In a possible implementation, the first code block and the second code block that are adjacent to each other are two adjacent code blocks that are in the first code block stream and that are located in an interpacket gap. In other words, the first code block may be a T code block or a code block after the T code block, and the T code block is a frame termination code block. The second code block may be an S code block or a code block before the S code block, and the S code block is a frame start code block.

Correspondingly, a determining location for determining whether the code block relationship between the first code block and the second code block meets the preset condition may be any location in the IPG of the first code block stream.

In a possible implementation, a type of each code block in the first code block stream is sequentially detected based on the code block sequence. For example, as shown in FIG. 5B, a valid code block sequence is a sequence of repeated SDDDDDTC SDDDDDDTC. After a start code block in any IPG is detected (that is, the last code block of a packet is detected, and the code block is generally a T code block), starting from the start code block in the any interpacket gap, determining is sequentially performed backward based on a code block sequence until a termination code block (namely, a location of the $1^{st}$ code block of a next packet, and the code block is generally an S code block) in the IPG is detected.

For example, it is assumed that a T code block of the initial packet in the first code block stream is an $m^{th}$ code block in the first code block stream, and an S code block of the second packet is an $n^{th}$ code block in the first code block stream, where n>m. In this case, the determining whether a code block relationship between the first code block and the second code block meets a preset condition may include:

sequentially detecting a type of each code block in the first code block stream based on the code block sequence, and when identifying a code block type of the $m^{th}$ code block, if determining that the $m^{th}$ code block is a T code block, using the $m^{th}$ code block in the first code block stream as the first code block, using an $(m+1)^{th}$ code block as the second code block, and then starting to determine whether the current first code block and the current second code block meet the preset condition; and if the current first code block and the current second code block meet the preset condition, performing S1203; or otherwise, determining the first code block and the second code block again, using the $(m+1)^{th}$ code block as the first code block, using an $(m+2)^{th}$ code block as the second code block, and then determining whether the current first code block and the current second code block meet the preset condition.

. . . .

By analogy, the foregoing process is executed until the first code block and the second code block that meet the preset condition are found, and then S1203 is performed, or the foregoing process is executed until the first code block and the second code block that meet the preset condition do not exist when the $n^{th}$ code block, namely, an S code block, in the first code block stream is identified, and then the determining operation is suspended, to continue to identify a code block type backward until a T code block of a next packet is identified (it is assumed that the code block is an $o^{th}$ code block). In this case, the determining operation continues to be performed.

Certainly, the foregoing manner is merely an example, and imposes no limitation. In actual implementation, determining may be started from another location in the IPG, for example, started from an intermediate location in the IPG, so that determining is separately performed forward until a T code block and backward until an S code block, or started from the $1^{st}$ code block (namely, an S code block) after a termination location in the IPG, so that determining is sequentially performed forward until the $1^{st}$ code block (namely, a T code block) in the IPG. This is not limited herein.

In addition, in actual implementation, the preset location may be another location. For example, the preset location may be a part of the IPG or a preset location whose coverage range is greater than the IPG. This is not limited herein.

Optionally, in a process of detecting the code block type, if a code block with an invalid code block sequence is detected, the code block may be replaced with an error code block for processing, or may be processed by a sending node or a receiving node. Certainly, the E code block used for replacement herein is merely an example, and imposes no limitation. In actual implementation, another code block may be used for replacement, for example, a self-defined code block.

In this embodiment of this application, the preset condition includes but is not limited to the following two types:

Preset condition 1: The code block relationship between the first code block and the second code block is not a code block relationship that causes an error in packet parsing after the rate adaptation code block is inserted. For example, the code block relationship between the first code block and the second code block is not any one of the following code block relationships:

The first code block is a T code block, and the second code block is a T code block;

the first code block is a T code block, and the second code block is a D code block;

the first code block is a T code block, and the second code block is an E code block;

the first code block is a D code block, and the second code block is an S code block; and the first code block is an E code block, and the second code block is an S code block.

{First code block, second code block} is used to represent the code block relationship between the first code block and the second code block. In this case, {first code block, second code block} is not any one of the following code block relationships: {T, T}, {T, D}, {T, E}, {D, S} and {E, S}.

Referring to FIG. 10A to FIG. 10T, when the code block relationship between the first code block and the second code block is any one of the foregoing relationships, if an idle code block is inserted between the first code block and the second code block, an error is easily caused in packet parsing. Therefore, these error code block relationships need to be avoided.

Certainly, the foregoing relationship is merely an example, and imposes no limitation. In actual implementation, if an error is caused in parsing of adjacent packets after the rate adaptation code block is inserted because another code block relationship exists, the another code block relationship should also be included in a range of the foregoing preset condition 1. No exhaustive enumeration is performed herein.

Preset condition 2: The code block relationship between the first code block and the second code block is a code block relationship that does not cause an error in packet parsing after the rate adaptation code block is inserted. For example, the code block relationship between the first code block and the second code block is any one of the following code block relationships:

The first code block is a T code block, and the second code block is an IPG code block;

the first code block is an IPG code block, and the second code block is an S code block;

the first code block is a T code block, and the second code block is an S code block; and the first code block is an IPG code block, and the second code block is an IPG code block.

In a possible example, the code block relationship (represented by using {first code block, second code block}) between the first code block and the second code block is any one of the following code block relationships: {T, I}, {T, S}, {I, I}, {O, I}, {I, O}, {I, S}, {O, S}, and {O, O}.

When the code block relationship between the first code block and the second code block is any one of the foregoing relationships, if an idle code block is inserted between the first code block and the second code block, no error is caused in packet parsing. Therefore, the idle code block may be inserted at a location corresponding to the code block relationship, to ensure code block parsing accuracy.

It should be understood that the IPG code block herein is a code block at an IPG location, and includes one or more of an idle code block, an O code block, an E code block, or a D code block. When an error occurs in the first code block stream, a D code block may appear at the IPG location. In this case, the IPG code block may include a D code block.

The foregoing relationship is an example, and imposes no limitation. In actual implementation, if no error is caused in parsing of adjacent packets after the idle code block is inserted because another code block relationship exists, the another code block relationship should also be included in a range of the foregoing preset condition 2. No exhaustive enumeration is performed herein.

In addition, the foregoing preset condition 1 and the foregoing preset condition 2 may be implemented simultaneously, that is, whether the code block relationship between the first code block and the second code block meet both the foregoing preset condition 1 and the foregoing preset condition 2 needs to be determined.

In this embodiment of this application, when it is determined whether the code block relationship between the first code block and the second code block meets the preset condition, a specific determining manner includes but is not limited to the following two types:

Manner 1: Determining is performed on the first code block and then on the second code block.

(1) The Foregoing Preset Condition 1 is Used as an Example:

First, it is determined whether the first code block is a T code block, a D code block, and an E code block.

If the first code block is not any one of the T code block, the D code block, and the E code block, it is directly determined that the first code block and the second code block meet the preset condition.

If the first code block is one of the T code block, the D code block, and the E code block, for example, the first code block is a D code block, it is further determined whether the second code block is an S code block. If the second code block is not an S code block, it is determined that the first code block and the second code block meet the preset condition. Otherwise, it is determined that the first code block and the second code block do not meet the preset condition.

(2) The Foregoing Preset Condition 2 is Used as an Example:

For example, it is first determined whether the first code block is a T code block or an IPG code block. If the first code block is neither a T code block nor an IPG code block, it is directly determined that the first code block and the second code block do not meet the preset condition.

If the first code block is a T code block or an IPG code block, for example, the first code block is a T code block, it is further determined whether the second code block is an S code block or an IPG code block. If the second code block is neither an S code block nor an IPG code block, it is determined that the first code block and the second code block do not meet the preset condition. Otherwise, it is determined that the first code block and the second code block meet the preset condition.

Manner 2: Determining is performed on the first code block and the second code block simultaneously.

(1) The Foregoing Preset Condition 1 is Used as an Example:

It is determined whether {first code block, second code block} is any one of the following code block combinations: {T, T}, {T, D}, {T, E}, {D, S} and {E, S}. If {first code block, second code block} is one of the code block combinations, it is determined that the code block relationship between the first code block and the second code block does not meet the preset condition. If {first code block, second code block} is not any one of the foregoing code block combinations, it is determined that the code block relationship between the first code block and the second code block meets the preset condition.

(2) The Foregoing Preset Condition 2 is Used as an Example:

It is determined whether {first code block, second code block} is any one of the following code block combinations: {T, I}, {T, S}, {I, I}, {O, I}, {I, O}, {I, S}, {O, S}, and {O, O}. If {first code block, second code block} is one of the code block combinations, it is determined that the code block relationship between the first code block and the second code block meets the preset condition. If {first code block, second code block} is not any one of the foregoing code block combinations, it is determined that the code block relationship between the first code block and the second code block does not meet the preset condition.

In addition, in the foregoing S1202, when a rate adaptation requirement exists, it is determined whether the code block relationship between the first code block and the second code block meets the preset condition. In specific implementation, after the first code block stream is obtained, determining may be performed when no rate adaptation requirement exists (that is, after the first code block stream is obtained, whether the code block relationship between the first code block and the second code block meets the preset condition may be always determined). When the preset condition is met and a rate adaptation requirement exists, S1203 is performed.

S1203. When the code block relationship between the first code block and the second code block meets the preset condition, insert at least one rate adaptation code block between the first code block and the second code block.

Optionally, the rate adaptation code block includes an idle code block. However, another possibility is not ruled out. For example, the rate adaptation code block may further include a self-defined code block used to adjust a rate. This is not limited herein.

Optionally, the inserting at least one rate adaptation code block between the first code block and the second code block may specifically include: determining, based on the rate difference between the receive port and the transmit port, a quantity of rate adaptation code blocks to be inserted between the first code block and the second code block, where a larger rate difference indicates a larger quantity of rate adaptation code blocks to be inserted between the first code block and the second code block; and then inserting a corresponding quantity of rate adaptation code blocks between the first code block and the second code block, where the code block relationship between the two code blocks meets the preset condition.

It should be noted that, in the embodiment shown in FIG. 12, when the code block relationship between the first code block and the second code block meets the preset condition, at least one rate adaptation code block is inserted between the first code block and the second code block. In actual implementation, when the code block relationship between the first code block and the second code block does not meet another preset condition, at least one rate adaptation code block may be inserted between the first code block and the second code block.

Optionally, the another preset condition may be opposite to the foregoing preset condition.

For example, the code block relationship between the first code block and the second code block is any one of the following code block relationships: the first code block is a T code block, and the second code block is a T code block; the first code block is a T code block, and the second code block is a D code block; the first code block is a T code block, and the second code block is an E code block; the first code block is a D code block, and the second code block is an S code block; and the first code block is an E code block, and the second code block is an S code block.

For example, the code block relationship between the first code block and the second code block is not any one of the following code block relationships:

The first code block is a T code block, and the second code block is an IPG code block;

the first code block is an IPG code block, and the second code block is an S code block;

the first code block is a T code block, and the second code block is an S code block; and the first code block is an IPG code block, and the second code block is an IPG code block.

It should be understood that, the description of either determining that the code block relationship "meets" the preset condition or determining that the code block relationship "does not meet" the preset condition or another description manner falls within the protection scope of this application, provided that a finally obtained technical solution is essentially the same or a technical concept is the same.

It may be learned from the foregoing description that, in this embodiment of this application, the first code block stream is identified and detected. When rate adaptation needs to be performed, based on a pre-identified code block relationship/combination that causes an error in packet receiving, the code block location that may cause an error is avoided, and the rate adaptation code block is inserted at a correct code block location, so that it can be ensured that parsing of a received packet on a receive side (e.g., sink) of the code block stream is not affected by rate adaptation, and reliability of rate adaptation can be improved.

In the foregoing related embodiment shown in FIG. 12, the rate adaptation method performed by using a code block as a granularity in a scenario in which a rate at the receive port needs to be increased is described. The following describes a rate adaptation method performed by using a code block as a granularity in a scenario in which the rate at the receive port needs to be decreased.

FIG. 13 is a flowchart of another rate adaptation method according to an embodiment of this application. The method may be applied to the network architecture shown in FIG. 11. The method may be specifically performed by an intermediate node, a receiving node, or another node on which rate adaptation needs to be performed. The method includes:

S1301. Obtain a first code block stream, where the first code block stream includes a first code block, at least two rate adaptation code blocks, and a second code block that are adjacent to each other.

It should be understood that in this specification, the first code block, the at least two rate adaptation code blocks, and the second code block that are adjacent to each other mean that the at least two rate adaptation code blocks are consecutive or sequential in the first code stream. In other words, based on a code block sequence, the first code block is located before the at least two rate adaptation code blocks, there is no another code block between the first code block and the at least two rate adaptation code blocks, the second code block is located after the at least two rate adaptation code blocks, and there is no another code block between the second code block and the at least two rate adaptation code blocks. It should be understood that the at least two rate adaptation code blocks are also consecutive or sequential.

FIG. 14 is a schematic diagram of a first code block, three rate adaptation code blocks, and a second code block that are adjacent to each other.

Optionally, a specific implementation of obtaining the first code block stream may be reading a code block stream from a buffer.

Optionally, a reading manner may be performing reading based on a first in first out rule. Further, optionally, a code block stream of a preset length is read each time.

S1302. When a rate adaptation requirement exists, determine whether a code block relationship between the first code block and the second code block meets a preset condition.

Similarly, in specific implementation, a buffer waterline state may be set in a buffer corresponding to a receive port. When a current data amount in the buffer is higher than the specified waterline because a rate at which a current data stream enters the buffer is excessively large, it is determined that a rate adaptation requirement exists: A rate adaptation code block needs to be deleted from the first code stream, to decrease a data flow-in rate.

Optionally, the first code block, the at least two rate adaptation code blocks, and the second code block that are adjacent to each other may be code blocks at any location in the first code block stream. For example, the first code block, the at least two rate adaptation code blocks, and the second code block are all located in a first packet; or the first code block is located in a first packet, and the at least two rate adaptation code blocks and the second code block are located in an interpacket gap after the first packet; or the first code block and the at least two rate adaptation code blocks are located in an interpacket gap before a first packet, and the second code block is located in the first packet.

Correspondingly, a determining location for determining whether the code block relationship between the first code block and the second code block meets the preset condition may be any location in the first code block stream.

In a possible implementation, starting from the 1$^{st}$ code block in the first code block stream, determining is sequentially performed backward based on the code block sequence, to traverse all code block locations in the first code block stream.

For example, first, the 1$^{st}$ code block in the first code block stream is used as the first code block, it is determined whether there are at least two rate adaptation code blocks after the first code block, and if there are at least two rate adaptation code blocks after the first code block, a code block after the at least two rate adaptation code blocks is used as the second code block. Then, it is determined whether the current first code block and the current second code block meet the preset condition.

If the current first code block and the current second code block do meet the preset condition, S1303 is performed.

Otherwise, S1304 is performed. Alternatively, the first code block is determined again, the 2$^{nd}$ code block is used as the first code block, it is determined whether there are at least two rate adaptation code blocks after the first code block, and if there are at least two rate adaptation code blocks after the first code block, a code block after the at least two rate adaptation code blocks is used as the second code block. Then, it is determined whether the current first code block and the current second code block meet the preset condition.

If the current first code block and the current second code block do meet the preset condition, S1303 is performed.

Otherwise, S1304 is performed. Alternatively, the first code block is determined again, the 3$^{rd}$ code block is used as the first code block, it is determined whether there are at least two rate adaptation code blocks after the first code block, and if there are at least two rate adaptation code blocks after the first code block, a code block after the at least two rate adaptation code blocks is used as the second code block. Then, it is determined whether the current first code block and the current second code block meet the preset condition.

. . . .

By analogy, the foregoing process is executed until the first code block and the second code block that do not meet the preset condition are found, and then S1303 is performed, or the foregoing process is executed until the first code block and the second code block that do not meet the preset condition do not exist when the last code block in the first code block stream is searched, and then S1301 is performed to obtain a code block stream again.

The foregoing manner is an example, and imposes no limitation. In actual implementation, determining may be started from another location in the first code block stream, for example, started from an intermediate location in the first code block stream, so that determining is separately performed forward and backward, or started from the last code block in the first code block stream, so that determining is sequentially performed forward. This is not limited herein.

Optionally, the first code block and the second code block that are adjacent to each other may be adjacent code blocks at a preset location in the first code block stream.

In a possible implementation, the first code block and the second code block that are adjacent to each other are two adjacent code blocks that are in the first code block stream and that are located in an interpacket gap. In other words, the first code block may be a T code block or a code block after the T code block, and the T code block is a frame termination code block. The second code block may be an S code block or a code block before the S code block, and the S code block is a frame start code block.

Correspondingly, a determining location for determining whether the code block relationship between the first code block and the second code block meets the preset condition may be any location in the IPG of the first code block stream.

In a possible implementation, a type of each code block in the first code block stream is sequentially detected based on the code block sequence. For example, as shown in FIG. 5B, a valid code block sequence is a sequence of repeated SDDDDDTC SDDDDDDTC. After any T code block is detected (that is, the last code block of a packet is detected or a start code block in an IPG is detected), starting from the any T code block (namely, a location of the last code block of the packet or the start code block in the IPG), determining is sequentially performed backward based on a code block sequence until an S code block (namely, a location of the $1^{st}$ code block of a next packet or a termination code block in the IPG).

For example, it is assumed that a T code block of the initial packet in the first code block stream is an $m^{th}$ code block in the first code block stream, and the second packet is an $n^{th}$ code block in the first code block stream, where n>m. In this case, the determining whether a code block relationship between the first code block and the second code block meets a preset condition may include:

sequentially detecting a type of each code block in the first code block stream based on the code block sequence, and when identifying a code block type of the $m^{th}$ code block, if determining that the $m^{th}$ code block is a T code block, using the $m^{th}$ code block in the first code block stream as the first code block, and then determining whether there are at least two rate adaptation code blocks after the first code block; and if there are at least two rate adaptation code blocks after the first code block, using a code block after the at least two rate adaptation code blocks as the second code block; and then determining whether the current first code block and the current second code block meet the preset condition; and if the current first code block and the current second code block do not meet the preset condition, performing S1303; or otherwise, performing S1304, or determining the first code block again, using an $(m+1)^{th}$ code block as the first code block, and then determining whether there are at least two rate adaptation code blocks after the first code block.

. . . .

By analogy, the foregoing process is executed until the first code block and the second code block that do not meet the preset condition are found, and then S1303 is performed, or the foregoing process is executed until the first code block and the second code block that do not meet the preset condition do not exist when the $n^{th}$ code block, namely, an S code block, in the first code block stream is identified, and then the determining operation is suspended, to continue to identify a code block type backward until a T code block of the second packet is identified (it is assumed that the code block is an $o^{th}$ code block). In this case, the determining operation is performed again starting from the $o^{th}$ code block.

Certainly, the foregoing manner is merely an example, and imposes no limitation. In actual implementation, determining may be started from another location in the IPG, for example, started from an intermediate location in the IPG, so that determining is separately performed forward until a T code block and backward until an S code block, or started from the $1^{st}$ code block (namely, an S code block) after a termination location in the IPG, so that determining is sequentially performed forward until the $1^{st}$ code block (namely, a T code block) in the IPG. This is not limited herein.

In addition, in actual implementation, the preset location may be another location. For example, the preset location may be a part of the IPG or a preset location whose coverage range is greater than the IPG. This is not limited herein.

Optionally, in a process of detecting the code block type, if a code block that does not match a valid code block sequence is detected, the code block may be replaced with an E code block for processing, or may be processed by a sending node or a receiving node. The E code block used for replacement herein is an example, and imposes no limitation. In actual implementation, another code block may be used for replacement, for example, a self-defined code block.

In this embodiment of this application, when it is determined, at each determining location, whether the code block relationship between the first code block and the second code block meets the preset condition, a specific determining manner includes but is not limited to the following two types: Manner 1: Determining is performed on the first code block and then on the second code block. Manner 2: Determining is performed on the first code block and the second code block simultaneously. For specific implementations of the foregoing two manners, refer to related content in the foregoing S1202.

In addition, in the foregoing S1302, when a rate adaptation requirement exists, it is determined whether the code block relationship between the first code block and the second code block meets the preset condition. In a specific implementation, after the first code block stream is obtained, determining may be performed when no rate adaptation requirement exists (that is, after the first code block stream is obtained, whether the code block relationship between the first code block and the second code block meets the preset condition may be always determined). When the preset condition is not met and a rate adaptation requirement exists, S1303 is performed.

S1303. When the code block relationship between the first code block and the second code block does not meet the preset condition, delete at least one rate adaptation code block in the at least two rate adaptation code blocks, so that at least one rate adaptation code block is included between the first code block and the second code block after deletion.

If all the rate adaptation code blocks between the first code block and the second code block that do not meet the preset condition are deleted, the first code block and the second code block are adjacent to each other, and a code block combination that causes an error in parsing of adjacent packets by PCS decode of a receive end occurs, for example, T and T, T and D, T and E, and E and S. Therefore, if the first code block and the second code block are in any one of the following code block relationships: {T, T}, {T, D}, {T, E}, {E, S}, and {D, S}, at least one rate adaptation code block needs to be reserved between the first code block and the second code block after deletion, to avoid the combination such as {T, T}, {T, D}, {T, E}, {E, S}, and {D, S}.

S1304. When the code block relationship between the first code block and the second code block meets the preset condition, delete at least one rate adaptation code block in the at least two rate adaptation code blocks, so that no rate adaptation code block exists or at least one rate adaptation code block is included between the first code block and the second code block after deletion.

On the contrary, for the first code block and the second code block that meet the preset condition, if all the rate adaptation code blocks between the first code block and the second code block that meet the preset condition are deleted, the first code block and the second code block are adjacent to each other, but a code block combination that causes an error in parsing of adjacent packets by PCS decode of a receive end does not occur, for example, a combination such as T and T, T and D, T and E, and E and S does not occur. Therefore, if the first code block and the second code block are not any one of {T, T}, {T, D}, {T, E}, {E, S}, and {D, S}, or the first code block and the second code block are any one of {T, I}, {T, S}, {I, I}, {O, I}, {I, O}, {I, S}, {O, S}, and {O, O}, regardless of whether the rate adaptation code block is reserved between the first code block and the second code block after deletion, the combination such as {T, T}, {T, D}, {T, E}, {D, S} and {E, S} does not occur.

Similarly, the rate adaptation code block may include an idle code block. However, another possibility is not ruled out. For example, the rate adaptation code block may further include a self-defined code block used to adjust a rate. This is not limited herein.

Similarly, the deleting at least one rate adaptation code block between the first code block and the second code block may specifically include: determining, based on a rate difference between the receive port and a transmit port, a quantity of rate adaptation code blocks that need to be deleted between the first code block and the second code block, where a larger rate difference indicates a larger quantity of rate adaptation code blocks that need to be deleted; and then deleting a corresponding quantity of rate adaptation code blocks between the first code block and the second code block, where the code block relationship between the two code blocks meets the preset condition.

Similarly, in the foregoing description manner, "meets" and "does not meet" may be replaced with each other, and a corresponding preset condition may be replaced. However, the description of either "determining that the code block relationship meets the preset condition" or "determining that the code block relationship does not meet the preset condition" or another description manner falls within the protection scope of this application, provided that a finally obtained technical solution is essentially the same or a technical concept is the same.

It may be learned from the foregoing description that, in this embodiment of this application, the first code block stream is identified and detected. When rate adaptation needs to be performed, based on a pre-identified code block relationship/combination that causes an error in packet receiving, the code block relationship/combination is avoided as much as possible when the rate adaptation code block is deleted, so that it can be ensured that parsing of a received packet on a receive side is not affected by rate adaptation, and reliability of rate adaptation can be improved.

In the related embodiment shown in FIG. 13, the rate adaptation method performed by using a code block as a granularity when a plurality of rate adaptation code blocks exist between the first code block and the second code block and in a scenario in which a rate at the receive port needs to be decreased. The following describes a rate adaptation method performed by using a code block as a granularity when only one rate adaptation code block exists between the first code block and the second code block and in a scenario in which the rate at the receive port needs to be decreased.

FIG. 15 is a flowchart of another rate adaptation method according to an embodiment of this application. The method may be applied to the network architecture shown in FIG. 11. The method may be specifically performed by an intermediate node, a receiving node, or another node on which rate adaptation needs to be performed. The method includes:

S1501. Obtain a first code block stream, where the first code block stream includes a first code block, a rate adaptation code block, and a second code block that are adjacent to each other.

For a specific implementation of S1501, refer to the specific implementation of the foregoing S1301. A difference lies only in that only one rate adaptation code block exists between the first code block and the second code block herein, but a plurality of rate adaptation code blocks exist between the first code block and the second code block in S1301.

S1502. When a rate adaptation requirement exists, determine whether a code block relationship between the first code block and the second code block meets a preset condition.

For a specific implementation of S1502, refer to the specific implementation of the foregoing S1301. A difference lies only in that only one rate adaptation code block exists between the first code block and the second code block herein, but a plurality of rate adaptation code blocks exist between the first code block and the second code block in S1301.

S1503. When the code block relationship between the first code block and the second code block meets the preset condition, delete the rate adaptation code block, so that no rate adaptation code block exists between the first code block and the second code block after deletion.

If the rate adaptation code block between the first code block and the second code block that do not meet the preset condition is deleted, the first code block and the second code block are adjacent to each other, and a code block combination that causes an error in parsing of adjacent packets by PCS decode of a receive end occurs, for example, T and T, T and D, T and E, and E and S. Therefore, if the code block relationship between the first code block and the second code block does not meet the preset condition, for example, if the first code block and the second code block are in any one of the following code block relationships: {T, T}, {T, D}, {T, E}, {D, S} and {E, S}, the rate adaptation code block between the first code block and the second code block cannot be deleted, to avoid the combination such as {T, T}, {T, D}, {T, E}, {D, S} and {E, S}.

On the contrary, for the first code block and the second code block that meet the preset condition, if the rate adaptation code block between the first code block and the second code block that meet the preset condition is deleted, the first code block and the second code block are adjacent to each other, but a code block combination that causes an error in parsing of adjacent packets by PCS decode of a receive end does not occur, for example, a combination such as T and T, T and D, T and E, and E and S does not occur. Therefore, if the code block relationship between the first code block and the second code block meets the preset condition, for example, if the first code block and the second code block are not any one of {T, T}, {T, D}, {T, E}, {D, S} and {E, S}, or if the first code block and the second code block are any one of {T, I}, {T, S}, {I, I}, {O, I}, {I, O}, {I, S}, {O, S}, and {O, O}, the rate adaptation code block between the first code block and the second code block may be deleted.

Similarly, the rate adaptation code block may include an idle code block. However, another possibility is not ruled out. For example, the rate adaptation code block may further include a self-defined code block used to adjust a rate. This is not limited herein.

Similarly, in the foregoing description manner, "meets" may be replaced with "does not meet", and a corresponding preset condition may be replaced. However, the description of either "determining that the code block relationship meets the preset condition" or "determining that the code block relationship does not meet the preset condition" or another description manner falls within the protection scope of this application, provided that a finally obtained technical solution is essentially the same or a technical concept is the same.

It may be learned from the foregoing description that, in this embodiment of this application, the first code block stream is identified and detected. When rate adaptation needs to be performed, based on a pre-identified code block relationship/combination that causes an error in packet receiving, the code block location that may cause an error is avoided, and the rate adaptation code block is deleted at a correct code block location, so that it can be ensured that parsing of a received packet on a receive side is not affected by rate adaptation, and reliability of rate adaptation is improved.

In the foregoing related embodiments shown in FIG. 11 to FIG. 15, the rate adaptation solution performed by using a code block as a granularity is described. Based on a same technical concept, an embodiment of this application further provides a rate adaptation solution performed by using a character as a granularity.

Figure 16:
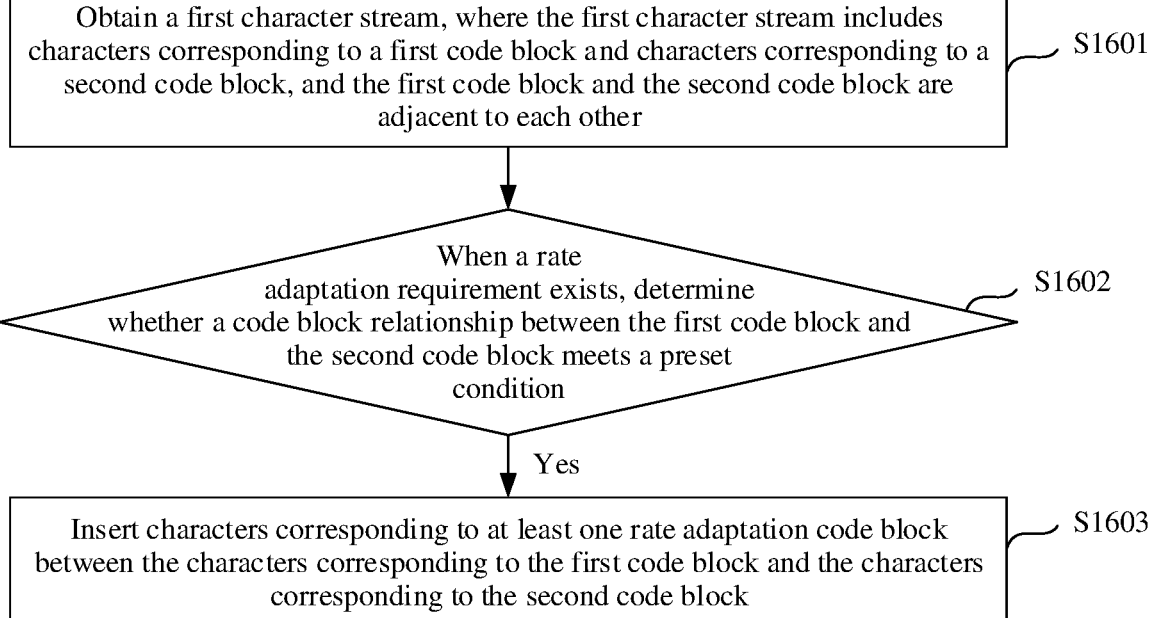
FIG. 16 is an example flowchart of another rate adaptation method according to an embodiment of this application.

FIG. 16 is a flowchart of another rate adaptation method according to an embodiment of this application. The method may be applied to the network architecture shown in FIG. 11. The method may be specifically performed by an intermediate node, a receiving node, or another node on which rate adaptation needs to be performed. The method includes:

S1601. Obtain a first character stream, where the first character stream includes characters corresponding to a first code block and characters corresponding to a second code block, and the first code block and the second code block are adjacent to each other.

For specific implementations of the first code block and the second code block, refer to the specific implementations of the first code block and the second code block in the foregoing S1201.

Optionally, before the obtaining a first character stream, the method further includes: obtaining a first code block stream, where the first code block stream includes the first code block and the second code block that are adjacent to each other; and decoding the first code block stream to obtain the first character stream.

Further, optionally, before the first character stream is obtained, code block format and code block sequence check may be further performed on the first code block stream. If there is a code block whose code block format and/or code block sequence do/does not comply with a rule, the code block whose code block format and/or code block sequence do/does not comply with the rule is replaced with an E code block, to obtain an error-corrected first code block stream. Then, the error-corrected first code block stream is decoded to obtain the first character stream. Certainly, the E code block used for replacement herein is merely an example, and imposes no limitation. In actual implementation, another code block may be used for replacement, for example, a self-defined code block.

In this way, a code block relationship/combination, in a code stream, that causes an error in packet receiving and parsing may be reduced as much as possible.

Optionally, the decoding the error-corrected first code block stream includes: decoding a code block other than a preset code block in the error-corrected first code block stream, where the preset code block may be an O code block or another self-defined code block. In a possible implementation, the preset code block is a code block that occurs in an MTN and that does not occur in the Ethernet. In this way, a correct code block (such as an O code block) may be prevented from being considered as an error code block for processing, to prevent OAM information in the O code block from being lost.

S1602. When a rate adaptation requirement exists, determine whether a code block relationship between the first code block and the second code block meets a preset condition.

For a specific implementation, refer to the specific implementation of the foregoing S1201.

S1603. When the code block relationship between the first code block and the second code block meets the preset condition, insert characters corresponding to at least one rate adaptation code block between the characters corresponding to the first code block and the characters corresponding to the second code block.

Optionally, the rate adaptation code block includes an idle code block. However, another possibility is not ruled out. For example, the rate adaptation code block may further include a self-defined code block used to adjust a rate. This is not limited herein. Correspondingly, the character (briefly referred to as a rate adaptation character) corresponding to the rate adaptation code block includes an idle character. However, another possibility is not ruled out. For example, the character may further include a self-defined character used to adjust a rate. This is not limited herein. In the following, that the rate adaptation character is an idle character is used as an example. In addition, when the idle character is inserted, eight consecutive idle characters are used as a group for insertion, and one group of idle characters corresponds to one idle code block.

In this embodiment of this application, the inserting characters corresponding to at least one rate adaptation code block between the characters corresponding to the first code block and the characters corresponding to the second code block includes but is not limited to the following several implementations:

(1) The characters corresponding to the at least one rate adaptation code block are inserted after the last character corresponding to the first code block and before the $1^{st}$ character corresponding to the second code block.

For example, the first code block is a T7 code block (the last row in FIG. 2, where corresponding characters are "DDDDDDDT", and a block type is 0xFF), and the second code block is an S code block (a code block in the last but ninth row in FIG. 2, where corresponding characters are "SDDDDDDD", and a block type is 0x78). In this case, the characters corresponding to the at least one rate adaptation code block are inserted after the character "T" of the T7 code block and before the character "S" of the S code block, for example, N*8 idle characters. Every eight idle characters correspond to one idle code block, and N is a positive integer greater than 1.

(2) If the last several characters of the first code block are all idle characters, the characters corresponding to the at least one idle code block may be inserted at any location after the last non-idle character of the first code block and before the $1^{st}$ character of the second code block. In other words, the idle character may be inserted at a location of the last several idle characters of the first code block.

Although the insertion location is not after the last character corresponding to the first code block and before the $1^{st}$ character corresponding to the second code block, a character combination obtained after the idle character is inserted is the same as a character combination obtained after the idle character is inserted after the last character corresponding to the first code block and before the $1^{st}$ character corresponding to the second code block. Therefore, it is equivalent to inserting the idle character after the last character corresponding to the first code block and before the $1^{st}$ character corresponding to the second code block.

For example, the first code block is a T4 code block (the last but third row in FIG. 2, where a block type is 0xCC), and the second code block is an S code block (the last but ninth row in FIG. 2, where a block type is 0x78). For ease of description, in this specification, "I" is used to represent the idle character. In this case, if the first code block corresponds to characters "DDDDTIII", and the second code block corresponds to characters "SDDDDDDD", there may be the following several idle character insertion manners:

Characters corresponding to one idle code block are inserted after the last character corresponding to the first code block and before the $1^{st}$ character corresponding to the second code block, that is, "DDDDTIII"+"IIIIIIII"+ "SDDDDDDD", and characters obtained after insertion are "DDDDTIIIIIIIIIIISDDDDDDD".

Characters corresponding to one idle code block are inserted after the penultimate character corresponding to the first code block and before the last character corresponding to the first code block, that is, "DDDDTII"+"IIIIIIII"+

"I"+"SDDDDDDD", and characters obtained after insertion are "DDDDTIIIIIIIIIIISDDDDDDD".

Characters corresponding to one idle code block are inserted after the last but second character corresponding to the first code block and before the penultimate character corresponding to the first code block, that is, "DDDDTI"+ "IIIIIIII"+"II"+"SDDDDDDD", and characters obtained after insertion are "DDDDTIIIIIIIIIIISDDDDDDD".

Characters corresponding to one idle code block are inserted after the last but third character (namely, the last non-idle character) corresponding to the first code block and before the last but second character corresponding to the first code block, that is, "DDDDT"+"IIIIIIII"+"III"+ "SDDDDDDD", and characters obtained after insertion are "DDDDTIIIIIIIIIIISDDDDDDD".

It may be learned that final results of the foregoing four insertion manners are consistent. Further, after the idle character is inserted, a character stream obtained after the idle character is inserted is further encoded to obtain a second code block stream. In this way, an effect of a finally generated code block stream is consistent with an effect of a code block stream obtained after the rate adaptation code block is inserted in the embodiment shown in FIG. 12.

It should be understood that, if a code block other than the preset code block is decoded when the first code block stream is decoded, herein, after the character stream obtained after character insertion is encoded, the preset code block further needs to be inserted into the second code block stream, to avoid missing of information in an original code block stream, and ensure reliability of rate adaptation.

Similarly, in the foregoing description manner, "meets" may be replaced with "does not meet", and a corresponding preset condition may be replaced. However, the description of either "determining that the code block relationship meets the preset condition" or "determining that the code block relationship does not meet the preset condition" or another description manner falls within the protection scope of this application, provided that a finally obtained technical solution is essentially the same or a technical concept is the same.

It may be learned from the foregoing description that, in this embodiment of this application, the first character stream is identified and detected. When rate adaptation needs to be performed, based on characters corresponding to a pre-identified code block relationship/combination that causes an error in packet receiving, the character location that may cause an error is avoided, and the rate adaptation characters are inserted at a correct character location, so that it can be ensured that parsing of a received packet on a receive side is not affected by rate adaptation, and reliability of rate adaptation is improved.

In the foregoing related embodiment shown in FIG. 16, the rate adaptation method performed by using a character as a granularity in a scenario in which a rate at a receive port needs to be increased is described. The following describes a rate adaptation method performed by using a character as a granularity in a scenario in which the rate at the receive port needs to be decreased.

FIG. 17 is a flowchart of another rate adaptation method according to an embodiment of this application. The method may be applied to the network architecture shown in FIG. 11. The method may be specifically performed by an intermediate node, a receiving node, or another node on which rate adaptation needs to be performed. The method includes:

S1701. Obtain a first character stream, where the first character stream includes characters corresponding to a first code block, characters corresponding to at least two rate adaptation code blocks, and characters corresponding to a second code block, and the first code block, the at least two rate adaptation code blocks, and the second code block are adjacent to each other.

It should be understood that the characters corresponding to the first code block, the characters corresponding to the at least two rate adaptation code blocks, and the characters corresponding to the second code block herein are characters corresponding to the first code block, the at least two rate adaptation code blocks, and the second code block that are adjacent to each other, where the first code block, the at least two rate adaptation code blocks, and the second code block are adjacent to each other. For descriptions of the first code block, the at least two rate adaptation code blocks, and the second code block that are adjacent to each other, refer to related explanations in the foregoing S1301.

For specific implementations of the first code block and the second code block, refer to the specific implementations of the first code block and the second code block in the foregoing S1301.

For a specific implementation of obtaining the first character stream, refer to the specific implementation of obtaining the first character stream in the foregoing S1601. A difference lies only in that characters corresponding to at least two rate adaptation code blocks exist between characters corresponding to the first code block and the characters corresponding to the second code block herein.

S1702. When a rate adaptation requirement exists, determine whether a code block relationship between the first code block and the second code block meets a preset condition.

For a specific implementation of S1702, refer to the specific implementation of the foregoing S1302.

S1703. When the code block relationship between the first code block and the second code block does not meet the preset condition, delete characters that correspond to at least one rate adaptation code block and that are in the characters corresponding to the at least two rate adaptation code blocks, so that characters corresponding to at least one rate adaptation code block are included between the characters corresponding to the first code block and the characters corresponding to the second code block after deletion.

A specific implementation of S1703 is similar to that of the foregoing S1303, and a difference lies only in that deletion is performed based on a character. Specifically, after all the rate adaptation characters between the first code block and the second code block that do not meet the preset condition are deleted, if the first character stream is encoded again after deletion, the first code block and the second code block are adjacent to each other, and a code block combination that causes an error in parsing of adjacent packets by PCS decode of a receive end may occur, for example, a combination such as T and T, T and D, T and E, and E and S. Therefore, characters corresponding to at least one rate adaptation code block need to be reserved, to prevent the first code block and the second code block from being adjacent to each other after encoding is performed again.

S1704. When the code block relationship between the first code block and the second code block meets the preset condition, delete characters that correspond to at least one rate adaptation code block and that are in the characters corresponding to the at least two rate adaptation code blocks, so that characters corresponding to a rate adaptation code block do not exist or characters corresponding to at least one rate adaptation code block are included between the characters corresponding to the first code block and the characters corresponding to the second code block after deletion.

A specific implementation of S1704 is similar to that of the foregoing S1304, and a difference lies only in that deletion is performed based on a character. Specifically, after all the rate adaptation code blocks between the first code block and the second code block that meet the preset condition are deleted, if the first character stream is encoded again after deletion, the first code block and the second code block are adjacent to each other, but a code block combination that causes an error in parsing of adjacent packets by PCS decode of a receive end does not occur, for example, a combination such as T and T, T and D, T and E, and E and S does not occur. Therefore, after deletion, characters corresponding to a rate adaptation code block may exist or characters corresponding to a rate adaptation code block may not exist between the characters corresponding to the first code block and the characters corresponding to the second code block.

Similarly, the rate adaptation code block includes an idle code block. However, another possibility is not ruled out. For example, the rate adaptation code block may further include a self-defined code block used to adjust a rate. This is not limited herein. Correspondingly, the character (briefly referred to as a rate adaptation character) corresponding to the rate adaptation code block includes an idle character. However, another possibility is not ruled out. For example, the character may further include a self-defined character used to adjust a rate. This is not limited herein. In the following, an idle character is used as an example. In addition, when the character is deleted, eight consecutive idle characters are used as a group (eight idle characters correspond to one idle code block) for deletion.

In this embodiment of this application, the deleting characters corresponding to at least one rate adaptation code block between the characters corresponding to the first code block and the characters corresponding to the second code block includes but is not limited to the following several implementations:

(1) The characters corresponding to the at least one rate adaptation code block are deleted after the last character corresponding to the first code block and before the $1^{st}$ character corresponding to the second code block.

For example, the first character stream includes "DDDDDDDTIIIIIIIIIIIIIIIISDDDDDDDD", the first code block is a T7 code block and corresponds to characters "DDDDDDDT", and the second code block is an S code block and corresponds to characters "SDDDDDDDD". In this case, the characters corresponding to the at least one rate adaptation code block may be deleted after the character "T" of the T7 code block and before the character "S0" of the S code block, for example, "IIIIIIIIIIIIIIII" are deleted, and a character combination obtained after deletion is "DDDDDDDTSDDDDDDDD".

(2) If the last several characters of the first code block are all idle characters, the characters corresponding to the at least one idle code block may be deleted at any location after the last non-idle character of the first code block and before the $1^{st}$ character of the second code block. In other words, the idle character may be deleted at a location of the last several idle characters of the first code block.

Although the deletion location is not after the last character corresponding to the first code block and before the $1^{st}$ character corresponding to the second code block, a character combination obtained after the idle character is deleted is the same as a character combination obtained after the idle character is deleted after the last character corresponding to the first code block and before the $1^{st}$ character corresponding to the second code block. Therefore, it is equivalent to deleting the idle character after the last character corresponding to the first code block and before the 1$^{st}$ character corresponding to the second code block.

For example, the first character stream includes "DDDDTIIIIIIIISDDDDDDD", the first code block is a T4 code block and corresponds to characters "DDDDTIII", and the second code block is an S code block and corresponds to characters "SDDDDDDD". In this case, there may be the following several idle character deletion manners:

(1) Characters corresponding to two idle code blocks after the last character corresponding to the first code block and before the 1$^{st}$ character corresponding to the second code block are deleted, that is, the part marked with "( )" in "DDDDTIII(IIIIIIIIIIIIII)SDDDDDDD" is deleted, and characters obtained after deletion are "DDDDTIIIS-DDDDDDD".

(2) Characters corresponding to two idle code blocks after the penultimate character corresponding to the first code block are deleted, that is, the part marked with "( )" in "DDDDTII(IIIIIIIIIIIIII)ISDDDDDDD" is deleted, and characters obtained after deletion are "DDDDTIIIS-DDDDDDD".

(3) Characters corresponding to two idle code blocks after the last but second character corresponding to the first code block are deleted, that is, the part marked with "( )" in "DDDDTI(IIIIIIIIIIIIII)IISDDDDDDD" is deleted, and characters obtained after deletion are "DDDDTIIIS-DDDDDDD".

(4) Characters corresponding to two idle code blocks after the last but third character (namely, the last non-idle character) corresponding to the first code block are deleted, that is, the part marked with "( )" in "DDDDT(IIIIIIIIIIIIII)IIISDDDDDDD" is deleted, and characters obtained after deletion are "DDDDTIIISDDDDDDD".

It may be learned that final results of the foregoing four deletion manners are consistent.

Further, after the idle character is deleted, the first character stream obtained after the idle character is deleted is further encoded to obtain a second code block stream. In this way, an effect of a finally generated code block stream is consistent with an effect of a code block stream obtained after the rate adaptation code block is deleted in the embodiment shown in FIG. 13.

It should be understood that, if a code block other than the preset code block is decoded when the first code block stream is decoded, herein, after the character stream obtained after character deletion is encoded, the preset code block needs to be inserted into the second code block stream obtained after encoding is performed again, to avoid missing of information in an original code block stream, and ensure reliability of rate adaptation.

Similarly, in the foregoing description manner, "meets" and "does not meet" may be replaced with each other, and a corresponding preset condition may be replaced. However, the description of either "determining that the code block relationship meets the preset condition" or "determining that the code block relationship does not meet the preset condition" or another description manner falls within the protection scope of this application, provided that a finally obtained technical solution is essentially the same or a technical concept is the same.

It may be learned from the foregoing description that, in this embodiment of this application, the first character stream is identified and detected. When rate adaptation needs to be performed, based on characters corresponding to a pre-identified code block relationship/combination that causes an error in packet receiving and parsing, the character location that may cause an error is avoided, and the rate adaptation characters are deleted at a correct character location, so that it can be ensured that parsing of a received packet on a receive side is not affected by rate adaptation, and reliability of rate adaptation can be improved.

In the related embodiment shown in FIG. 17, the rate adaptation method performed by using a character as a granularity when a plurality of rate adaptation code blocks exist between the first code block and the second code block and in a scenario in which a rate at a receive port needs to be decreased. The following describes a rate adaptation method performed by using a character as a granularity when only one rate adaptation code block exists between the first code block and the second code block and in a scenario in which the rate at the receive port needs to be decreased.

FIG. 18 is a flowchart of another rate adaptation method according to an embodiment of this application. The method may be applied to the network architecture shown in FIG. 11. The method may be specifically performed by an intermediate node, a receiving node, or another node on which rate adaptation needs to be performed. The method includes:

S1801. Obtain a first character stream, where the first code block stream includes characters corresponding to a first code block, characters corresponding to a rate adaptation code block, and characters corresponding to a second code block, and the first code block, the rate adaptation code block, and the second code block are adjacent to each other.

For a specific implementation of S1801, refer to the specific implementations of the foregoing S1601, S1701, and the like. A difference lies only in that characters corresponding to only one rate adaptation code block exist between the characters corresponding to the first code block and the characters corresponding to the second code block in S1801.

S1802. When a rate adaptation requirement exists, determine whether a code block relationship between the first code block and the second code block meets a preset condition.

For a specific implementation of S1802, refer to the specific implementations of the foregoing S1602 and S1702. A difference lies only in that characters corresponding to only one rate adaptation code block exist between the characters corresponding to the first code block and the characters corresponding to the second code block in S1802.

S1803. When the code block relationship between the first code block and the second code block meets the preset condition, delete the characters corresponding to the rate adaptation code block.

A specific implementation of S1803 is similar to that of the foregoing S1503, and a difference lies only in that deletion is performed based on a character.

Alternatively, a specific implementation of S1803 is similar to that of the foregoing S1703. A difference lies only in that characters corresponding to only one rate adaptation code block exist between the characters corresponding to the first code block and the characters corresponding to the second code block herein.

When the preset condition is not met, characters corresponding to at least one rate adaptation code block need to be reserved, that is, the characters corresponding to the rate adaptation code block cannot be deleted. When the preset condition is met, the characters corresponding to the rate adaptation code block may not be reserved, and therefore the characters corresponding to the rate adaptation code block may be deleted.

For the first code block and the second code block that does not meet the preset condition, after the rate adaptation characters between the characters corresponding to the first code block and the characters corresponding to the second code block are deleted, if the first character stream is encoded again after deletion, the first code block and the second code block are adjacent to each other, and a code block combination that causes an error in parsing of adjacent packets by PCS decode of a receive end may occur, for example, a combination such as T and T, T and D, T and E, and E and S. Therefore, if the code block relationship between the first code block and the second code block does not meet the preset condition, for example, if the first code block and the second code block are in any one of the following code block relationships: {T, T}, {T, D}, {T, E}, {D, S} and {E, S}, the rate adaptation characters between the characters corresponding to the first code block and the characters corresponding to the second code block cannot be deleted, to avoid the combination such as {T, T}, {T, D}, {T, E}, {D, S} and {E, S} after encoding is performed again.

On the contrary, for the first code block and the second code block that meet the preset condition, if the rate adaptation characters between the characters corresponding to the first code block and the characters corresponding to the second code block are deleted, after encoding is performed again, the first code block and the second code block are adjacent to each other, but a code block combination that causes an error in parsing of adjacent packets by PCS decode of a receive end does not occur, for example, a combination such as T and T, T and D, T and E, and E and S does not occur. Therefore, if the code block relationship between the first code block and the second code block meets the preset condition, for example, if the first code block and the second code block are not any one of {T, T}, {T, D}, {T, E}, {D, S} and {E, S}, or if the first code block and the second code block are any one of {T, I}, {T, S}, {I, I}, {O, I}, {I, O}, {I, S}, {O, S}, and {O, O}, the rate adaptation characters between the characters corresponding to the first code block and the characters corresponding to the second code block may be deleted.

Further, after the idle character is deleted, the first character stream obtained after the idle character is deleted is further encoded to obtain a second code block stream. In this way, an effect of a finally generated code block stream is consistent with an effect of a code block stream obtained after the rate adaptation code block is deleted in the embodiment shown in FIG. 15.

It should be understood that, if a code block other than the preset code block is decoded when the first code block stream is decoded, herein, after the character stream obtained after character deletion is encoded, the preset code block needs to be inserted into the second code block stream obtained after encoding is performed again, to avoid missing of information in an original code block stream, and ensure reliability of rate adaptation.

Similarly, in the foregoing description manner, "meets" may be replaced with "does not meet", and a corresponding preset condition may be replaced. However, the description of either "determining that the code block relationship meets the preset condition" or "determining that the code block relationship does not meet the preset condition" or another description manner falls within the protection scope of this application, provided that a finally obtained technical solution is essentially the same or a technical concept is the same.

It may be learned from the foregoing description that, in this embodiment of this application, the first character stream is identified and detected. When rate adaptation needs to be performed, based on characters corresponding to a pre-identified code block relationship/combination that causes an error in packet receiving, the character location that may cause an error is avoided, and the rate adaptation characters are deleted at a correct character location, so that it can be ensured that parsing of a received packet on a receive side is not affected by rate adaptation, and reliability of rate adaptation is improved.

It should be understood that the implementations in embodiments of this application may be mutually combined to implement different technical effects.

Referring to FIG. 19, based on a same technical concept, an embodiment of this application further provides a rate adaptation apparatus 1900, where the apparatus 1900 includes:

an obtaining unit 1901, configured to obtain a first code block stream, where the first code block stream includes a first code block and a second code block that are adjacent to each other; and a processing unit 1902, configured to: determine whether a code block relationship between the first code block and the second code block meets a preset condition; and when the code block relationship between the first code block and the second code block meets the preset condition and a rate adaptation requirement exists, insert at least one rate adaptation code block between the first code block and the second code block.

Optionally, the first code block is a T code block or a code block after the T code block, and the T code block is a frame termination code block.

The second code block is an S code block or a code block before the S code block, and the S code block is a frame start code block.

Optionally, the preset condition includes:

the code block relationship between the first code block and the second code block is not any one of the following code block relationships: a T code block and a T code block, a T code block and a D code block, a T code block and an E code block, a D code block and an S code block, and an E code block and an S code block; and/or the code block relationship between the first code block and the second code block is any one of the following code block relationships: a T code block and an inter-packet gap IPG code block, an IPG code block and an S code block, a T code block and an S code block, and an IPG code block and an IPG code block, where the IPG code block includes one or more of an idle (IDLE) code block, an O code block, an E code block, or a D code block.

Optionally, when determining whether the code block relationship between the first code block and the second code block meets the preset condition, the processing unit 1902 is specifically configured to:

sequentially detect a type of each code block in the first code block stream based on a code block sequence; and after detecting any code block in an interpacket gap, use the any code block as the first code block, use an adjacent code block after the any code block as the second code block, and determine whether the code block relationship between the first code block and the second code block meets the preset condition.

Optionally, the processing unit 1902 is further configured to: before inserting the at least one rate adaptation code block between the first code block and the second code block, decode the first code block stream to obtain a first character stream.

When inserting the at least one rate adaptation code block between the first code block and the second code block, the processing unit 1902 is specifically configured to:

insert characters corresponding to the at least one rate adaptation code block between characters corresponding to the first code block and characters corresponding to the second code block.

Optionally, the processing unit 1902 is further configured to:

before decoding the first code block stream, perform code block format and code block sequence check on the first code block stream; and if there is a code block whose code block format and/or code block sequence do/does not comply with a rule, replace, with an E code block, the code block whose code block format and/or code block sequence do/does not comply with the rule.

Optionally, when decoding the first code block stream, the processing unit 1902 is specifically configured to:

decode a code block other than a preset code block, where the preset code block includes an O code block.

Optionally, the processing unit 1902 is further configured to:

after inserting the characters corresponding to the at least one rate adaptation code block between the characters corresponding to the first code block and the characters corresponding to the second code block, encode a character stream obtained after the characters corresponding to the at least one rate adaptation code block are inserted, to obtain a second code block stream; and insert the preset code block into the second code block stream.

Figure 20:
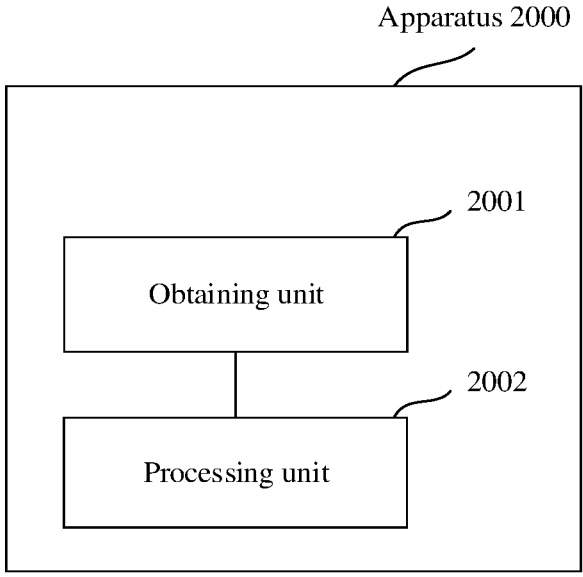
FIG. 20 is an example schematic diagram of a structure of another rate adaptation apparatus 2000 according to an embodiment of this application.

Referring to FIG. 20, based on a same technical concept, an embodiment of this application further provides a rate adaptation apparatus 2000, including:

an obtaining unit 2001, configured to obtain a first code block stream, where the first code block stream includes a first code block, at least two rate adaptation code blocks, and a second code block that are adjacent to each other; and a processing unit 2002, configured to: determine whether a code block relationship between the first code block and the second code block meets a preset condition; and when the code block relationship between the first code block and the second code block does not meet the preset condition and a rate adaptation requirement exists, delete at least one rate adaptation code block in the at least two rate adaptation code blocks, so that at least one rate adaptation code block is included between the first code block and the second code block after deletion.

Optionally, the first code block is a T code block or a code block after the T code block, and the T code block is a frame termination code block.

The second code block is an S code block or a code block before the S code block, and the S code block is a frame start code block.

Optionally, the preset condition includes:

the code block relationship between the first code block and the second code block is not any one of the following code block relationships: a T code block and a T code block, a T code block and a D code block, a T code block and an E code block, a D code block and an S code block, and an E code block and an S code block; and/or the code block relationship between the first code block and the second code block is any one of the following code block relationships: a T code block and an interpacket gap IPG code block, an IPG code block and an S code block, a T code block and an S code block, and an IPG code block and an IPG code block, where the IPG code block includes one or more of an idle (IDLE) code block, an O code block, an E code block, or a D code block.

Optionally, when determining whether the code block relationship between the first code block and the second code block meets the preset condition, the processing unit 2002 is specifically configured to:

sequentially detect a type of each code block in the first code block stream based on a code block sequence; and after detecting any code block in an interpacket gap, use the any code block as the first code block, use, as the second code block, a code block that is after the any code block and that is separated from the any code block by at least two rate adaptation code blocks, and determine whether the code block relationship between the first code block and the second code block meets the preset condition.

Optionally, the processing unit 2002 is further configured to: before deleting the at least one rate adaptation code block in the at least two rate adaptation code blocks, decode the first code block stream to obtain a first character stream.

When deleting the at least one rate adaptation code block in the at least two rate adaptation code blocks, the processing unit 2002 is specifically configured to delete characters that correspond to the at least one rate adaptation code block and that are in characters corresponding to the at least two rate adaptation code blocks.

Optionally, the processing unit 2002 is further configured to:

before decoding the first code block stream, perform code block format and code block sequence check on the first code block stream; and if there is a code block whose code block format and/or code block sequence do/does not comply with a rule, replace, with an E code block, the code block whose code block format and/or code block sequence do/does not comply with the rule.

Optionally, when decoding the first code block stream, the processing unit 2002 is specifically configured to decode a code block other than a preset code block, where the preset code block includes an O code block.

Optionally, the processing unit 2002 is further configured to:

after deleting the characters that correspond to the at least one rate adaptation code block and that are in the characters corresponding to the at least two rate adaptation code blocks, encode a character stream obtained after the characters corresponding to the at least one rate adaptation code block are deleted, to obtain a third code block stream; and insert the preset code block into the second code block stream.

Optionally, the processing unit 2002 is further configured to:

when the code block relationship between the first code block and the second code block meets the preset condition, delete at least one rate adaptation code block in the at least two rate adaptation code blocks, so that no rate adaptation code block exists or at least one rate adaptation code block is included between the first code block and the second code block after deletion.

Figure 21:
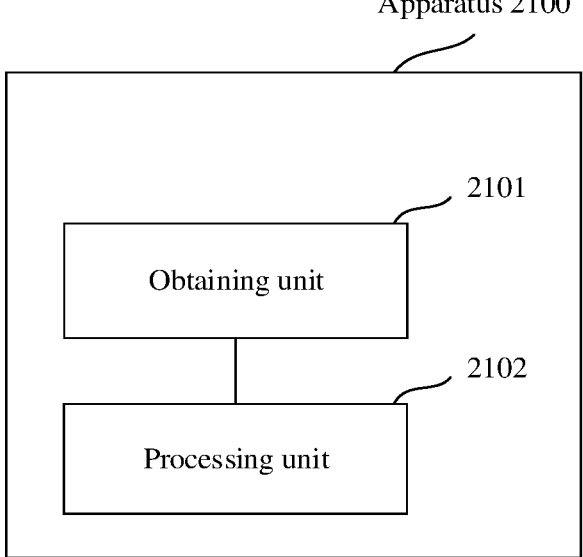
FIG. 21 is an example schematic diagram of a structure of another rate adaptation apparatus 2100 according to an embodiment of this application.

Referring to FIG. 21, based on a same technical concept, an embodiment of this application further provides a rate adaptation apparatus 2100, where the apparatus 2100 includes:

an obtaining unit 2101, configured to obtain a first code block stream, where the first code block stream includes a first code block, at least two rate adaptation code blocks, and a second code block that are adjacent to each other; and a processing unit 2102, configured to: determine whether a code block relationship between the first code block and the second code block meets a preset condition; and when the code block relationship between the first code block and the second code block meets the preset condition and a rate adaptation requirement exists, delete at least one rate adaptation code block in the at least two rate adaptation code blocks, so that no rate adaptation code block exists or at least one rate adaptation code block is included between the first code block and the second code block after deletion.

Optionally, the first code block is a T code block or a code block after the T code block, and the T code block is a frame termination code block; and the second code block is an S code block or a code block before the S code block, and the S code block is a frame start code block.

Optionally, the preset condition includes: the code block relationship between the first code block and the second code block is not any one of the following code block relationships: a T code block and a T code block, a T code block and a D code block, a T code block and an E code block, a D code block and an S code block, and an E code block and an S code block; and/or the code block relationship between the first code block and the second code block is any one of the following code block relationships: a T code block and an interpacket gap IPG code block, an IPG code block and an S code block, a T code block and an S code block, and an IPG code block and an IPG code block, where the IPG code block includes one or more of an idle (IDLE) code block, an O code block, an E code block, or a D code block.

Optionally, when determining whether the code block relationship between the first code block and the second code block meets the preset condition, the processing unit 2102 is specifically configured to: sequentially detect a type of each code block in the first code block stream based on a code block sequence; and after detecting any code block in an interpacket gap, use the any code block as the first code block, use, as the second code block, a code block that is after the any code block and that is separated from the any code block by at least two rate adaptation code blocks, and determine whether the code block relationship between the first code block and the second code block meets the preset condition.

Optionally, the processing unit 2102 is further configured to: before deleting the at least one rate adaptation code block in the at least two rate adaptation code blocks, decode the first code block stream to obtain a first character stream; and the processing unit 2102 is specifically configured to delete characters that correspond to the at least one rate adaptation code block and that are in characters corresponding to the at least two rate adaptation code blocks.

Optionally, the processing unit 2102 is further configured to: before decoding the first code block stream, perform code block format and code block sequence check on the first code block stream; and if there is a code block whose code block format and/or code block sequence do/does not comply with a rule, replace, with an E code block, the code block whose code block format and/or code block sequence do/does not comply with the rule. Certainly, the E code block used for replacement herein is merely an example, and imposes no limitation. In actual implementation, another code block may be used for replacement, for example, a self-defined code block.

Optionally, when decoding the first code block stream, the processing unit 2102 is specifically configured to decode a code block other than a preset code block, where the preset code block includes an O code block.

Optionally, the processing unit 2102 is further configured to: after deleting the characters that correspond to the at least one rate adaptation code block and that are in the characters corresponding to the at least two rate adaptation code blocks, encode a character stream obtained after the characters corresponding to the at least one rate adaptation code block are deleted, to obtain a third code block stream; and insert the preset code block into the second code block stream.

Figure 22:
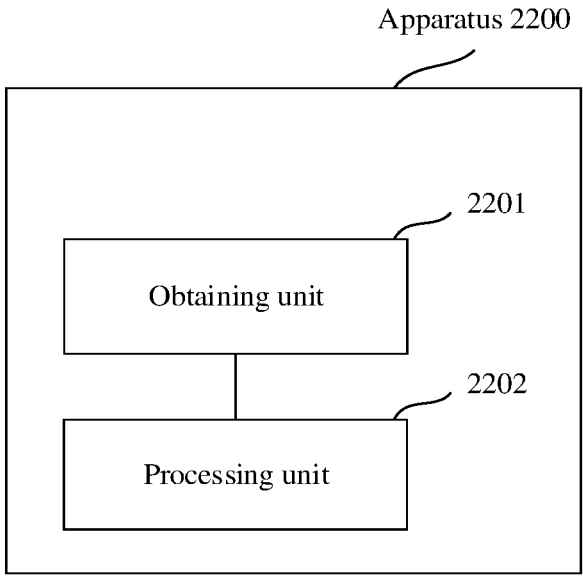
FIG. 22 is an example schematic diagram of a structure of another rate adaptation apparatus 2200 according to an embodiment of this application.

Referring to FIG. 22, based on a same technical concept, an embodiment of this application further provides a rate adaptation apparatus 2200, where the apparatus 2200 includes:

an obtaining unit 2201, configured to obtain a first code block stream, where the first code block stream includes a first code block, a rate adaptation code block, and a second code block that are adjacent to each other; and a processing unit 2202, configured to: determine whether a code block relationship between the first code block and the second code block meets a preset condition; and when the code block relationship between the first code block and the second code block meets the preset condition and a rate adaptation requirement exists, delete the rate adaptation code block.

Optionally, the first code block is a T code block or a code block after the T code block, and the T code block is a frame termination code block; and the second code block is an S code block or a code block before the S code block, and the S code block is a frame start code block.

Optionally, the preset condition includes: the code block relationship between the first code block and the second code block is not any one of the following code block relationships: a T code block and a T code block, a T code block and a D code block, a T code block and an E code block, a D code block and an S code block, and an E code block and an S code block; and/or the code block relationship between the first code block and the second code block is any one of the following code block relationships: a T code block and an interpacket gap IPG code block, an IPG code block and an S code block, a T code block and an S code block, and an IPG code block and an IPG code block, where the IPG code block includes one or more of an idle (IDLE) code block, an O code block, an E code block, or a D code block.

Optionally, when determining whether the code block relationship between the first code block and the second code block meets the preset condition, the processing unit 2202 is specifically configured to: sequentially detect a type of each code block in the first code block stream based on a code block sequence; and after detecting any code block in an interpacket gap, use the any code block as the first code block, use, as the second code block, a code block that is after the any code block and that is separated from the any code block by at least one rate adaptation code block, and determine whether the code block relationship between the first code block and the second code block meets the preset condition.

Optionally, the processing unit 2202 is further configured to: before deleting the rate adaptation code block, decode the first code block stream to obtain a first character stream; and the processing unit 2202 is specifically configured to delete characters corresponding to the rate adaptation code block.

Optionally, the processing unit 2202 is further configured to: before decoding the first code block stream, perform code block format and code block sequence check on the first code block stream; and if there is a code block whose code block format and/or code block sequence do/does not comply with a rule, replace, with an E code block, the code block whose code block format and/or code block sequence do/does not comply with the rule. Certainly, the E code block used for replacement herein is merely an example, and imposes no limitation. In actual implementation, another code block may be used for replacement, for example, a self-defined code block.

Optionally, when decoding the first code block stream, the processing unit 2202 is specifically configured to decode a code block other than a preset code block, where the preset code block includes an O code block.

Optionally, the processing unit 2202 is further configured to: after deleting the characters corresponding to the rate adaptation code block, encode a character stream obtained after the characters corresponding to the rate adaptation code block are deleted, to obtain a third code block stream; and insert the preset code block into the second code block stream.

Figure 23:
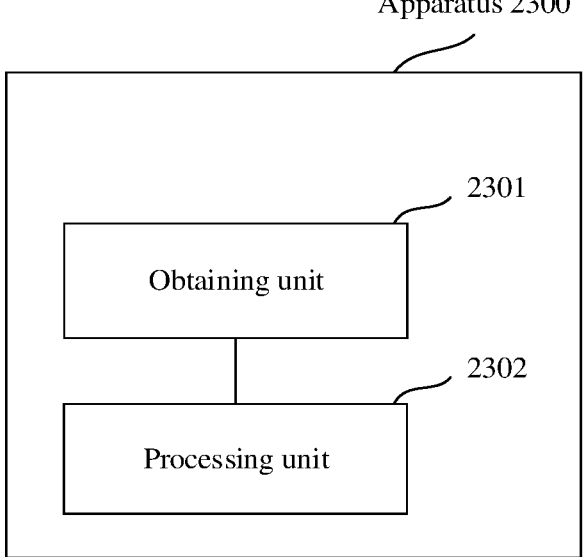
FIG. 23 is an example schematic diagram of a structure of another rate adaptation apparatus 2300 according to an embodiment of this application.

Referring to FIG. 23, based on a same technical concept, an embodiment of this application further provides a rate adaptation apparatus 2300, where the apparatus 2300 includes:

an obtaining unit 2301, configured to obtain a first character stream, where the first character stream includes characters corresponding to a first code block and characters corresponding to a second code block, and the first code block and the second code block are adjacent to each other; and a processing unit 2302, configured to: determine whether a code block relationship between the first code block and the second code block meets a preset condition; and when the code block relationship between the first code block and the second code block meets the preset condition and a rate adaptation requirement exists, insert characters corresponding to at least one rate adaptation code block between the characters corresponding to the first code block and the characters corresponding to the second code block.

Optionally, the obtaining unit 2301 is further configured to: before obtaining the first character stream, obtain a first code block stream, where the first code block stream includes the first code block and the second code block that are adjacent to each other; perform code block format and code block sequence check on the first code block stream; if there is a code block whose code block format and/or code block sequence do/does not comply with a rule, replace, with an E code block, the code block whose code block format and/or code block sequence do/does not comply with the rule, to obtain an error-corrected first code block stream; and decode the error-corrected first code block stream to obtain the first character stream. Certainly, the E code block used for replacement herein is merely an example, and imposes no limitation. In actual implementation, another code block may be used for replacement, for example, a self-defined code block.

Optionally, when decoding the error-corrected first code block stream, the obtaining unit 2301 is specifically configured to decode a code block other than a preset code block in the error-corrected first code block stream, where the preset code block includes an O code block.

Optionally, the first code block is a T code block or a code block after the T code block, and the T code block is a frame termination code block; and the second code block is an S code block or a code block before the S code block, and the S code block is a frame start code block.

Optionally, the preset condition includes: the code block relationship between the first code block and the second code block is not any one of the following code block relationships: a T code block and a T code block, a T code block and a D code block, a T code block and an E code block, a D code block and an S code block, and an E code block and an S code block; and/or the code block relationship between the first code block and the second code block is any one of the following code block relationships: a T code block and an interpacket gap IPG code block, an IPG code block and an S code block, a T code block and an S code block, and an IPG code block and an IPG code block, where the IPG code block includes one or more of an idle (IDLE) code block, an O code block, an E code block, or a D code block.

Figure 24:
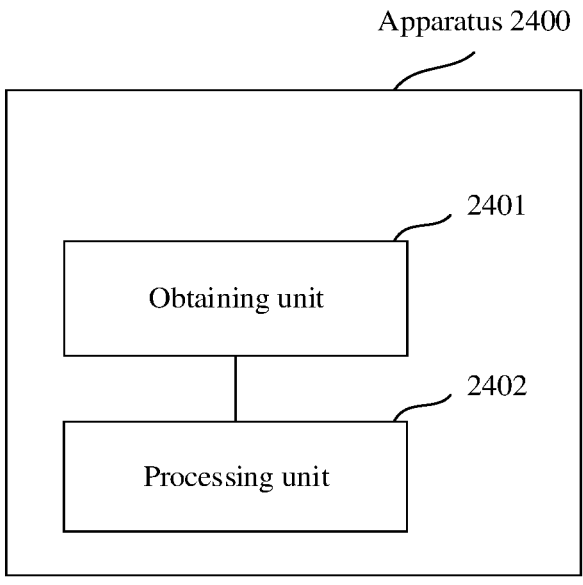
FIG. 24 is an example schematic diagram of a structure of another rate adaptation apparatus 2400 according to an embodiment of this application.

Referring to FIG. 24, based on a same technical concept, an embodiment of this application further provides a rate adaptation apparatus 2400, where the apparatus 2400 includes:

an obtaining unit 2401, configured to obtain a first character stream, where the first character stream includes characters corresponding to a first code block, characters corresponding to at least two rate adaptation code blocks, and characters corresponding to a second code block, and the first code block, the at least two rate adaptation code blocks, and the second code block are adjacent to each other; and a processing unit 2402, configured to: determine whether a code block relationship between the first code block and the second code block meets a preset condition; and when the code block relationship between the first code block and the second code block does not meet the preset condition and a rate adaptation requirement exists, delete characters that correspond to at least one rate adaptation code block and that are in the characters corresponding to the at least two rate adaptation code blocks, so that characters corresponding to at least one rate adaptation code block are included between the characters corresponding to the first code block and the characters corresponding to the second code block after deletion.

Optionally, the obtaining unit 2401 is further configured to: before obtaining the first character stream, obtain a first code block stream, where the first code block stream includes the first code block, the at least two rate adaptation code blocks, and the second code block that are adjacent to each other; perform code block format and code block sequence check on the first code block stream; if there is a code block whose code block format and/or code block sequence do/does not comply with a rule, replace, with an E code block, the code block whose code block format and/or code block sequence do/does not comply with the rule, to obtain an error-corrected first code block stream; and decode the error-corrected first code block stream to obtain the first character stream. Certainly, the E code block used for replacement herein is merely an example, and imposes no limitation. In actual implementation, another code block may be used for replacement, for example, a self-defined code block.

Optionally, when decoding the error-corrected first code block stream, the obtaining unit 2401 is specifically configured to decode a code block other than a preset code block in the error-corrected first code block stream, where the preset code block includes an O code block.

Optionally, the first code block is a T code block or a code block after the T code block, and the T code block is a frame termination code block; and the second code block is an S code block or a code block before the S code block, and the S code block is a frame start code block.

Optionally, the preset condition includes: the code block relationship between the first code block and the second code block is not any one of the following code block relationships: a T code block and a T code block, a T code block and a D code block, a T code block and an E code block, a D code block and an S code block, and an E code block and an S code block; and/or the code block relationship between the first code block and the second code block is any one of the following code block relationships: a T code block and an interpacket gap IPG code block, an IPG code block and an S code block, a T code block and an S code block, and an IPG code block and an IPG code block, where the IPG code block includes one or more of an idle (IDLE) code block, an O code block, an E code block, or a D code block.

Figure 25:
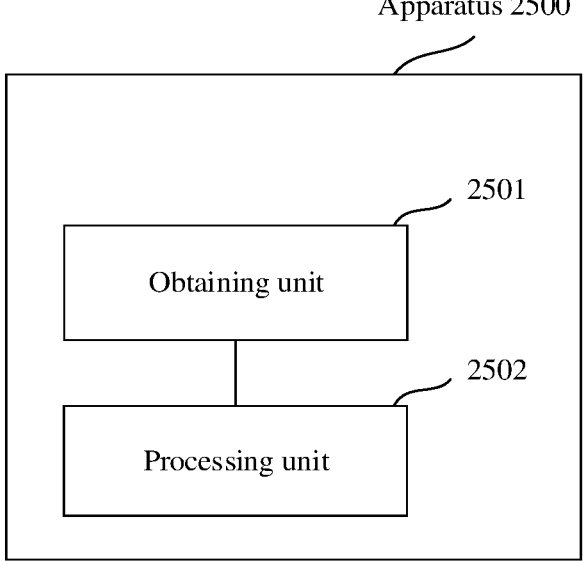
FIG. 25 is an example schematic diagram of a structure of another rate adaptation apparatus 2500 according to an embodiment of this application.

Referring to FIG. 25, based on a same technical concept, an embodiment of this application further provides a rate adaptation apparatus 2500, where the apparatus 2500 includes:

an obtaining unit 2501, configured to obtain a first character stream, where the first character stream includes characters corresponding to a first code block, characters corresponding to at least two rate adaptation code blocks, and characters corresponding to a second code block, and the first code block, the at least two rate adaptation code blocks, and the second code block are adjacent to each other; and a processing unit 2502, configured to: determine whether a code block relationship between the first code block and the second code block meets a preset condition; and when the code block relationship between the first code block and the second code block meets the preset condition and a rate adaptation requirement exists, delete characters that correspond to at least one rate adaptation code block and that are in the characters corresponding to the at least two rate adaptation code blocks, so that characters corresponding to a rate adaptation code block do not exist or characters corresponding to at least one rate adaptation code block are included between the characters corresponding to the first code block and the characters corresponding to the second code block after deletion.

Optionally, the obtaining unit 2501 is further configured to: before obtaining the first character stream, obtain a first code block stream, where the first code block stream includes the first code block, the at least two rate adaptation code blocks, and the second code block that are adjacent to each other; perform code block format and code block sequence check on the first code block stream; if there is a code block whose code block format and/or code block sequence do/does not comply with a rule, replace, with an E code block, the code block whose code block format and/or code block sequence do/does not comply with the rule, to obtain an error-corrected first code block stream; and decode the error-corrected first code block stream to obtain the first character stream. Certainly, the E code block used for replacement herein is merely an example, and imposes no limitation. In actual implementation, another code block may be used for replacement, for example, a self-defined code block.

Optionally, when decoding the error-corrected first code block stream, the obtaining unit 2501 is specifically configured to decode a code block other than a preset code block in the error-corrected first code block stream, where the preset code block includes an O code block.

Optionally, the first code block is a T code block or a code block after the T code block, and the T code block is a frame termination code block; and the second code block is an S code block or a code block before the S code block, and the S code block is a frame start code block.

Optionally, the preset condition includes: the code block relationship between the first code block and the second code block is not any one of the following code block relationships: a T code block and a T code block, a T code block and a D code block, a T code block and an E code block, a D code block and an S code block, and an E code block and an S code block; and/or the code block relationship between the first code block and the second code block is any one of the following code block relationships: a T code block and an interpacket gap IPG code block, an IPG code block and an S code block, a T code block and an S code block, and an IPG code block and an IPG code block, where the IPG code block includes one or more of an idle (IDLE) code block, an O code block, an E code block, or a D code block.

Figure 26:
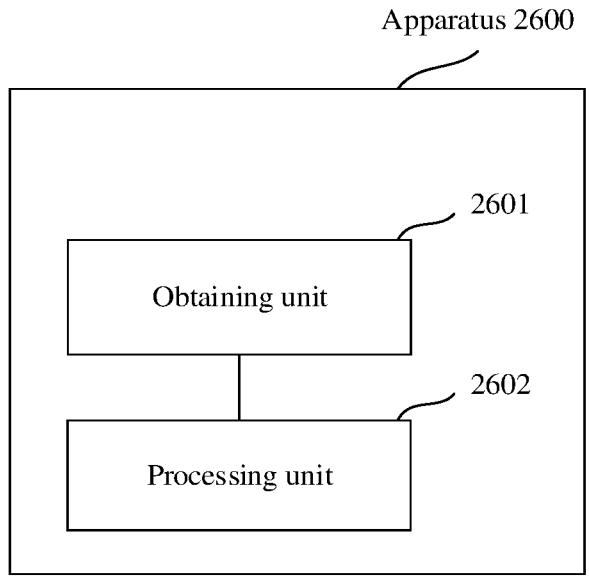
FIG. 26 is an example schematic diagram of a structure of another rate adaptation apparatus 2600 according to an embodiment of this application.

Referring to FIG. 26, based on a same technical concept, an embodiment of this application further provides a rate adaptation apparatus 2600, where the apparatus 2600 includes:

an obtaining unit 2601, configured to obtain a first character stream, where the first code block stream includes characters corresponding to a first code block, characters corresponding to a rate adaptation code block, and characters corresponding to a second code block, and the first code block, the rate adaptation code block, and the second code block are adjacent to each other; and a processing unit 2602, configured to: determine whether a code block relationship between the first code block and the second code block meets a preset condition; and when the code block relationship between the first code block and the second code block meets the preset condition and a rate adaptation requirement exists, delete the characters corresponding to the rate adaptation code block.

Optionally, the obtaining unit 2601 is further configured to: before obtaining the first character stream, obtain a first code block stream, where the first code block stream includes the first code block, the rate adaptation code block, and the second code block that are adjacent to each other; perform code block format and code block sequence check on the first code block stream; if there is a code block whose code block format and/or code block sequence do/does not comply with a rule, replace, with an E code block, the code block whose code block format and/or code block sequence do/does not comply with the rule, to obtain an error-corrected first code block stream; and decode the error-corrected first code block stream to obtain the first character stream. Certainly, the E code block used for replacement herein is merely an example, and imposes no limitation. In actual implementation, another code block may be used for replacement, for example, a self-defined code block.

Optionally, when decoding the error-corrected first code block stream, the obtaining unit 2601 is specifically configured to decode a code block other than a preset code block in the error-corrected first code block stream, where the preset code block includes an O code block.

Optionally, the first code block is a T code block or a code block after the T code block, and the T code block is a frame termination code block; and the second code block is an S code block or a code block before the S code block, and the S code block is a frame start code block.

Optionally, the preset condition includes: the code block relationship between the first code block and the second code block is not any one of the following code block relationships: a T code block and a T code block, a T code block and a D code block, a T code block and an E code block, a D code block and an S code block, and an E code block and an S code block; and/or the code block relationship between the first code block and the second code block is any one of the following code block relationships: a T code block and an interpacket gap IPG code block, an IPG code block and an S code block, a T code block and an S code block, and an IPG code block and an IPG code block, where the IPG code block includes one or more of an idle (IDLE) code block, an O code block, an E code block, or a D code block.

All related content of each step involved in the foregoing method embodiment may be referenced to a function description of a corresponding functional module.

Figure 27:
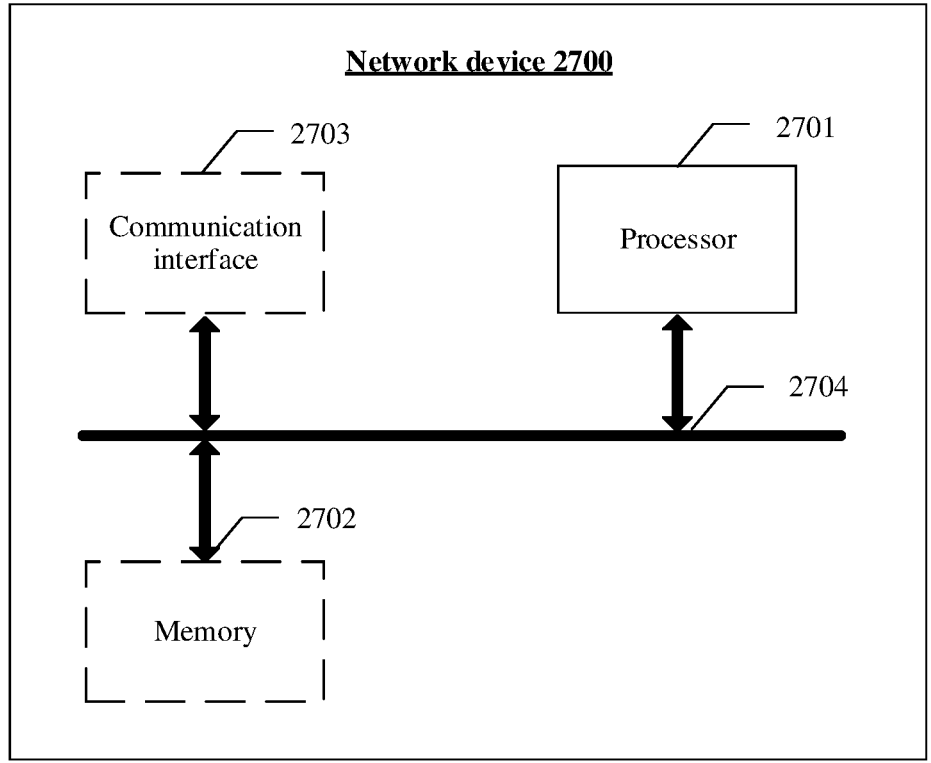
FIG. 27 is an example schematic diagram of a structure of a network device 2700 according to an embodiment of this application.

Based on a same technical concept, referring to FIG. 27, an embodiment of this application further provides a network device 2700, including:

at least one processor 2701, where the at least one processor 2701 executes instructions stored in a memory 2702, so that the network device performs the method in the embodiment shown in FIG. 12, FIG. 13, FIG. 15, FIG. 16, FIG. 17, or FIG. 18.

Optionally, the network device 2700 further includes a communication interface 2703 that is communicatively connected to the at least one processor 2701.

Optionally, the memory 2702 is located outside the network device 2700.

Optionally, the network device 2700 includes the memory 2702, the memory 2702 is connected to the at least one processor 2701, and the memory 2702 stores instructions capable of being executed by the at least one processor 2701.

In FIG. 27, a dashed line is used to indicate that the memory 2702 and the communication interface 2703 are optional for the network device 2700.

The processor 2701 and the memory 2702 may be coupled by using an interface circuit, or may be integrated together. This is not limited herein.

A specific connection medium between the processor 2701, the memory 2702, and the communication interface 2703 is not limited in this embodiment of this application. For example, in this embodiment of this application, the processor 2701, the memory 2702, and the communication interface 2703 are connected to each other by using a bus 2704 in FIG. 27. In FIG. 27, the bus 2704 is represented by using a bold line. A connection manner between other components is only an example for description, and imposes no limitation. The bus 2704 may be classified into an address bus, a data bus, a control bus, and the like. For ease of representation, only one bold line is used for representation in FIG. 27, but this does not mean that there is only one bus or only one type of bus.

It should be understood that the processor mentioned in this embodiment of this application may be implemented by hardware or by software. When the processor is implemented by the hardware, the processor may be a logic circuit, an integrated circuit, or the like. When the processor is implemented by using the software, the processor may be a general-purpose processor, and is implemented by reading software code stored in the memory.

For example, the processor 2701 may be a central processing unit (CPU), or may be another general-purpose processor, a digital signal processor (DSP), an application-specific integrated circuit (ASIC), a field programmable gate array (FPGA), or another programmable logic device, discrete gate or transistor logic device, discrete hardware component, or the like. The general-purpose processor may be a microprocessor, or the processor may be any conventional processor or the like.

It may be further understood that the memory mentioned in embodiments of this application may be a volatile memory or a non-volatile memory, or may include a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM) and is used as an external cache. By way of example and not limitation, RAMs in many forms may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

It should be noted that when the processor is a general-purpose processor, a DSP, an ASIC, an FPGA, or another programmable logic device, discrete gate or transistor logic device, or discrete hardware component, the memory (e.g., a storage module) is integrated into the processor.

It should be noted that the memory described in this specification is intended to include but not limited to these memories and any memory of another appropriate type.

Based on a same technical concept, an embodiment of this application further provides a computer-readable storage medium, including a program or instructions. When the program or the instructions is/are run on a computer, the method in the embodiment shown in FIG. 12, FIG. 13, FIG. 15, FIG. 16, FIG. 17, or FIG. 18 is performed.

Based on a same technical concept, an embodiment of this application further provides a chip. The chip is coupled to a memory, and is configured to read and execute program instructions stored in the memory, so that the method in the embodiment shown in FIG. 12, FIG. 13, FIG. 15, FIG. 16, FIG. 17, or FIG. 18 is performed.

Based on a same technical concept, an embodiment of this application further provides a computer program product, including instructions. When the computer program product is run on a computer, the method in the embodiment shown in FIG. 12, FIG. 13, FIG. 15, FIG. 16, FIG. 17, or FIG. 18 is performed.

Embodiments of this application are described with reference to the flowcharts and/or block diagrams of the method, the device (system), and the computer program product according to embodiments of this application. It should be understood that computer program instructions may be used to implement each process and/or each block in the flowcharts and/or the block diagrams and a combination of a process and/or a block in the flowcharts and/or the block diagrams. The computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more procedures in the flowcharts and/or in one or more blocks in the block diagrams.

All or some of the foregoing embodiments may be implemented by using software, hardware, firmware, or any combination thereof. When software is used to implement the embodiments, all or a part of the embodiments may be implemented in a form of a computer program product. The computer program product includes one or more computer instructions. When the computer program instructions are loaded and executed on the computer, the procedures or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid-state disk (SSD)), or the like.

A person skilled in the art can make various modifications and variations to embodiments of this application without departing from the spirit and scope of this application. In this way, this application is intended to cover these modifications and variations of embodiments of this application provided that they fall within the scope of protection defined by the following claims and their equivalent technologies.

What is claimed is:

1. A rate adaptation method, comprising:
obtaining a first code block stream having a first code block and a second code block adjacent to each other;
determining whether a code block relationship between the first code block and the adjacent second code block satisfies a preset condition; and
in association with the code block relationship between the first code block and the adjacent second code block satisfying the preset condition and a rate adaptation requirement existing, inserting at least one rate adaptation code block between the first code block and the second code block, wherein
the preset condition comprises:
the code block relationship between the first code block and the adjacent second code block excludes any one of the following code block relationships: a T code block and a T code block, a T code block and a D code block, a T code block and an E code block, a D code block and an S code block, and an E code block and an S code block, and
the code block relationship between the first code block and the adjacent second code block includes any of the following code block relationships: a T code block and an interpacket gap (IPG) code block, an IPG code block and an S code block, a T code block and an S code block, and an IPG code block and an IPG code block, wherein the IPG code block comprises one or more of an idle (IDLE) code block, an O code block, an E code block, or a D code block.

2. The rate adaptation method according to claim 1, wherein
the first code block is a T code block, or a code block after the T code block, and the T code block is a frame termination code block; and
the second code block is an S code block, or a code block before the S code block, and the S code block is a frame start code block.

3. The rate adaptation method according to claim 1, wherein determining whether the code block relationship between the first code block and the second code block satisfies the preset condition comprises:
sequentially detecting a type of each code block in the first code block stream based on a code block sequence; and
after detecting any code block in an interpacket gap (IPG), using the any code block as the first code block, using an adjacent code block after the any code block as the second code block, and determining whether the code block relationship between the first code block and the second code block satisfies the preset condition.

4. The rate adaptation method according to a claim 1, wherein before inserting the at least one rate adaptation code block between the first code block and the second code block, the method further comprises:
decoding the first code block stream to obtain a first character stream, wherein
inserting the at least one rate adaptation code block between the first code block and the second code block comprises:
inserting characters corresponding to the at least one rate adaptation code block between characters corresponding to the first code block and characters corresponding to the second code block.

5. The rate adaptation method according to claim 4, wherein before decoding the first code block stream, the method further comprises:
performing a code block format and a code block sequence check on the first code block stream, and
in association with a code block whose code block format and/or code block sequence not complying with a rule, replacing, with an E code block, the code block whose code block format and/or code block sequence does not comply with the rule.

6. The rate adaptation method according to claim 4, wherein decoding the first code block stream comprises:
decoding a code block other than a preset code block, wherein the preset code block comprises an O code block.

7. The rate adaptation method according to claim 6, wherein after inserting the characters corresponding to the at least one rate adaptation code block between the characters corresponding to the first code block and the characters corresponding to the second code block, the method further comprises:
obtaining a second code block stream by encoding a character stream obtained after the characters corresponding to the at least one rate adaptation code block are inserted; and
inserting the preset code block into the second code block stream.

8. A rate adaptation method, comprising:

obtaining a first code block stream having a first code block, at least two rate adaptation code blocks, and a second code block that are adjacent to each other;

determining whether a code block relationship between the first code block and the second code block satisfies a preset condition; and in association with the code block relationship between the first code block and the second code block not satisfying the preset condition and a rate adaptation requirement existing, deleting at least one rate adaptation code block in the at least two rate adaptation code blocks, so that at least one rate adaptation code block is included between the first code block and the second code block after deletion, wherein the preset condition comprises:

the code block relationship between the first code block and the adjacent second code block excludes any one of the following code block relationships: a T code block and a T code block, a T code block and a D code block, a T code block and an E code block, a D code block and an S code block, and an E code block and an S code block, and the code block relationship between the first code block and the second code block includes any one of the following code block relationships: a T code block and an interpacket gap (IPG) code block, an IPG code block and an S code block, a T code block and an S code block, and an IPG code block and an IPG code block, wherein the IPG code block comprises one or more of an idle (IDLE) code block, an O code block, an E code block, or a D code block.

9. The rate adaptation method according to claim 8, wherein the first code block is a T code block, or a code block after the T code block, and the T code block is a frame termination code block; and the second code block is an S code block, or a code block before the S code block, and the S code block is a frame start code block.

10. The rate adaptation method according to claim 1, wherein in association with the first code block and the adjacent second code block not satisfying the present condition, obtaining a second code block stream having a first code block and a second code block adjacent to each other.

11. The rate adaptation method according to claim 1, wherein determining whether the code block relationship satisfies the present condition is continually executed along the first code block stream.

12. The rate adaptation method according to claim 1, wherein determining whether the code block relationship satisfies the present condition is simultaneously performed on the first code block and the second code block.

13. The rate adaptation method according to claim 8, wherein determining whether the code block relationship between the first code block and the second code block satisfies the preset condition comprises:

sequentially detecting a type of each code block in the first code block stream based on a code block sequence; and after detecting any code block in an interframe gap, using the any code block as the first code block, using, as the second code block, a code block after the any code block and separated from the any code block by at least two rate adaptation code blocks, and determining whether the code block relationship between the first code block and the second code block satisfies the preset condition.

14. The rate adaptation method according to claim 8, wherein before deleting the at least one rate adaptation code block in the at least two rate adaptation code blocks, the method further comprises:

decoding the first code block stream to obtain a first character stream, wherein deleting the at least one rate adaptation code block in the at least two rate adaptation code blocks comprises:

deleting characters corresponding to the at least one rate adaptation code block and included in characters corresponding to the at least two rate adaptation code blocks.

15. The rate adaptation method according to claim 13, wherein before decoding the first code block stream, the method further comprises:

performing a code block format and a code block sequence check on the first code block stream, and in association with a code block whose code block format and/or code block sequence not complying with a rule, replacing, with an E code block, the code block whose code block format and/or code block sequence does not comply with the rule.

16. The rate adaptation method according to claim 14, wherein decoding the first code block stream comprises:

decoding a code block other than a preset code block, wherein the preset code block comprises an O code block.

17. A rate adaptation apparatus, comprising:

a processor; and a memory configured to store computer readable instructions that, when executed by the processor, cause the processor to:

obtain a first code block stream having a first code block and a second code block adjacent to each other;

determine whether a code block relationship between the first code block and the adjacent second code block satisfies a preset condition; and when the code block relationship between the first code block and the adjacent second code block satisfies the preset condition and a rate adaptation requirement exists, insert at least one rate adaptation code block between the first code block and the second code block, wherein the preset condition comprises:

the code block relationship between the first code block and the adjacent second code block excludes any one of the following code block relationships: a T code block and a T code block, a T code block and a D code block, a T code block and an E code block, a D code block and an S code block, and an E code block and an S code block, and the code block relationship between the first code block and the adjacent second code block includes any of the following code block relationships: a T code block and an interpacket gap (IPG) code block, an IPG code block and an S code block, a T code block and an S code block, and an IPG code block and an IPG code block, wherein the IPG code block comprises one or more of an idle (IDLE) code block, an O code block, an E code block, or a D code block.

18. The rate adaptation apparatus according to claim 17, wherein the first code block is a T code block, or a code block after the T code block, and the T code block is a frame termination code block; and the second code block is an S code block, or a code block before the S code block, and the S code block is a frame start code block.

19. The rate adaptation apparatus according to claim 17, wherein the processor is further caused to:

sequentially detect a type of each code block in the first code block stream based on a code block sequence; and after detecting any code block in an interpacket gap (IPG), use the any code block as the first code block, use an adjacent code block after the any code block as the second code block, and determine whether the code block relationship between the first code block and the second code block satisfies the preset condition.

20. The rate adaptation apparatus according to claim 17, wherein the processor is further caused to:

before inserting the at least one rate adaptation code block between the first code block and the second code block, obtain a first character stream by decoding the first code block stream; and when inserting the at least one rate adaptation code block between the first code block and the second code block, insert characters corresponding to the at least one rate adaptation code block between characters corresponding to the first code block and characters corresponding to the second code block.

\* \* \* \* \*